US008368992B2

(12) United States Patent
Neuman et al.

(10) Patent No.: US 8,368,992 B2
(45) Date of Patent: *Feb. 5, 2013

(54) ELECTRO-OPTICAL ELEMENT INCLUDING IMI COATINGS

(75) Inventors: George A. Neuman, Holland, MI (US);
Henry A. Luten, Holland, MI (US);
John S. Anderson, Holland, MI (US);
Jeffrey A. Forgette, Holland, MI (US);
Scott W. VanderZwaag, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/941,724

(22) Filed: Nov. 8, 2010

(65) Prior Publication Data
US 2011/0080629 A1 Apr. 7, 2011

Related U.S. Application Data

(63) Continuation-in-part of application No. 11/682,121, filed on Mar. 5, 2007, now Pat. No. 7,830,583.

(60) Provisional application No. 60/779,369, filed on Mar. 3, 2006, provisional application No. 60/810,921, filed on Jun. 5, 2006.

(51) Int. Cl.
G02F 1/153 (2006.01)

(52) U.S. Cl. ........ 359/267; 359/265; 359/268; 359/270; 359/273; 359/274; 359/275

(58) Field of Classification Search ........... 359/265–275
See application file for complete search history.

(56) References Cited

U.S. PATENT DOCUMENTS

| 1,096,452 | A | 5/1914 | Perrin |
| 1,563,258 | A | 11/1925 | Cunningham |
| 2,457,348 | A | 12/1948 | Chambers |
| 2,561,582 | A | 7/1951 | Marbel |
| 3,280,701 | A | 10/1966 | Donnelly et al. |
| 3,847,701 | A | 11/1974 | Fairbanks |
| 4,274,078 | A | 6/1981 | Isobe et al. |
| 4,733,335 | A | 3/1988 | Serizawa et al. |

(Continued)

FOREIGN PATENT DOCUMENTS

| CA | 2028461 | 11/1994 |
| DE | AT402945 B | 9/1997 |

(Continued)

OTHER PUBLICATIONS

Supplementary European Search Report and Written Opinion in European patent application No. EP08827166; 8 pages.

(Continued)

Primary Examiner — Evelyn A. Lester
(74) Attorney, Agent, or Firm — Yakov Sidorin, Esq.; Quarles & Brady LLP

(57) ABSTRACT

An electrochromic element comprises a first substrate having a first surface and a second surface opposite the first surface, a second substrate in spaced-apart relationship to the first substrate and having a third surface facing the second surface and a fourth surface opposite the third surface, and an electrochromic medium located between the first and second substrates, wherein the electrochromic medium has a light transmittance that is variable upon application of an electric field thereto. The electrochromic element further comprises a transparent electrode layer covering at least a portion of at least a select one of the first surface, the second surface, the third surface, and the fourth surface, wherein the transparent electrode layer comprises an insulator/metal/insulator stack. The materials utilized to construct the insulator/metal/insulator stack are selected to optimize optical and physical properties of the electrochromic element such as reflectivity, color, electrical switch stability, and environmental durability.

52 Claims, 17 Drawing Sheets

U.S. PATENT DOCUMENTS

| | | | |
|---|---|---|---|
| 4,803,599 A | 2/1989 | Trine et al. |
| 4,827,086 A | 5/1989 | Rockwell |
| 4,855,550 A | 8/1989 | Schultz, Jr. |
| 4,859,813 A | 8/1989 | Rockwell |
| 4,902,108 A | 2/1990 | Byker |
| 5,014,167 A | 5/1991 | Roberts |
| 5,016,996 A | 5/1991 | Ueno |
| 5,017,903 A | 5/1991 | Krippelz, Sr. |
| 5,052,163 A | 10/1991 | Czekala |
| 5,059,015 A | 10/1991 | Tran |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,151,824 A | 9/1992 | O'Farrell et al. |
| 5,158,638 A | 10/1992 | Osanami et al. |
| 5,177,031 A | 1/1993 | Buchmann et al. |
| 5,207,492 A | 5/1993 | Roberts |
| 5,239,406 A | 8/1993 | Lynam |
| 5,253,109 A | 10/1993 | O'Farrell et al. |
| 5,293,546 A | 3/1994 | Tadros et al. |
| 5,313,335 A | 5/1994 | Gray et al. |
| 5,355,284 A | 10/1994 | Roberts |
| 5,361,190 A | 11/1994 | Roberts et al. |
| 5,371,659 A | 12/1994 | Pastrick et al. |
| 5,379,146 A | 1/1995 | Defendini |
| 5,402,103 A | 3/1995 | Tashiro |
| 5,408,353 A * | 4/1995 | Nichols et al. ............... 359/275 |
| 5,436,741 A | 7/1995 | Crandall |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,523,877 A | 6/1996 | Lynam |
| 5,528,422 A | 6/1996 | Roberts |
| 5,587,699 A | 12/1996 | Faloon et al. |
| 5,610,380 A | 3/1997 | Nicolaisen |
| 5,619,374 A | 4/1997 | Roberts |
| 5,619,375 A | 4/1997 | Roberts |
| 5,632,551 A | 5/1997 | Roney et al. |
| 5,649,756 A | 7/1997 | Adams et al. |
| 5,668,663 A | 9/1997 | Varaprasad et al. |
| 5,669,699 A | 9/1997 | Pastrick et al. |
| 5,669,704 A | 9/1997 | Pastrick |
| 5,669,705 A | 9/1997 | Pastrick et al. |
| 5,718,980 A | 2/1998 | Koch et al. |
| 5,724,187 A | 3/1998 | Varaprasad et al. |
| 5,748,172 A | 5/1998 | Song et al. |
| D394,833 S | 6/1998 | Muth |
| 5,788,357 A | 8/1998 | Muth et al. |
| 5,790,298 A | 8/1998 | Tonar |
| 5,796,176 A | 8/1998 | Kramer et al. |
| 5,798,575 A | 8/1998 | O'Farrell et al. |
| 5,818,625 A | 10/1998 | Forgette et al. |
| 5,823,654 A | 10/1998 | Pastrick et al. |
| 5,825,527 A | 10/1998 | Forgette et al. |
| 5,863,116 A | 1/1999 | Pastrick et al. |
| 5,864,419 A | 1/1999 | Lynam |
| 5,879,074 A | 3/1999 | Pastrick |
| D409,540 S | 5/1999 | Muth |
| 5,923,457 A | 7/1999 | Byker et al. |
| 5,938,320 A | 8/1999 | Crandall |
| 5,959,367 A | 9/1999 | O'Farrell et al. |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| 6,062,920 A | 5/2000 | Jordan et al. |
| 6,064,508 A | 5/2000 | Forgette et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,099,155 A | 8/2000 | Pastrick et al. |
| 6,102,546 A | 8/2000 | Carter |
| 6,111,683 A | 8/2000 | Cammenga et al. |
| 6,111,684 A | 8/2000 | Forgette et al. |
| 6,111,685 A | 8/2000 | Tench et al. |
| 6,124,886 A | 9/2000 | DeLine et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,163,083 A | 12/2000 | Kramer et al. |
| 6,166,848 A | 12/2000 | Cammenga et al. |
| 6,170,956 B1 | 1/2001 | Rumsey et al. |
| 6,175,164 B1 | 1/2001 | O'Farrell et al. |
| 6,176,602 B1 | 1/2001 | Pastrick et al. |
| 6,195,194 B1 | 2/2001 | Roberts et al. |
| 6,206,553 B1 | 3/2001 | Boddy et al. |
| 6,227,689 B1 | 5/2001 | Miller |
| 6,239,899 B1 | 5/2001 | DeVries et al. |
| 6,244,716 B1 | 6/2001 | Steenwyk et al. |
| 6,249,369 B1 | 6/2001 | Theiste et al. |
| 6,257,746 B1 | 7/2001 | Todd et al. |
| 6,264,353 B1 | 7/2001 | Carraher et al. |
| 6,276,821 B1 | 8/2001 | Pastrick et al. |
| 6,280,069 B1 | 8/2001 | Pastrick et al. |
| 6,296,379 B1 | 10/2001 | Pastrick |
| 6,299,333 B1 | 10/2001 | Pastrick et al. |
| 6,301,039 B1 | 10/2001 | Tench |
| 6,317,248 B1 | 11/2001 | Agrawal et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,347,880 B1 | 2/2002 | Furst et al. |
| 6,356,376 B1 | 3/2002 | Tonar et al. |
| 6,379,013 B1 | 4/2002 | Bechtel et al. |
| 6,407,468 B1 | 6/2002 | LeVesque et al. |
| 6,407,847 B1 | 6/2002 | Poll et al. |
| 6,420,800 B1 | 7/2002 | Levesque et al. |
| 6,426,568 B2 | 7/2002 | Turnbull et al. |
| 6,441,943 B1 | 8/2002 | Roberts et al. |
| 6,441,963 B2 | 8/2002 | Murakami et al. |
| 6,471,362 B1 | 10/2002 | Carter et al. |
| 6,512,203 B2 | 1/2003 | Jones et al. |
| 6,606,183 B2 | 8/2003 | Ikai et al. |
| 6,614,579 B2 | 9/2003 | Roberts et al. |
| 6,621,616 B1 | 9/2003 | Bauer et al. |
| 6,639,360 B2 | 10/2003 | Roberts et al. |
| 6,650,457 B2 | 11/2003 | Busscher et al. |
| 6,679,608 B2 | 1/2004 | Bechtel et al. |
| 6,700,692 B2 | 3/2004 | Tonar et al. |
| 6,737,629 B2 | 5/2004 | Nixon et al. |
| 6,749,308 B1 | 6/2004 | Niendorf et al. |
| 6,755,542 B2 | 6/2004 | Bechtel et al. |
| 6,805,474 B2 | 10/2004 | Walser et al. |
| 6,831,268 B2 | 12/2004 | Bechtel et al. |
| 6,849,165 B2 | 2/2005 | Kloppel et al. |
| 6,870,656 B2 | 3/2005 | Tonar et al. |
| 6,928,366 B2 | 8/2005 | Ockerse et al. |
| 7,064,882 B2 | 6/2006 | Tonar et al. |
| 7,154,657 B2 | 12/2006 | Poll et al. |
| 7,255,451 B2 | 8/2007 | McCabe et al. |
| 7,274,501 B2 | 9/2007 | McCabe et al. |
| 7,287,868 B2 | 10/2007 | Carter et al. |
| 2002/0126497 A1 | 9/2002 | Pastrick |
| 2002/0154379 A1 | 10/2002 | Tonar et al. |
| 2002/0171906 A1 | 11/2002 | Busscher et al. |
| 2004/0028955 A1 | 2/2004 | Hoffman |
| 2004/0061920 A1 | 4/2004 | Tonar et al. |
| 2004/0086717 A1 | 5/2004 | Sasaki et al. |
| 2004/0095632 A1 | 5/2004 | Busscher et al. |
| 2004/0124416 A1 | 7/2004 | Knipp et al. |
| 2005/0007645 A1 | 1/2005 | Tonar et al. |
| 2005/0099693 A1 | 5/2005 | Schofield et al. |
| 2005/0195488 A1 | 9/2005 | McCabe et al. |

| | | | |
|---|---|---|---|
| 2005/0264891 A1 | 12/2005 | Uken et al. | |
| 2005/0286132 A1 | 12/2005 | Tonar et al. | |
| 2006/0001726 A1 | 1/2006 | Kodas et al. | |
| 2007/0002422 A1 | 1/2007 | O'Shaughnessy | |
| 2007/0014020 A1 | 1/2007 | Bourdelais et al. | |
| 2008/0073557 A1 | 3/2008 | German et al. | |
| 2009/0067032 A1 | 3/2009 | Varaprasad et al. | |

FOREIGN PATENT DOCUMENTS

| | | |
|---|---|---|
| DE | 6940469 T2 | 3/1998 |
| EP | 0240226 | 10/1987 |
| EP | 0450162 | 12/1990 |
| EP | 0531143 | 3/1993 |
| EP | 0726579 | 8/1996 |
| EP | 0728618 | 8/1996 |
| EP | 1628310 | 2/2005 |
| GB | 2161440 | 1/1986 |
| WO | WO 8902135 | 3/1989 |
| WO | WO 9530495 | 11/1995 |
| WO | WO 9940039 | 8/1999 |
| WO | WO 0030893 | 6/2000 |
| WO | WO 03103338 | 12/2003 |
| WO | WO 2007005368 | 1/2007 |

OTHER PUBLICATIONS

EPO, Automated translation of reference HL submitted herewith, as provided by EPO.

International Searching Authority, International Preliminary Report on Patentability, dated Sep. 9, 2008, in international application No. PCT/US07/05494.

International Searching Authority, International Search Report, dated Feb. 6, 2008, in international application No. PCT/US07/05638.

International Searching Authority, International Search Report, dated Apr. 2, 2008, in international application No. PCT/US/05520.

International Searching Authority, International Search Report, dated Sep. 27, 2008, in international application No. PCT/US08/71875.

Beate Giffo-Schmitt, Authorized Officer, International Preliminary Report on Patentability in application No. PCT/US2007/005520, mailed Sep. 18, 2008, WIPO, 10 pages.

Stollenwerk et al., Transparent Conductive Multilayer-Systems for FPD Applications in Digest of Technical Papers, pp. 111-112, 1995 Display Manufacturing Technology Conference, Society for Information Display, Santa Clara, California, Jan. 31-Feb. 2, 1995.

Martin Wahl, Authorized Officer, Supplementary European Search Report & Written Opinion, in related European patent application EP 07752210, dated Sep. 21, 2010; 7 pages.

Martin Wahl, Authorized Officer, Supplementary European Search Report & Written Opinion, in related European patent application EP 07752348, dated Sep. 20, 2010; 14 pages.

U.S. Appl. No. 11/833,701, filed Aug. 3, 2007, Improved Thin-Film Coatings, Electro-Optic Elements and Assemblies Incorporating These Elements, Tonar et al.

PCT/US08/71875, Aug. 1, 2008, Improved Thin-Film Coatings, Electro-Optic Elements and Assemblies Incorporating These Elements, Tonar et al.

U.S. Appl. No. 11/713,849, filed Mar. 5, 2007, Improved Thin-Film Coatings, Electro-Optic Elements and Assemblies Incorporating These Elements, Tonar et al.

PCT/US07/005494, Mar. 2, 2007, Improved Thin-Film Coatings, Electro-Optic Elements and Assemblies Incorporating These Elements, Tonar et al.

U.S. Appl. No. 11/682,098, filed Mar. 5, 2007, Electro-Optical Element Including Metallic Films and Methods, Dozeman et al.

PCT/US07/005520, Mar. 5, 2007, Electro-Optical Element Including Metallic Films and Methods for Applying the Same, Dozeman et al.

PCT/US07/005638, Mar. 5, 2007, Electro-Optical Element Including IMI Coatings, George A. Neuman et al.

U.S. Appl. No. 10/863,638, filed Jun. 8, 2004, Rearview Mirror Element Having a Circuit Mounted to the Rear Surface of the Element, Frederick Bauer et al.

U.S. Appl. No. 11/682,121, filed Mar. 5, 2007, Electro-Optical Element Including IMI Coatings, Neuman et al.

European Search Report and Written Opinion in European patent application No. EP11190773.9; 10 pages.

* cited by examiner

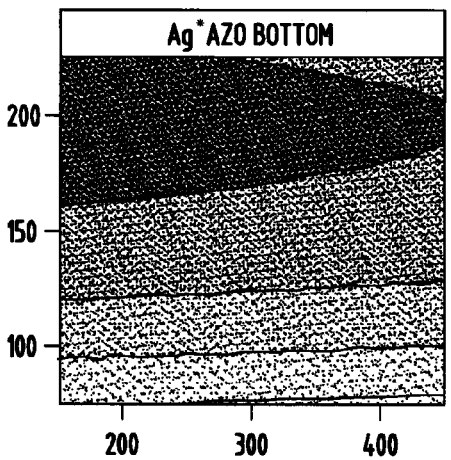
FIG. 6A
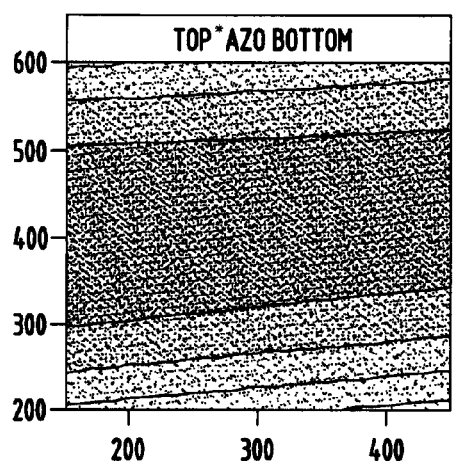
FIG. 6B
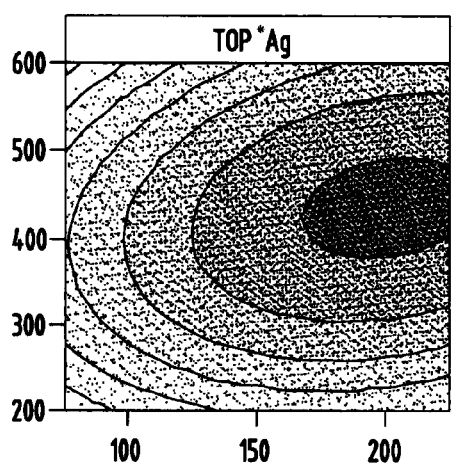
FIG. 6C
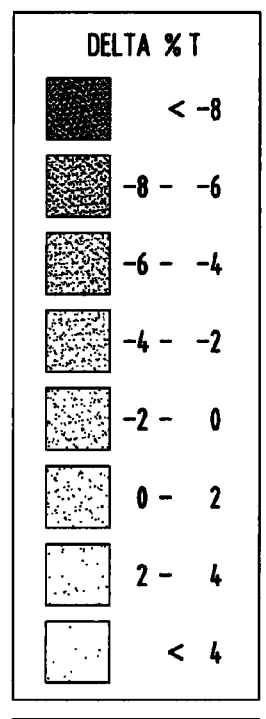

ELECTRO-OPTICAL ELEMENT INCLUDING IMI COATINGS

CROSS REFERENCE TO RELATED APPLICATIONS

This application is a continuation-in-part of U.S. patent application Ser. No. 11/682,121 filed on Mar. 5, 2007 now U.S. Pat. No. 7,830,583 and now published as U.S. 2007/0206263, which claims the benefit of U.S. Provisional Applications Ser. Nos. 60/779,369 filed on Mar. 3, 2006 and Ser. No. 60/810,921 filed on Jun. 5, 2006. Each of the above-mentioned applications is incorporated herein by reference in its entirety.

BACKGROUND OF THE INVENTION

This invention relates to electrochromic elements as utilized within rearview mirror assemblies for motor vehicles, as well as within window assemblies, and more particularly, to improved electrochromic elements for use within such assemblies. More particularly, the present invention relates to electrochromic elements that comprise transparent electrode layers that include insulator/metal/insulator stacks.

Heretofore, various rearview mirrors for motor vehicles have been proposed which change from the full reflectance mode (day) to the partial reflectance mode(s) (night) for glare-protection purposes from light emanating from the headlights of vehicles approaching from the rear. Similarly, variable transmittance light filters have been proposed for use in architectural windows, skylights, within windows, sunroofs, and rearview mirrors for automobiles, as well as for windows or other vehicles such as aircraft windows. Among such devices are those wherein the transmittance is varied by thermochromic, photochromic, or electro-optic means (e.g., liquid crystal, dipolar suspension, electrophoretic, electrochromic, etc.) and where the variable transmittance characteristic affects electromagnetic radiation that is at least partly in the visible spectrum (wavelengths from about 3800 Å to about 7800 Å). Devices of reversibly variable transmittance to electromagnetic radiation have been proposed as the variable transmittance element in variable transmittance light-filters, variable reflectance mirrors, and display devices, which employ such light-filters or mirrors in conveying information.

Devices of reversibly variable transmittance to electromagnetic radiation, wherein the transmittance is altered by electrochromic means, are described, for example, by Chang, "Electrochromic and Electrochemichromic Materials and Phenomena," in *Non-emissive Electrooptic Displays*, A. Kmetz and K. von Willisen, eds. Plenum Press, New York, N.Y. 1976, pp. 155-196 (1976) and in various parts of *Electrochromism*, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656. In addition to these devices, there are commercially available electrochromic devices and associated circuitry, such as those disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosure of each, including the references contained therein, is being incorporated herein by reference in its entirety. In addition, the present disclosure also refers to U.S. patent Ser. No. 12/832,838; U.S. Pat. Nos. 4,902,108; 5,128,799; 5,278,693; 5,280,380; 5,282,077; 5,294,376; and 5,336,448; 6,020,987; 5,990,469; 6,008,486; 6,130,421; 6,130,448; 6,255,639; 6,049,171; 5,837,994; 6,403,942; 6,281,632; 6,291,812; 6,469,739; 6,399,049; 6,465,963; 6,587,573; 6,429,594; 6,379,013; 6,871,809; 6,774,988; 6,244,716; 6,523,976; 6,521,916; 6,441,943; 6,335,548; 6,132,072; 5,803,579; 6,229,435; 6,504,142; 6,402,328; 6,379,013; 6,359,274; 5,151,824; 6,244,716; 6,426,485; 6,441,943; 6,356,376; 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527, 6,111,684 and 5,998,617 and U.S. Provisional Patent Application No. 60/404,879. Each of these documents is also being incorporated herein in its entirety by their reference. All the above-mentioned patent documents may be collectively referred to herein as "Our Prior Applications". Such electrochromic devices may be utilized in a fully integrated inside/outside rearview mirror system or as separate inside or outside rearview mirror systems, and/or variable transmittance windows.

FIG. 1 shows the cross-section of a typical electrochromic mirror device 10, having a front planar substrate 12 and a rear planar substrate, and of which the general layout is known. A transparent conductive coating 14 is provided on the rear face of the front element 12, and another transparent conductive coating 18 is provided on the front face of rear element 16. A reflector 20, typically comprising a silver metal layer 20a covered by a protective copper metal layer 20b, and one or more layers of protective paint 20c, is disposed on the rear face of the rear element 16. For clarity of description of such a structure, the front surface 12a of the front glass element 12 is sometimes referred to as the first surface, and the inside surface 12b of the front glass element 12 is sometimes referred to as the second surface, the inside surface 16a of the rear glass element 16 is sometimes referred to as the third surface, and the back surface 16b of the rear glass element 16 is sometimes referred to as the fourth surface. In the illustrated example, the front glass element further includes an edge surface 12c, while the rear glass element includes an edge surface 16c. The front and rear elements 12,16 are held in a parallel and spaced-apart relationship by seal 22, thereby creating a chamber 26. The electrochromic medium 24 is contained in space or chamber 26. The electrochromic medium 24 is in direct contact with transparent electrode layers 14 and 18, through which passes electromagnetic radiation whose intensity is reversibly modulated in the device by a variable voltage or potential applied to electrode layers 14 and 18 through clip contacts and an electronic circuit (not shown).

The electrochromic medium 24 placed in chamber 26 may include surface-confined, electrode position-type or solution-phase-type electrochromic materials and combinations thereof. In an all solution-phase medium, the electrochemical properties of the solvent, optional inert electrolyte, anodic materials, cathodic materials, and any other components that might be present in the solution are preferably such that no significant electrochemical or other changes occur at a potential difference which oxidizes anodic material and reduces the cathodic material other than the electrochemical oxidation of the anodic material, electrochemical reduction of the cathodic material, and the self-erasing reaction between the oxidized form of the anodic material and the reduced form of the cathodic material.

In most cases, when there is no electrical potential difference between transparent conductors 14 and 18, the electrochromic medium 24 in chamber 26 is essentially colorless or nearly colorless, and incoming light ($I_o$) enters through the front element 12, passes through the transparent coating 14, the electrochromic medium 24 in chamber 26, the transparent coating 18, the rear element 16, and reflects off the layer 20a and travels back through the device and out the front element 12. Typically, the magnitude of the reflected image ($I_R$) with no electrical potential difference is about 45 percent to about 85 percent of the incident light intensity ($I_o$). The exact value depends on many variables outlined below, such as, for example, the residual reflection ($I'_R$) from the front face of the front element, as well as secondary reflections from the interfaces between the front element 12 and the front transparent electrode 14, the front transparent electrode 14 and the electrochromic medium 24, the electrochromic medium 24 and the second transparent electrode 18, and the second transparent electrode 18 and the rear element 16. These reflections are well known in the art and are due to the difference in refractive indices between one material and another as the light crosses the interface between the two. If the front element and the back element are not parallel, then the residual reflectance ($I'_R$) or other secondary reflections will not superimpose with the reflected image ($I_R$) from mirror surface 20a, and a double image will appear (where an observer would see what appears to be double (or triple) the number of objects actually present in the reflected image).

There are minimum requirements for the magnitude of the reflected image depending on whether the electrochromic mirrors are placed on the inside or the outside of the vehicle. For example, according to current requirements from most automobile manufacturers, inside mirrors preferably have a high end reflectivity of at least 40 percent, and outside mirrors must have a high end reflectivity of at least 35 percent.

The electrode layers 14 and 18 are connected to electronic circuitry which is effective to electrically energize the electrochromic medium, such that when a potential is applied across the conductors 14 and 18, the electrochromic medium in chamber 26 darkens, such that incident light ($I_o$) is attenuated as the light passes toward the reflector 20a and as it passes back through after being reflected. By adjusting the potential difference between the transparent electrodes, such a device can function as a "gray-scale" device, with continuously variable transmittance over a wide range. For solution-phase electrochromic systems, when the potential between the electrodes is removed or returned to zero, the device spontaneously returns to the same, zero-potential, equilibrium color and transmittance as the device had before the potential was applied. Other electrochromic materials are available for making electrochromic devices. For example, the electrochromic medium may include electrochromic materials that are solid metal oxides, redox active polymers, and hybrid combinations of solution-phase and solid metal oxides or redox active polymers; however, the above-described solution-phase design is typical of most of the electrochromic devices presently in use.

Even before a fourth surface reflector electrochromic mirror such as that shown in FIG. 1 was commercially available, various groups researching electrochromic devices had discussed moving the reflector from the fourth surface to the third surface. Such a design has advantages in that it should, theoretically, be easier to manufacture because there are fewer layers to build into a device, i.e., the third surface transparent electrode is not necessary when there is a third surface reflector/electrode. Although this concept was described as early as 1966, no group had commercial success because of the exacting criteria demanded from a workable auto-dimming mirror incorporating a third surface reflector. U.S. Pat. No. 3,280,701, entitled "OPTICALLY VARIABLE ONE-WAY MIRROR," issued Oct. 25, 1966, to J. F. Donnelly et al. has one of the earliest discussions of a third surface reflector for a system using a pH-induced color change to attenuate light.

U.S. Pat. No. 5,066,112, entitled "PERIMETER COATED, ELECTRO-OPTIC MIRROR," issued Nov. 19, 1991, to N. R. Lynam et al., teaches an electro-optic mirror with a conductive coating applied to the perimeter of the front and rear glass elements for concealing the seal. Although a third surface reflector is discussed therein, the materials listed as being useful as a third surface reflector suffer from the deficiencies of not having sufficient reflectivity for use as an inside mirror, and/or not being stable when in contact with a solution-phase electrochromic medium containing at least one solution-phase electrochromic material.

Others have broached the topic of a reflector/electrode disposed in the middle of an all solid state-type device. For example, U.S. Pat. Nos. 4,762,401, 4,973,141, and 5,069,535 to Baucke et al. teach an electrochromic mirror having the following structure: a glass element, a transparent indium-tin-oxide electrode, a tungsten oxide electrochromic layer, a solid ion conducting layer, a single layer hydrogen ion-permeable reflector, a solid ion conducting layer, a hydrogen ion storage layer, a catalytic layer, a rear metallic layer, and a back element (representing the conventional third and fourth surface). The reflector is not deposited on the third surface and is not directly in contact with electrochromic materials, certainly not at least one solution-phase electrochromic material and associated medium. Consequently, it is desirable to provide an improved high reflectivity electrochromic rearview mirror having a third surface reflector/electrode in contact with a solution-phase electrochromic medium containing at least one electrochromic material. Electrochromic windows that have been proposed, typically include an electrochromic cell similar to that shown in FIG. 1, but without layer 20a, 20b and 20c.

While the adaptation of a reflective third surface electrochromic device has assisted in solving many problems, numerous deficiencies within these elements still exist. Various attempts have been made to provide an electrochromic element with a second surface transparent conductive oxide that is relatively low cost without sacrificing optical and physical characteristics, such as reflectivity, color, electrical switch stability, and environmental durability. While previous approaches have focused on indium tin oxide layers, these attempts have not effectively solved the myriad of problems noted above. Specifically, several issues support the development of transparent conductor alternatives to indium-tin oxide. For example, rapid switching electrochromic devices require low sheet resistance materials on both sides of the associated cell. Large electrochromic cells are particularly sensitive to sheet resistance, while high sheet resistance conductors lead to significant potential drops across the conductor surfaces. These spatial potential drops reduce the local current density and slow the color change in the affected area leading to effects such as irising. Other inherent difficulties and failures associated with previous electrochromic systems are set forth herein.

It is therefore desirable to provide an electrochromic element that includes a transparent electrode whose components reduce the overall cost of the electrochromic element without sacrificing optical and physical characteristics, such as reflectivity, color, electrical switch stability, environmental durability and the like.

SUMMARY OF THE INVENTION

One aspect of the present invention is an electrochromic element comprising a first substrate having a first surface and a second surface opposite the first surface, a second substrate in spaced-apart relationship to the first substrate and having a third surface facing the second surface and a fourth surface opposite the third surface, and an electrochromic medium located between the first and second substrates, wherein the electrochromic medium has a light transmittance that is variable upon the application of an electric field thereto. The electrochromic element further comprises a transparent electrode layer covering at least a portion of at least a select one of the second surface and the third surface, wherein the transparent electrode layer comprises a first insulator layer, at least one metal layer, and a second insulator layer, and wherein the electrochromic element displays a color rendering index of greater than or equal to 80.

Another aspect of the present invention includes an electrochromic element comprising a first substrate having a first surface and a second surface opposite the first surface, a second substrate in spaced-apart relationship to the first substrate and having a third surface facing the second surface and a fourth surface opposite the third surface, and an electrochromic medium located between the first and second substrates, wherein the electrochromic medium has a light transmittance that is variable upon the application of an electric field thereto. The electrochromic element further comprises a transparent electrode layer covering at least a portion of at least a select one of the second surface and the third surface, wherein the transparent electrode layer comprises a first insulator layer, at least one metal layer, and a second insulator layer, and wherein at least a select one of the first insulator layer and the second insulator layer comprises at least a select one of indium tin oxide, indium zinc oxide, aluminum zinc oxide, titanium oxide, CeOx, tin dioxide, silicon nitride, silicon dioxide, ZnS, chromium oxide, niobium oxide, ZrOx, WO3, nickel oxide, IRO2, and combinations thereof.

Yet another aspect of the present invention is an electrochromic element that comprises a first substrate having a first surface and a second surface opposite the first surface, a second substrate in spaced-apart relationship to the first substrate and having a third surface facing the second surface and a fourth surface opposite the third surface, and an electrochromic medium located between the first and second substrates, wherein the electrochromic medium has a light transmittance that is variable upon the application of an electric field thereto. The electrochromic element further comprises a transparent electrode layer covering at least a portion of at least a select one of the second surface and the third surface, wherein the transparent electrode layer comprises a first insulator layer, a metal layer, and a second insulator layer, and wherein at least one of the first insulator layer and the second insulator layer and at least one barrier layer between an insulator layer and the metal layer wherein the barrier layer comprises at least a select one gold, ruthenium, rodium, palladium, cadmium, copper, nickel, platinum, iridium, and combinations thereof.

Still yet another aspect of the present invention is an electrochromic element that comprises a first substrate having a first surface and a second surface opposite the first surface, a second substrate in spaced-apart relationship to the first substrate and having a third surface facing the second surface and a fourth surface opposite the third surface, and an electrochromic medium located between the first and second substrates, wherein the electrochromic medium has a light transmittance that is variable upon the application of an electric field thereto. The electrochromic element further comprises a transparent electrode layer covering at least a portion of at least a select one of the second surface and the third surface, wherein the transparent electrode layer comprises a first insulator layer, a metal layer, and a second insulator layer, and wherein the metal layer comprises silver and at least one of the first insulator layer and the second insulator layer comprises indium tin oxide, indium zinc oxide, aluminum zinc oxide, titanium oxide, CeOx, tin dioxide, silicon nitride, silicon dioxide, ZnS, chromium oxide, niobium oxide, ZrOx, WO3, nickel oxide, IRO2, and combinations thereof.

Still yet another aspect of the present invention is a method for manufacturing an electrochromic element, wherein the method comprises providing a first substrate having a first surface and a second surface opposite the first surface, providing a second substrate having a third surface facing the second surface and a fourth surface opposite the third surface, and applying a transparent electrode layer to at least a second one of the second surface and the third surface, wherein the transparent electrode layer comprises a first insulator layer, a metal layer, and second insulator layer. The method further includes applying an epoxy to at least a select one of the second surface and the third surface, and sealing the first substrate to the second substrate by applying an infrared radiation to the epoxy, wherein the minimum wavelength of the infrared radiation is 2.5 μm.

The present inventive electrochromic element includes a transparent electrode whose components reduce the overall cost of the electrochromic element without sacrificing optical and physical characteristics, such as reflectivity, color, electrical switch stability, environmental durability and the like. Moreover, the inventive electrochromic element is relatively easy to manufacture, assists in providing a robust manufacturing process, provides versatility in selection of components utilized in constructing insulator/metal/insulator stacks, and allows tailored construction thereof to achieve particular optical and physical properties.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3 is an enlarged cross-sectional view of an electrochromic mirror incorporating a third surface reflector/electrode taken along the line FIG. 2;

FIG. 4 is a further enlarged cross-sectional view of a transparent electrode of the area IV, FIG. 3;

FIG. 6A-6C are graphs of difference in transmittance between and IMI with air and EC fluid as the incident media for different combinations of layer thickness in a 3-layer IMI stack;

FIGS. 12(G,H) illustrate distribution of a figure of merit (FOM) characterizing the coating embodiments of FIG. 12B, actual value and value normalized to the thickness of a coating, respectively.

DETAILED DESCRIPTION OF THE PREFERRED EMBODIMENTS

Figure 1:
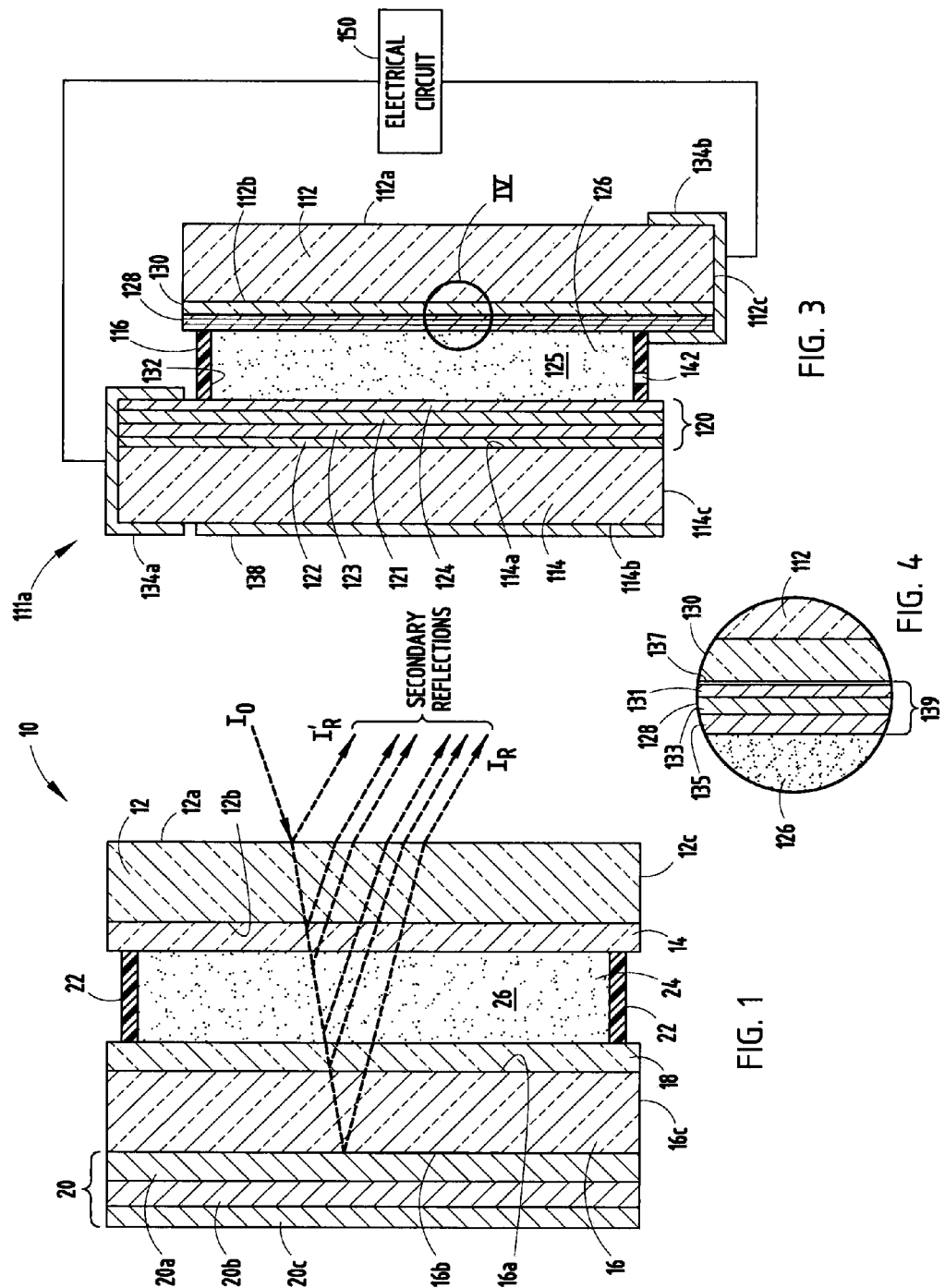
FIG. 1 is an enlarged cross-sectional view of a prior art electrochromic mirror assembly incorporating a fourth surface reflector.

Definitions. As used in this description and the accompanying claims, the following terms shall have the meanings indicated, unless the context requires otherwise:

The spectrum of light reflected (and that of light transmitted) by an embodiment of the mirror system of the invention can be tuned or modified by adjusting the thickness of the reflectance-enhancing layers. The peak reflectance will vary with optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. According to the L*a*b* quantification scheme, L* represents brightness, a* is a color coordinate that denotes the color gamut ranging from red (positive a*) to green (negative a*), and b* is a color coordinate that denotes the color gamut ranging from yellow to blue (positive and negative values of b*, respectively). As used in this application, Y (sometimes also referred to as Cap Y), represents the overall reflectance weighted to the human eye's sensitivity to visible light. For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a value Y from the 1964 CIE Standard (10 degree observer) since it corresponds more closely to the spectral reflectance than L*. The value of "color magnitude", or C*, is defined as $C^*=\sqrt{(a^*)^2+(b^*)^2}$ and provides a measure for quantifying color neutrality. The metric of "color difference", or $\Delta C^*$ is defined as $\Delta C^*=\sqrt{(a^*-a^{*'})^2+(b^*-b^{*'})^2}$, where (a*,b*) and (a*',b*') describe color of light obtained in two different measurements. An additional CIELAB metric is defined as $\Delta E^*=(\Delta a^{*2}+\Delta b^{*2}+\Delta L^{*2})^{1/2}$. The color values described herein are based, unless stated otherwise, on the CIE Standard D65 illuminant and the 10-degree observer.

As broadly used and described herein, the reference to an electrode or layer as being "carried" on or applied to a surface of an element, refers to both electrodes or layers that are disposed directly on the surface of an element or disposed on another coating, layer or layers that are disposed directly on the surface of the element.

Numbering of structural surfaces. In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

The following disclosure describes embodiments of the invention with reference to the corresponding drawings, in which like numbers represent the same or similar elements wherever possible. In the drawings, the depicted structural elements are not to scale and certain components are enlarged relative to the other components for purposes of emphasis and understanding. References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
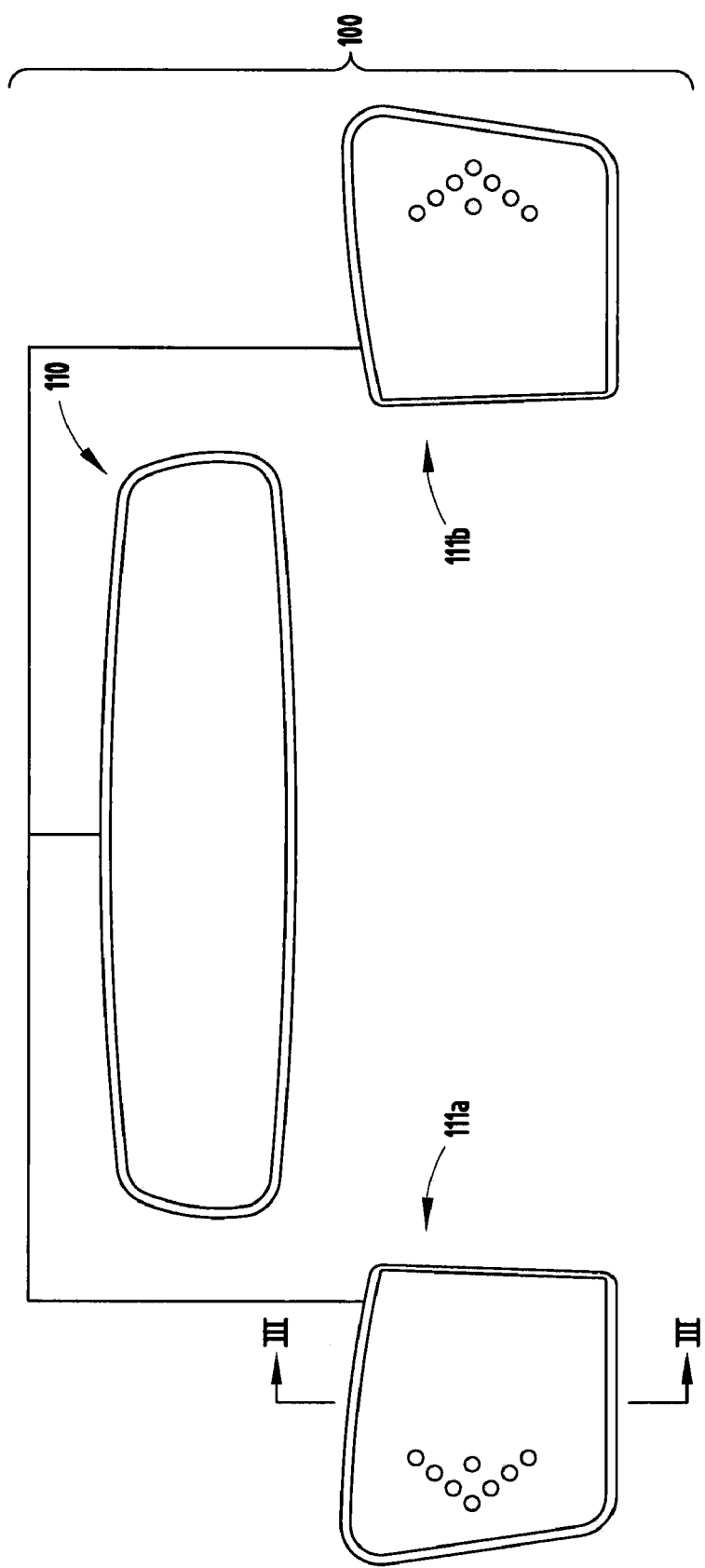
FIG. 2 is a front elevational view schematically illustrating an inside/outside electrochromatic rearview mirror system for motor vehicles.

FIG. 2 shows a front elevational view schematically illustrating a vehicle mirror system 100 that includes an inside mirror assembly 110 and two outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. While mirror assemblies in general are utilized herein to describe the present invention, it is noted that this invention is equally applicable to the construction of electrochromic windows. The inside mirror assembly 110 and the outside rearview mirror assemblies 111a, 111b may incorporate light-sensing electronic circuitry of the type illustrated and described in the above-referenced Canadian Patent No. 1,300,945, U.S. Pat. Nos. 5,204,778, or 5,451,822, and other circuits capable of sensing glare and ambient light and supplying a drive voltage to the electrochromic element. In the illustrated example, electrical circuitry 150 is connected to and allows control of the potential to be applied across the reflector/electrode 120 and transparent electrode 128, such that electrochromic medium 126 will darken and thereby attenuate various amounts of light traveling therethrough and then vary the reflectance of the mirror containing the electrochromic medium 126. The mirror assemblies 110, 111a, 111b are similar in that like numbers identify components of the inside and outside mirrors. These components may be slightly different in configuration, but function in substantially the same manner and obtain substantially the same results as similarly numbered components. For example, the shape of the front glass element of the inside mirror 110 is generally longer and narrower than the outside mirrors 111a, 111b. There are also some different performance standards placed on the inside mirror 110 compared with the outside mirrors 111a, 111b. For example, the inside mirror 110 generally, when fully cleared, should have a reflectance value of about 50 percent to about 85 percent or higher, whereas the outside mirrors often have a reflectance of about 50 percent to about 65 percent. Also, in the United States (as supplied by the automobile manufacturers), the passenger-side mirror 111b typically has a spherically bent or convex shape, whereas the driver-side mirror 111a and the inside mirror 110 presently must be flat. In Europe, the driver-side mirror 111a is commonly flat or aspheric, whereas the passenger-side mirror 111b has a convex shape. In Japan, both of the outside mirrors 111a, 111b have a convex shape. The following description is generally applicable to all mirror assemblies of the present invention, while the general concepts are equally applicable to the construction of electrochromic windows.

FIG. 3 shows a cross-sectional view of the mirror assembly 111a having a front transparent substrate 112 having a front surface 112a and a rear surface 112b, and a rear substrate 114 having a front surface 114a and a rear surface 114b. For clarity of description of such a structure, the following designations will be used hereinafter. The front surface 112a of the front substrate will be referred to as the first surface 112a, and the back surface 112b of the front substrate as the second surface 112b. The front surface 114a of the rear substrate will be referred to as the third surface 114a, and the back surface 114b of the rear substrate as the fourth surface 114b. The front substrate 112 further includes an edge surface 112c, while the rear substrate 114 further includes an edge surface 114c. A chamber 125 is defined by a layer of transparent conductor 128 (carried on the second surface 112b), a reflector/electrode 120 (disposed on the third surface 114a), and an inner circumferential wall 132 of a sealing member 116. An electrochromic medium 126 is contained within the chamber 125.

It is noted that the mirror assembly 111a is described for illustrative purposes only, and that the specific components and elements may be rearranged therein, such as the configuration illustrated in FIG. 1, and those configurations known for electrochromic windows.

The front transparent substrate 112 may be any material which is transparent and has sufficient strength to be able to operate in the conditions, e.g., varying temperatures and pressures, commonly found in the automotive environment. The front substrate 112 may comprise any type of borosilicate glass, soda lime glass, float glass, or any other material, such as, for example, a polymer or plastic, that is transparent in the visible region of the electromagnetic spectrum. The front substrate 112 is preferably a sheet of glass. The rear substrate 114 must meet the operational conditions outlined above, except that it does not need to be transparent in all applications, and therefore may comprise polymers, metals, glass, ceramics, and preferably is a sheet of glass.

The coatings of the third surface 114a are sealably bonded to the coatings on the second surface 112b in a spaced-apart and parallel relationship by the seal member 116 disposed near the outer perimeter of both the second surface 112b and the third surface 114a. The seal member 116 may be any material that is capable of adhesively bonding the coatings on the second surface 112b to the coatings on the third surface 114a to seal the perimeter such that the electrochromic material 126 does not leak from within the chamber 125. Optionally, the layer of transparent conductive coating 128 and the layer of reflector/electrode 120 may be removed over a portion where the seal member 116 is disposed (not the entire portion, otherwise the drive potential could not be applied to the two coatings). In such a case, the seal member 116 must bond well to glass.

The performance requirements for the perimeter seal member 116 used in an electrochromic device are similar to those for a perimeter seal used in a liquid crystal device (LCD), which are well known in the art. The seal 116 must have good adhesion to glass, metals and metal oxides; must have low permeabilities for oxygen, moisture vapor, and other detrimental vapors and indium; and must not interact with or poison the electrochromic or liquid crystal material it is meant to contain and protect. The perimeter seal 116 can be applied by means commonly used in the LCD industry, such as by silk-screening or dispensing. Totally hermetic seals, such as those made with glass frit or solder glass, can be used, but the high temperatures involved in processing (usually near 450° C.) this type of seal can cause numerous problems, such as glass substrate warpage, changes in the properties of transparent conductive electrode, and oxidation or degradation of the reflector. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, New York; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERI-SYS" DDA or DDA accelerated with U-405, 24EMI, U-410, and U-415 available from CVC Specialty Chemicals, Maple Shade, New Jersey; and "AMICURE" PACM, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, 8202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif.

The electrochromic medium 126 is capable of attenuating light traveling therethrough and has at least one solution-phase electrochromic material in intimate contact with the reflector/electrode 120 and at least one additional electro-active material that may be solution-phased, surface-confined, while one that plates out onto a surface. However, the presently preferred medium are solution-phased redox electrochromics, such as those disclosed in U.S. Pat. Nos. 4,902,108; 5,128,799; 5,278,693; 5,280,380; 5,282,077; 5,294,376; and 5,336,448. U.S. Pat. No. 6,020,987 entitled "AN IMPROVED ELECTRO-CHROMIC MEDIUM CAPABLE OF PRODUCING A PRE-SELECTED COLOR, DISCLOSES ELECTRO-CHROMIC MEDIUM THAT ARE PERCEIVED TO BE GREY THROUGH THEIR NORMAL RANGE OF OPERATION." The entire disclosure of this patent is hereby incorporated by reference herein. If a solution-phase electrochromic medium is utilized, it may be inserted into chamber 125 through a sealable fill port 142 through well-known techniques.

It is known in the electrochromic art that a mirror or window may not darken uniformly when an electrical potential is applied to the element. The non-uniform darkening results from local differences in electrical potential across the solid state electrochromic materials, fluid or gel in an electrochromic element. The electrical potential across the element varies with the sheet resistance of the electrodes, the bus bar configuration, the conductivity of the electrochromic medium, the concentration of the electrochromic medium, the cell spacing or distance between the electrodes, and the distances from the bus bars. A commonly proposed solution to this problem is to make the coatings or layers composing the electrodes thicker thus reducing their sheet resistance and enabling a faster darkening element. As will be discussed below there are practical penalties that are imparted that restrict this simplistic approach to solving the problem. In many instances the penalties make an electrochromic element unsuitable for a given application. In at least one embodiment of the present invention improved electrode materials, methods of manufacturing said electrodes and bus bar configurations are described that solve problems that arise with simply thickening the electrode layers and result in electrochromic elements with faster, more uniform darkening characteristics.

In a typical inside mirror the bus bars run parallel to the long dimension. This is to minimize the potential drop across the part between the electrodes. The mirror also typically consists of a high sheet resistance transparent electrode and a lower sheet resistance reflector electrode. The mirror will darken most quickly near the bus bar for the higher sheet resistance electrode and slowest at some intermediate position between the two electrodes. Near the bus bar for the lower sheet resistance electrode will have a darkening rate between these two values. There is a variation in effective electrical potential as one moves between the two bus bars. In the case of two long parallel bus bars that have a relatively short distance between them (distance between the bus bars is less than half the length of the bus bars) the mirror will darken in a "window shade" fashion. This means that the mirror darkens faster near one bus and the darkening appears to move between the two bus bars in a gradual fashion. Typically, the darkening rate is measured at the middle of the part and in the case of a mirror with a width to height ratio greater than 2, any non-uniformities in darkening rate are relatively minor.

As the size of the mirrors increases, and along with it the distance between the bus bars, the relative difference in the darkening rate across the parts also increases. This can be exacerbated when the mirrors are designed for an outside application. The metals that can withstand the rigors of such an environment typically have lower conductivity than metals such as silver or silver alloys that are suitable and common for inside mirror applications. A metal electrode for an outside application may therefore have a sheet resistance up to 6 ohms/sq while an inside mirror may have a sheet resistance of <0.5 ohms/sq. In other outside mirror applications the transparent electrode may be limited in thickness for various optical requirements. The transparent electrode, such as ITO, is often limited to a ½ wave thickness in the most common usage as described in U.S. Patent Application No. 60/888,686, entitled ELECTRO-OPTICAL ELEMENT WITH IMPROVED TRANSPARENT CONDUCTOR, which is incorporated herein by reference. This limitation is due to properties of the ITO discussed herein but also due to the expense associated with making an ITO coating thicker. In other applications the coating is limited to 80% of the ½ wave thickness. Both of these thickness constraints limit the sheet resistance of the transparent electrode to greater than about 12 ohm/sq for a ½ wave and up to 17-18 ohms/sq for a coating that is 80% of a ½ wave coating. The higher sheet resistance of the metal and transparent electrodes results in a slower, less uniform darkening mirror.

The darkening rate may be estimated from an analysis of the electrochromic element in terms of an electrical circuit. The discussion below pertains to coatings that have uniform sheet resistance across the element. The potential at any location between parallel electrodes is simply a function of the sheet resistance of each electrode and the resistance of the electrochromic medium. In Table 1 below, the average potential across the element between the electrodes is presented along with the difference between the maximum and minimum potential. This example is for an element with a 10 cm spacing between the parallel bus bars, a 180 micron cell spacing, a 1.2 volt driving voltage and 100,000 Ohm*cm fluid resistivity. Six combinations of top and bottom electrode sheet resistance are compared.

TABLE 1

|  | Ex: 1 | Ex: 2 | Ex: 3 | Ex: 4 | Ex: 5 | Ex: 6 |
|---|---|---|---|---|---|---|
| Top Plate Sheet Resistance (ohm/sq) | 17 | 17 | 12 | 12 | 9 | 9 |
| Bottom Plate Sheet Resistance (ohm/sq) | 5 | 0.5 | 5 | 0.5 | 5 | 0.5 |
| Distance Between Electrodes (cm) | 10 | 10 | 10 | 10 | 10 | 10 |
| Cell Spacing (um) | 180 | 180 | 180 | 180 | 180 | 180 |
| Fluid Resistivity (Ohm * cm) | 100000 | 100000 | 100000 | 100000 | 100000 | 100000 |
| Driving Potential (V) | 1.2 | 1.2 | 1.2 | 1.2 | 1.2 | 1.2 |
| Finite Element Width (cm) | 1 | 1 | 1 | 1 | 1 | 1 |
| Potential at Anode (V) | 1.168 | 1.197 | 1.168 | 1.197 | 1.168 | 1.197 |
| Potential at Cathode (V) | 1.096 | 1.096 | 1.125 | 1.125 | 1.143 | 1.143 |
| Average Potential (V) | 1.131 | 1.145 | 1.146 | 1.160 | 1.155 | 1.169 |

The speed of darkening is fastest at the electrical contact to the highest sheet resistance electrode and is related to the effective potential at this position. The higher the effective potential adjacent to this electrical contact (or elsewhere) the faster the average darkening of the mirror will be. The fastest overall darkening time will occur when the potential is as high as possible across the part. This will drive the electrochemistry to darken at an accelerated rate. The sheet resistance of the coatings on both the top and bottom substrates plays a role in determining the effective potential between the electrodes, but as can be seen from the table the high sheet resistance electrode plays a more critical role. In past electrochromic art the improvements were driven almost exclusively by lowering the sheet resistance of the low resistance electrode, due to the use of materials such as silver that provided substantive benefits and was relatively easy to implement.

The overall rate can be increased as the driving potential is increased but the trends will be constant independent of the driving voltage. Further, the current draw at a given voltage influences the darkening uniformity. Uniformity can be improved by adjustments to cell spacing, concentration, or choice of electrochromic materials, but often improvements in uniformity using these adjustments can have a negative impact on darkening speed, clearing speed or both darkening and clearing speed. For example, increasing cell spacing and decreasing fluid concentration will decrease the current draw and will thereby improve uniformity, but the clearing time will increase. Therefore, the sheet resistance of the layers must be appropriately set to attain both speed of darkening and uniformity of darkening. Preferably the sheet resistance of the transparent electrode should be less than 11.5 ohms/sq, preferably less than 10.5 ohms/sq and more preferably less than 9.5 ohms/sq and due to the optical requirements discussed below, in some embodiments, the thickness of the transparent electrode should be less than about a half wave optical thickness. Alternatively, the transparent electrode may comprise an IMI type coating. The reflector electrode should be less than about 3 ohms/sq, preferably less than about 2 ohms/sq and most preferably less than 1 ohm/sq. A mirror or electrochromic element so constructed will also have a relatively uniform darkening such that the difference in darkening time between the fastest and slowest darkening rate is less than a factor of 3, preferably less than a factor of 2 and most preferably less than a factor of 1.5. Novel, high-performance, low-cost materials are discussed below that enable these fast, uniform darkening elements.

In other applications it may be impractical to have two relatively parallel bus bars. This may be due to an uneven shape common with outside mirrors. In other circumstance it may be desirable to have a point contact to the low resistance electrode. The point contact may enable the minimization or elimination of the laser deletion line used in some applications. The use of a point contact simplifies or is preferential for some aspects of the mirror construction but it makes it difficult to achieve a relative uniform potential across the part. The elimination of the relatively long bus along the low resistance reflector electrode effectively increases the resistance of the electrode. Therefore, novel combinations of bus bars and coating sheet resistance values are needed to attain fast, uniform darkening.

As noted above one skilled in the art would have anticipated that it would require extremely low sheet resistance values on the metal reflector electrode to enable a point contact scheme. However, it is necessary to have a lower sheet resistance for the transparent electrode to improve the uniformity. Table 2 shows the results of the uniformity experiments. In this test we made solution phase electrochromic elements that were approximately 8 inches wide by 6 inches tall. The benefits of element designs discussed herein pertain predominantly to large elements. A large element is defined as one that has the minimum distance from the edge of any point on the edge of the viewing area to the geometric center is greater than approximately 5 cm. Lack of uniform darkening becomes even more problematic when the distance is greater than approximately 7.5 cm and even more problematic when the distance is greater than approximately 10 cm. The sheet resistance of the transparent electrode (ITO) and the metal reflector were varied as noted in Table 2. Contact was made to the metal electrode with a point contact. A clip contact such as the so called J-clip was used with an Ag paste line approximately 1" long to provide electrical contact to the metal reflector along one of the short length sides of the mirror. Electrical contact was made to the transparent electrode via an Ag paste along the one side opposite the point contact and continuing down one third of the distance along both long sides of the mirror. The darkening time (T5515) was measured at three locations on the mirror. Position 1 is near the point contact, position 2 is at the edge of the transparent electrode bus opposite the point contact and position 3 is at the center of the mirror. The T5515 time (in seconds) is the time it takes the mirror to go from 55% reflectance to 15% reflectance. The max reflectance is the maximum reflectance of the mirror. The delta T5515 is the time difference between either point 1 and point 2 or between point 2 and point 3. This is a measure of the difference in darkening rate between the fastest position and the other two locations on the mirror. As the darkening becomes more uniform these numbers become closer together. The timing factor is the darkening time at a given position divided by the time at the fastest position. This shows the relative scaling of time between the different locations independent of the absolute rate at any given location. As noted above, it is preferred to have a timing factor less than 3 and preferable less than 2 and most preferably less than 1.5. It can be seen from Table 2 that we do not attain a timing factor of 3 when the ITO sheet resistance is at 14 ohms/sq for this particular mirror configuration. All three examples with an ITO with 9 ohms per square have timing factors less than 3. The center of mirror reading is the location that deviates most from the fastest location. A statistical analysis was conducted on this data which revealed unexpectedly that the ITO sheet resistance was the sole factor that contributed to the timing factor. Using the statistical models an ITO sheet resistance of less than about 11.5 ohms/sq is needed to have a timing factor of 3.0 or less for this embodiment. Using the same statistical models the ITO must have a sheet resistance of less than 7 ohms/sq for the timing factor to be less than 2.0 for this mirror configuration. Even though the timing factor is not affected by the sheet resistance of the third surface reflector the overall darkening rate is affected. When the sheet resistance of said reflector is less than or equal to 2 ohms/sq and the ITO is at approximately 9 ohms/sq the darkening rate for this mirror is less than 8 seconds in the center. This value corresponds approximately to a mirror of similar size with a conventional bus arrangement. Therefore, by lowering the sheet resistance of the ITO a point contact is enabled with a relatively high sheet resistance reflector.

TABLE 2

| Reflector ohms/sq | ITO ohm/sq | Measurement Position | Max Reflectance | T5515 | delta T5515 | timing factor |
|---|---|---|---|---|---|---|
| 0.5 | 9 | 1 | 55.3 | 3.7 | 1.3 | 1.6 |
| 0.5 | 9 | 2 | 55.5 | 2.3 | | |
| 0.5 | 9 | 3 | 55.3 | 6.0 | 3.7 | 2.6 |
| 1 | 9 | 1 | 56.0 | 5.4 | 2.3 | 1.7 |
| 1 | 9 | 2 | 56.0 | 3.1 | | |
| 1 | 9 | 3 | 56.0 | 7.2 | 4.1 | 2.3 |
| 2 | 9 | 1 | 55.8 | 5.0 | 1.9 | 1.6 |
| 2 | 9 | 2 | 55.9 | 3.1 | | |
| 2 | 9 | 3 | 55.9 | 7.8 | 4.6 | 2.5 |
| 0.5 | 14 | 1 | 56.5 | 5.6 | 2.8 | 2.0 |
| 0.5 | 14 | 2 | 56.6 | 2.9 | | |
| 0.5 | 14 | 3 | 56.5 | 10.2 | 7.3 | 3.6 |
| 1 | 14 | 1 | 57.6 | 6.8 | 3.4 | 2.0 |
| 1 | 14 | 2 | 57.6 | 3.4 | | |
| 1 | 14 | 3 | 57.5 | 12.2 | 8.8 | 3.6 |
| 2 | 14 | 1 | 57.3 | 8.4 | 4.4 | 2.1 |
| 2 | 14 | 2 | 57.5 | 4.0 | | |
| 2 | 14 | 3 | 57.4 | 14.0 | 9.9 | 3.5 |

The unexpected role of the sheet resistance of the ITO in the uniformity and speed of darkening was expanded on in another set of experiments. In these experiments the length of bus bar contact to the higher sheet resistance electrode, in this example ITO, was extended further down the sides of the mirror and even onto the bottom edge of the mirror in some cases. Table 3 demonstrates the effect on uniformity with changes in bus length. In these tests the element shape and configuration are the same as for Table B above except where noted. The contact percentage is a percentage comparison of the bus bar length of the ITO contact compared to the total length of the perimeter. The bus bar ratio is the length of the ITO contact relative to the small reflector contact of approximately 2 cm or less.

The data from Table 3 show that increasing the bus length of the higher sheet resistance electrode significantly improves uniformity. For the 2 ohm/sq. reflector, increasing the length of the bus contact from 40% to 85% improves the timing factor from 2.4 to 1.7. For the 0.5 ohm/sq reflector, the same change in ITO bus length from 40 to 85% improves the timing factor from 3.2 to 1.2 and significantly improves the darkening rate. It is noted that the element with the lower sheet resistance reflector is generally faster to darken than the comparable 2 ohm/sq. case, but the uniformity of the 0.5 ohm case with a shorter ITO contact is actually worse as demonstrated by the timing factor. The increase bus length to the ITO is particularly helpful for the element with the 0.5 ohm/sq. reflector.

When the contact percentage is increased, the position of the fastest and slowest darkening can change as well. In this example higher contact percentage significantly improves the darkening times at both positions 1 and 3 and the corresponding timing factors.

TABLE 3

| Contact Percentage | Bus Bar Ratio | Reflector ohms/sq | ITO ohm/sq | Measurement Position | Max Reflectance | T5515 | delta T5515 | timing factor |
|---|---|---|---|---|---|---|---|---|
| 85 | 20 | 2 | 9 | 1 | 57.0 | 2.9 | | |
| 85 | 20 | 2 | 9 | 2 | 57.0 | 3.7 | 0.8 | 1.3 |
| 85 | 20 | 2 | 9 | 3 | 57.3 | 4.8 | 1.9 | 1.7 |
| 58 | 13 | 2 | 9 | 1 | 56.6 | 3.4 | | |
| 58 | 13 | 2 | 9 | 2 | 57.2 | 3.5 | 2.2 | 1.0 |
| 58 | 13 | 2 | 9 | 3 | 57.5 | 5.6 | 2.2 | 1.6 |
| 40 | 9 | 2 | 9 | 1 | 56.9 | 8 | 4.6 | 2.4 |
| 40 | 9 | 2 | 9 | 2 | 57.3 | 3.4 | | |
| 40 | 9 | 2 | 9 | 3 | 57.4 | 8.2 | 4.8 | 2.4 |
| 85 | 20 | 0.5 | 9 | 1 | 56.0 | 3 | | |
| 85 | 20 | 0.5 | 9 | 2 | 56.2 | 3 | | |
| 85 | 20 | 0.5 | 9 | 3 | 56.1 | 3.5 | 0.5 | 1.2 |
| 58 | 13 | 0.5 | 9 | 1 | 55.8 | 4 | 1.5 | 1.6 |
| 58 | 13 | 0.5 | 9 | 2 | 56.1 | 2.5 | | |
| 58 | 13 | 0.5 | 9 | 3 | 56.0 | 3.5 | 1 | 1.4 |
| 40 | 9 | 0.5 | 9 | 1 | 55.5 | 8.2 | 5.6 | 3.2 |
| 40 | 9 | 0.5 | 9 | 2 | 55.8 | 2.6 | | |
| 40 | 9 | 0.5 | 9 | 3 | 56.0 | 4.9 | 2.3 | 1.9 |

These experiments demonstrate that when using a short bus with the low sheet resistance electrode it is beneficial to increase the bus length to the opposite electrode to improve uniformity. Ideally, therefore for large mirrors we prefer the ratio of the lengths of the bus bars to be greater than 5:1, preferably greater than 9:1, even more preferably greater than 13:1 and most preferably greater than 20:1 to attain a timing factor below 3. We also find that independent of the length of the smaller bus that uniformity improves by increasing the length of the bus to the higher sheet resistance electrode to acquire a contact percentage preferably greater than approximately 58% and more preferably greater than approximately 85%. Typical large EC mirrors have a contact percentage less than 50%. The examples noted above use ITO as the transparent electrode. Alternatively, an IMI coating as described herein may be used with comparable speed and uniformity results.

A combination reflector/electrode 120 is disposed on the third surface 114a and comprises at least one layer of a reflective material 121 which serves as a mirror reflectance layer and also forms an integral electrode in contact with and in a chemically and electrochemically stable relationship with any constituents in an electrochromic medium. As stated above, the conventional method of building electrochromic devices was to incorporate a transparent conductive material on the third surface as an electrode, and place a reflector on the fourth surface. By combining the "reflector" and "electrode" and placing both on the third surface, several advantages arise which not only make the device manufacture less complex, but also allow the device to operate with higher performance. For example, the combined reflector/electrode 120 on the third surface 114a generally has higher conductivity than a conventional transparent electrode and previously used reflector/electrodes, which allows greater design flexibility. One can either change the composition of the transparent conductive electrode 128 on the second surface 112b to one that has lower conductivity (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductivity transparent electrode can be used on the second surface, such as, for example, ITO, IMI, etc. The combination of the reflector/electrode 120 having high conductivity (corresponding to sheet resistance of less than, for example, 250 Ohms/square, preferably less than 15 Ohms/square) on the third surface 114a and the transparent electrode 128 having high conductivity on the second surface 112b will not only produce an electrochromic device with more even overall coloration, but will also allow for increased speed of coloration and clearing. Furthermore, fourth surface reflector mirror assemblies include two transparent electrodes with relatively low conductivity, and in previously used third surface reflector mirrors there is a transparent electrode and a reflector/electrode with relatively low conductivity and, as such, a long bus bar on the front and rear element to bring current in and out is necessary to ensure adequate coloring speed.

The layer of a transparent electrically conductive material 128 is deposited on the second surface 112b to act as an electrode. The transparent conductive material 128 may be any material which bonds well to front element 112, is resistant to corrosion to any materials within the electrochromic device, resistant to corrosion by the atmosphere, has minimal diffuse or specular reflectance, high light transmission, near neutral coloration, and good electrical conductance.

In the present example, the transparent conductive material 128 includes an insulator 131 proximate the second surface 112b, a metal layer 133, and an insulator layer 135 proximate the electrochromic medium 126, which cooperate to form an insulator/metal/insulator (IMI) stack 139. If desired, an optional layer or layers of a color suppression material 130 may be deposited between the transparent conductive material 128 and the second surface 112b to suppress the reflection of any unwanted portions of the electromagnetic spectrum. Further, a barrier layer 137 may also be incorporated, as discussed below. The materials utilized to construct the insulator/metal/insulator stack are selected to optimize optical and physical properties of the electrochromic element such as reflectivity, color, electrical switch stability and environmental durability.

While the general concept of utilizing an insulator/metal/insulator stack within electrochromic mirror application has been disclosed in U.S. Pat. Nos. 5,239,406; 5,523,877; 5,724,187; 5,818,625; and 5,864,419, these fail to teach specific stack instructions to attain various required properties in order to create a functional and durable electrochromic device utilizing an insulator/metal/insulator transparent electrode.

The description herein details the requirements and properties of necessary for creating the present inventive and useful IMI stack 139. The particular construction of the present inventive IMI stack 139 overcomes many previous shortcomings and problems associated with utilizing an IMI stack within an electrochromic element. The reflectivity of a mirror or the transmittance of a window is directly dependent upon the absorption of the glass coated with a transparent electrode, with the reflectivity of the mirror or window being reduced when the transparent electrode exhibits substantial absorption. If the transmittance of the transparent electrode is low due to reflection losses then a window made with such a transparent electrode will have a low transmittance and potentially unacceptable reflectivity. The transmittance of a TCO will increase when placed in contact with an electrochromic medium with a refractive index higher than air, resulting in a drop in reflectance as well leaving the coated glass with approximately the same absorption. As a result, if a TCO was used in a window the resultant reflectivity will drop and the transmittance will increase relative to the parts in air. However, IMI coatings generally do not behave in this manner. The transmittance of an IMI coating may increase, decrease or stay the same when placed in contact with an electrochromic medium compared to when the IMI coating is in contact with air. Therefore, proper IMI coating construction cannot be generalized and the associated behavior within electrochromic applications calculated as can be done with respect to TCO coatings. The present inventive electrochromic elements incorporate IMI coatings exhibiting a relative high transmittance and low sheet resistance suitable for electrochromic applications. Particularly, the behavior of the coatings as described work exceptionally well within an electrochromic cell as compared to air as virtually all prior art IMI-type coatings have been previously described.

Figure 5:
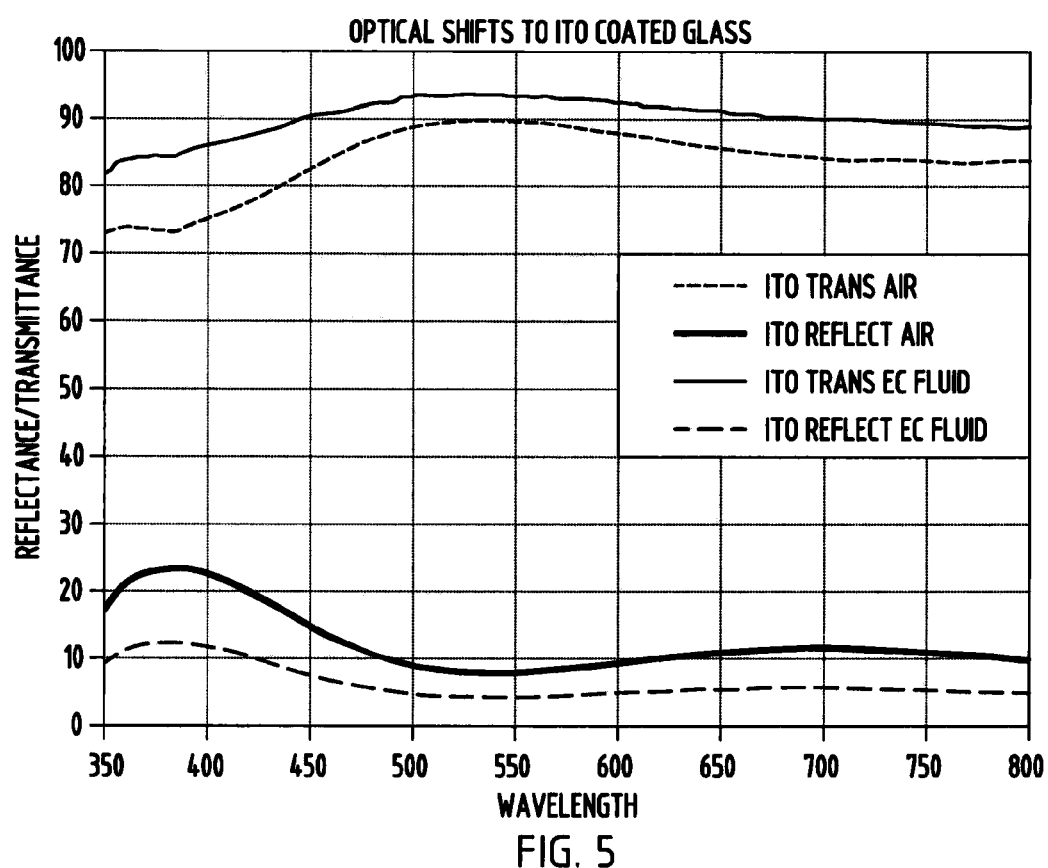
FIG. 5 is a graph of reflectance/transmittance versus wavelength of ITO on glass within an incident medium of air or electrochromic fluid.

As an example, FIG. 5 illustrates the different transmittance of an ITO on glass when the incident medium is air or an electrochromic fluid. In this case, the electrochromic fluid is predominantly composed of propylene carbonate with a refractive index of 1.44 at 550 nm. The dominant reason for the change in transmittance is due to a reduction in the reflectivity. The electrochromic fluid case actually has slightly higher absorption (0.2%) as compared to the air case. However, the change in transmittance between air as compared to electrochromic fluid is not straightforward. An analysis of an IMI stack consisting of glass, a dielectric with an index of 2.0, a silver layer and a top layer also with a refractive index of 2.0 was performed, with the thickness of each dielectric and the silver layers being varied. The change in transmittance between air and the electrochromic fluid was calculated (electrochromic fluid minus air) and the results were statistically analyzed to determine the trends. FIG. 6 illustrates the complex relationships that exist as relatively simple three-layer IMI stack. In each of the contour plots as shown in FIG. 6, two of the layers were varied while the other layer was held constant.

The particular components utilized to construct the present inventive IMI stack 139 assist in increasing the transmittance of the stack, with the refractive index of dieletric layers generally being held as high as possible. The relatively high refractive indices assist in increasing the transmittance of the stack 139 with an appreciable thick silver or silver alloy layer. The need for higher refractive indices for the dielectrics is more critical when the IMI coating is positioned proximate to a relatively high index electrochromic fluid as compared to when this same coating would be placed next to air. The higher refractive indices also assists in attaining a range of colors at relatively high transmittance levels. Preferably, the refractive indices of the dielectric layers are greater than 1.7, more preferably greater than 2.0 and most preferably greater than 2.5.

Table 4 lists the transmittance of a number of stacks that demonstrate the transmittance of the IMI stacks with different dielectric refractive indices and silver thicknesses. The values were calculated with a thin film computer program (TFCalc) as available from Software Spectrum, Inc., of Portland, Oreg. As noted in Table 4, silver thickness was fixed and the dielectrics were optimized to maximize the transmittance. The thickness of the layers in Table 4 are in angstroms. Specifically, dielectrics exhibiting four different refractive indices were used in the models, including titanium oxide, (with two different refractive indices) indium zinc oxide (IZO) and a mixed titanium silicon oxide layer. The titanium dioxide may be doped to increase the electrical bulk resistance. The transmittance is shown with air and electrochromic fluid located proximate to the IMI stack. It is noted that the higher refractive indices provide higher transmittance values and that these high transmittance values are maintained with thicker silver layers, thereby allowing relatively high transparency in a window or high reflectivity in a mirror at lower sheet resistance values. As a result, faster switching times are obtained for the associated electrochromic element. The ability to obtain higher refractive index dielectrics to maintain a high transmittance over a broad range of silver thicknesses also indicates the room to adjust the layers for other attributes such as reflected or transmitted color. The thickness of the dielectrics may also be thinner when the refractive index is higher, thereby translating into a more economical product as well as a more versatile stack. Preferably, the transmittance to be greater than about 50%, more preferably above about 60%, even more preferably above 70%, even more preferably above 80% and most preferably above 90%. If high transmittance is the principle design criteria, the silver layer is preferably less than 300 angstroms in thickness, more preferably less than 200 angstroms, even more preferably less than 150 angstroms, and most preferably less than 100 angstroms.

TABLE 4

Transmittance values for different IMI stacks

| Glass | TiO2High | Ag | TiO2High | PC | TiO2/Air | TiO2/PC | Index |
|---|---|---|---|---|---|---|---|
| | 377 | 50 | 368 | | 81.4 | 89.0 | 2.8 |
| | 345 | 75 | 337 | | 82.6 | 90.0 | |
| | 312 | 100 | 303 | | 84.7 | 91.0 | |
| | 274 | 125 | 265 | | 87.0 | 91.3 | |
| | 252 | 150 | 269 | | 89.1 | 90.2 | |
| | 257 | 175 | 274 | | 89.2 | 87.2 | |
| | 268 | 200 | 272 | | 87.2 | 82.6 | |

| Glass | TiO2 | Ag | TiO2 | PC | TiO2/Air | TiO2/PC | Index |
|---|---|---|---|---|---|---|---|
| | 408 | 50 | 404 | | 84.4 | 91.1 | 2.4 |
| | 372 | 75 | 363 | | 85.7 | 91.7 | |
| | 331 | 100 | 317 | | 87.5 | 92.0 | |
| | 299 | 125 | 300 | | 89.7 | 91.3 | |
| | 302 | 150 | 310 | | 90.3 | 88.6 | |
| | 311 | 175 | 313 | | 88.7 | 84.1 | |
| | 316 | 200 | 317 | | 84.9 | 78.0 | |

| Glass | IZO | Ag | IZO | PC | IZO/Air | IZO/PC | Index |
|---|---|---|---|---|---|---|---|
| | 439 | 50 | 416 | | 87.6 | 91.0 | 2 |
| | 419 | 75 | 428 | | 89.2 | 89.3 | |
| | 442 | 100 | 444 | | 88.3 | 84.9 | |
| | 445 | 125 | 445 | | 84.9 | 78.8 | |
| | 441 | 150 | 442 | | 79.5 | 71.4 | |

| Glass | TiSi2O6 | Ag | TiSi2O6 | PC | TiSi2O6/Air | TiSi2O6/PC | Index |
|---|---|---|---|---|---|---|---|
| | 563 | 25 | 445 | | 91.5 | 93.9 | 1.7 |
| | 561 | 50 | 548 | | 92.5 | 90.8 | |

TABLE 4-continued

Transmittance values for different IMI stacks

| 567 | 75  | 559 | 90.0 | 84.8 |
| 551 | 100 | 547 | 85.1 | 76.9 |
| 542 | 125 | 539 | 78.1 | 68.0 |
| 543 | 150 | 537 | 69.7 | 58.9 |

In addition to the real part of the refractive indices for the dielectrics the imaginary component of the refractive index of the dielectrics is addressed. The imaginary part of the refractive index affects the absorption of light in the dielectric layers. The dielectric layers of the IMI stack act to minimize the standing electrical field of the light in the metal layer, thereby enhancing the electrical field in the dielectric layers. The magnitude of the absorption due to the imaginary part of the refractive index is therefore increased relative to what would be seen in the dielectric layer alone in a substrate. As a result, it is important to minimize the amount of absorption in the dielectric layers to maximize the transmittance of the transparent electrode. Conversely, the absorption in the dielectric layers may be used to tune the transmittance of an IMI stack without the need to adjust the metal layer which may be fixed for other optical or electrical requirements.

Table 5 shows the effect of absorption in the IMI dielectric on the attainable transmittance for a fixed refractive index of the dielectric. Thin film modeling was again used to calculate the transmittance and reflectance for IMI stacks with different dielectric layers with approximately the same real refractive index, n. The silver thickness was fixed at 100 angstroms and the dielectric layers were allowed to move during the transmittance optimization. The maximum transmittance is highly correlated to the k value in the dielectric. This data was fit with a linear curve to generate an equation linking transmittance to k value in the dielectric. The transmittance versus k values based on this equation are shown in Table 6. In order to obtain a transmittance greater than 50%, the k value is preferably less than about 0.2, more preferably less than 0.1, even more preferably less than 0.04, even more preferably less than 0.01 and most preferably less than 0.005. At the most preferable level and below there is little change in transmittance with changing k value. These preferred ranges were determined utilizing a fixed real index for the layers at 2.0. The preferred values for k may shift slightly when other real refractive indices are used.

TABLE 5

Effect of absorption (k) on the maximum attainable transmittance and lowest absorption for a fixed n value.

| Dielectric | n | k | R | T | A |
|---|---|---|---|---|---|
| ITO cold | 2.025 | 8.61E−04 | 7.70 | 88.06 | 4.24 |
| SiN 2 | 2.026 | 1.18E−03 | 7.61 | 88.12 | 4.27 |
| AZO | 1.975 | 5.41E−03 | 8.81 | 85.64 | 5.55 |
| IZO | 2.016 | 1.04E−02 | 7.95 | 85.62 | 6.43 |
| SiN 1 | 2.120 | 1.30E−02 | 6.01 | 87.32 | 6.67 |
| SiN 3 | 2.000 | 2.30E−02 | 8.26 | 82.84 | 8.90 |
| SiN 5 | 2.000 | 2.82E−02 | 8.30 | 81.99 | 9.71 |
| SiN 6 | 2.000 | 3.89E−02 | 8.51 | 80.16 | 11.33 |
| SiN 4 | 2.000 | 4.97E−02 | 9.01 | 78.34 | 12.65 |

TABLE 6

Transmittance versus k value using equation based on values from Table 4.

| k | Estimated Transmittance | k | Estimated Transmittance |
|---|---|---|---|
| 1.00E−05 | 88.0 | 7.00E−02 | 74.0 |
| 5.00E−05 | 88.0 | 8.00E−02 | 72.0 |
| 1.00E−04 | 88.0 | 9.00E−02 | 70.0 |
| 5.00E−04 | 87.9 | 1.00E−01 | 68.0 |
| 1.00E−03 | 87.8 | 1.10E−01 | 66.0 |
| 2.00E−03 | 87.6 | 1.20E−01 | 64.0 |
| 3.00E−03 | 87.4 | 1.30E−01 | 62.0 |
| 4.00E−03 | 87.2 | 1.40E−01 | 60.0 |
| 5.00E−03 | 87.0 | 1.50E−01 | 58.0 |
| 1.00E−02 | 86.0 | 1.60E−01 | 56.0 |
| 2.00E−02 | 84.0 | 1.70E−01 | 54.0 |
| 3.00E−02 | 82.0 | 1.80E−01 | 52.0 |
| 4.00E−02 | 80.0 | 1.90E−01 | 50.0 |
| 5.00E−02 | 78.0 | 2.00E−01 | 48.0 |
| 6.00E−02 | 76.0 | | |

It is noted that in some applications, it may be advantageous for only part of a dielectric layer to exhibit a high refractive index, thereby obtaining optical advantages, such as reflected and transmitted color tuning that would benefit from a combination of indices, or a gradient index in the dielectric layer.

Another approached to maximizing transmittance in the silver layer(s) within the IMI stack 139 is to create the silver layers with as low a refractive index (real portion) as possible. This relatively low refractive index can be obtained via several means. Depositing the silver layers upon zinc oxide will assist in producing silver with a relatively low refractive index, due to a crystal match between zinc oxide and silver. Specifically, the silver is grown pseudo epitaxially and has a dense structure, while the zinc oxide layer typically has a crystalline structure when deposited via sputtering. The zinc oxide layer therefore has the propensity to develop a rough surface due to its crystalline nature. The thickness of the zinc oxide layer in the stack must therefore be controlled such that the roughness which often scales with the thickness does not become overly large. Further, deposition parameters for the zinc oxide may be used to control the layer morphology and minimize the thickness at various overall thickness levels.

The refractive index of silver is also related to its electrical properties. For a given silver coating the preferred layer will have a low bulk resistance, thereby resulting in higher transmittance values. The minimum bulk resistivity of silver is approximately $1.63 \times 10^{-6}$ ohm·cm. Preferably for our thin films the bulk resistivity should be less than about $8.0 \times 10^{-6}$ ohm·cm, preferably less than about $6.5 \times 10^{-6}$ ohm·cm, more preferably less than about $5.0 \times 10^{-6}$ ohm·cm and most preferably less than about $3.5 \times 10^{-6}$ ohm·cm. Two ways are employed to reduce the bulk resistivity of the coating, including increasing the electron carrier concentration, and increasing the electron mobility. The resulting IMI stacks have a higher transmittance due to an increase in the electron mobility. These preferred bulk resistivity properties lead to the sheet resistance values shown in Table 6b when coupled with the preferred silver thickness values. The sheet resistance is calculated by dividing the bulk resistivity (Ohm·cm) by the thickness (Å) and multiplying by $10^8$. The preferred IMI stacks, described in detail below, lead to the novel combination of high visible transmittance and low sheet resistance.

TABLE 6b

| Total Ag thickness (angstroms) | Bulk Resistivity ($\times 10^{-6}$ ohm·cm) | Sheet Resistance (ohms/square) |
|---|---|---|
| 300 | 8 | 2.7 |
| 300 | 6.5 | 2.2 |
| 300 | 5 | 1.7 |
| 300 | 3.5 | 1.2 |
| 200 | 8 | 4.0 |
| 200 | 6.5 | 3.3 |
| 200 | 5 | 2.5 |
| 200 | 3.5 | 1.8 |
| 150 | 8 | 5.3 |
| 150 | 6.5 | 4.3 |
| 150 | 5 | 3.3 |
| 150 | 3.5 | 2.3 |
| 100 | 8 | 8.0 |
| 100 | 6.5 | 6.5 |
| 100 | 5 | 5.0 |
| 100 | 3.5 | 3.5 |

In addition to the electrical properties of the silver layer the d-band electrical transitions also affect the properties of the silver layer. In silver, as with most transition metals, electrons may be excited to higher energy levels, wherein transitions occur in the d-band or d orbitals in the metals. These transitions significantly affect the refractive index of the metals. By altering the electron concentration in the metal, the frequency at which the onset of absorption may occur was changed. This was attained by shifting the d-band transitions to higher frequencies thus lower the refractive index of the associated silver layer in the visible region and thus increasing the transmittance. Preferably, the real part of the Ag refractive index in at least one portion of the visible spectrum between 380 and 780 nm should be less than about 0.12, more preferably less than about 0.10, even more preferably less than about 0.08, and most preferably less than about 0.06.

The quality of interfaces between the silver layer and the neighboring materials can dramatically affect the final transmittance (and sheet resistance) of the IMI stack. For example, as the roughness of the interfaces decreases, or mixing between the silver and the dielectric decreases, the absorption within the IMI stack is reduced with the absorption reaching the minimum when the layers are atomically smooth. Further, as the roughness of the interfaces increases, the optical constants of silver, particularly the electron mobility, decreases, thus negatively affecting the transmittance. In embodiments of the present invention, therefore, both materials for use in the IMI stack and the deposition conditions were appropriately selected to assure smooth layers and interfaces having peak-to-valley roughness values for surface(s) of the layer(s) below the Ag (or another metal) layer to be less than about 50 angstroms, more preferably less than about 30 angstroms, even more preferably less than about 15 angstroms, and most preferably less than about 10 angstroms. In an embodiment where adjustment of the deposition-process settings for deposition of various layers beneath the Ag (or another metal) layer is not feasible, these layers may be smoothed by ion-beam or other techniques to provide the needed low roughness of a corresponding surface.

Further considerations were made regarding the selection of materials placed next to the silver layer(s). Even with optically-smooth interfaces there exist interface states known as surface plasmons. The surface plasmons act as normal layers and do not significantly affect the reflection properties of the stack but dramatically affect the transmittance. The frequency at a peak absorption of the plasmons depends on the dielectric function of materials surrounding the silver layer(s) and on the plasma frequency of the silver layer itself.

Ideally, the plasma frequency of the silver layer should to be as high as possible, with the layers located adjacent to the silver layer having dielectric constants selected such that the frequency of the surface plasmons do not lead to appreciable detrimental absorption in the coating. In embodiments of the present invention, therefore, benefits were obtained by choosing materials independently from the apparent properties seen in thin film models.

In some applications, a lower transmittance within an electrochromic mirror or window is desired, while maintaining acceptable color, reflectance and low sheet resistance. As an example, utilizing a metal such as silver for the reflector, it is possible to modify the transmittance of an IMI coating to lower the reflectance of the mirror to meet market requirements. In these cases, introduction of materials into the IMI stack to create surface plasmon layers would result in controlled absorption in the visible region. In this manner, the transmittance of the IMI coating is tuned while maintaining preferred properties in other areas. Other means, such as placing barrier or seed layers adjacent to the silver layer may be utilized. In this manner, thin metal layers adjacent to the silver will lead to lower transmittance values, and may be used to assist in tuning the transmitted color.

Multi-Period IMI Structures as Electrodes

As described above, the sheet resistance of a single IMI coating, including a metallic layer (such as silver) sandwiched between two layers of dielectric material, can be reduced by thickening the metallic layer within the IMI coating. However, once a threshold value of the thickness of the metallic layer is exceeded, the transmittance of such discrete IMI coating begins to decrease rapidly. This threshold thickness is a function of the refractive indices of the dielectric layers surrounding the metallic layer, which, therefore impose a limit on the low achievable value of sheet resistance of a given discrete IMI coating while maintaining an acceptable level of transmission. In conventional IMI coatings, the reduction of a sheet resistance value beyond this threshold value is not trivial.

Figure 12A:
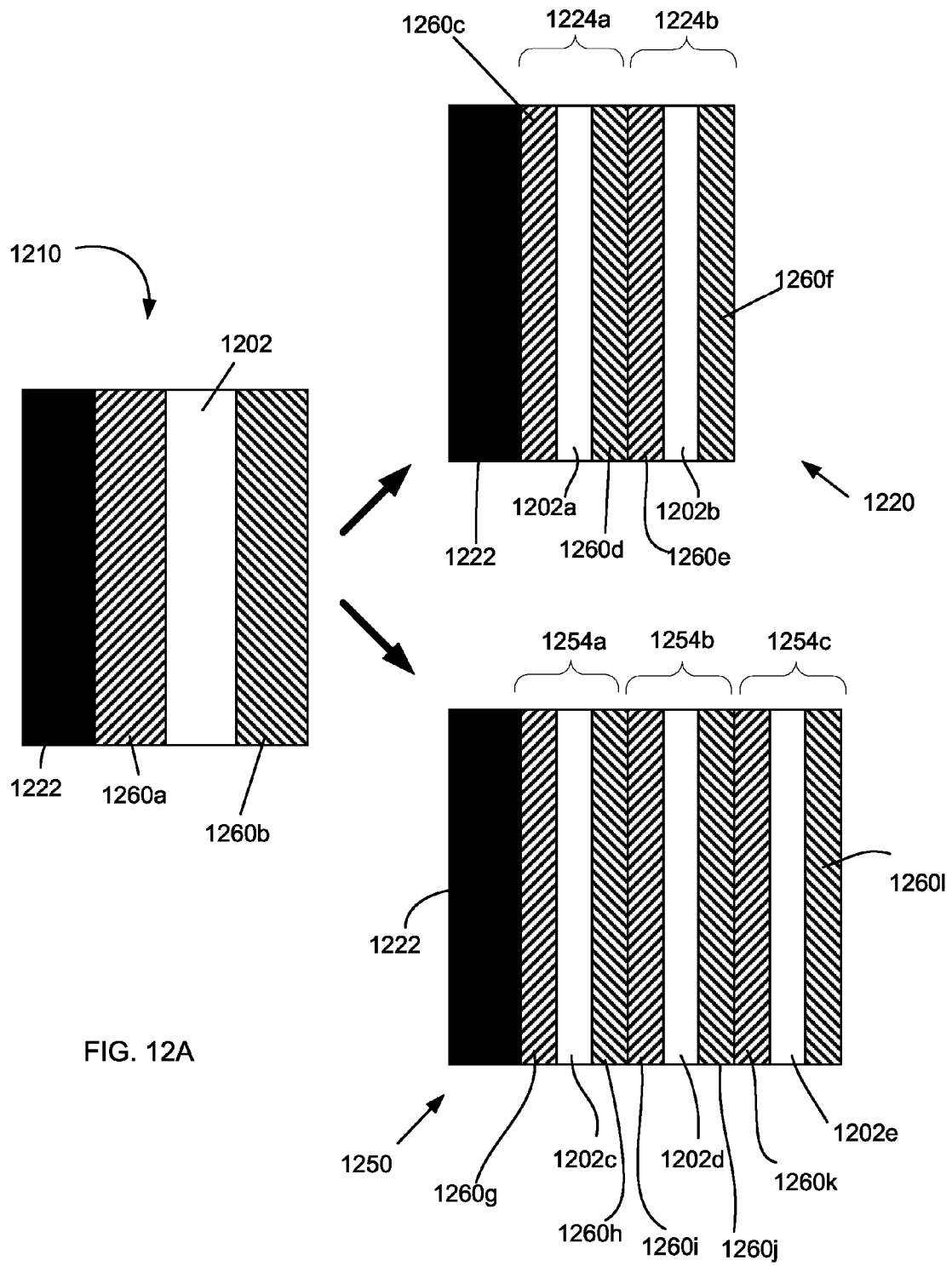
FIG. 12A shows a principle of configuring an IMI-coating superstructure from a single IMI coating according to an embodiment of the present invention.
Figure 12B:
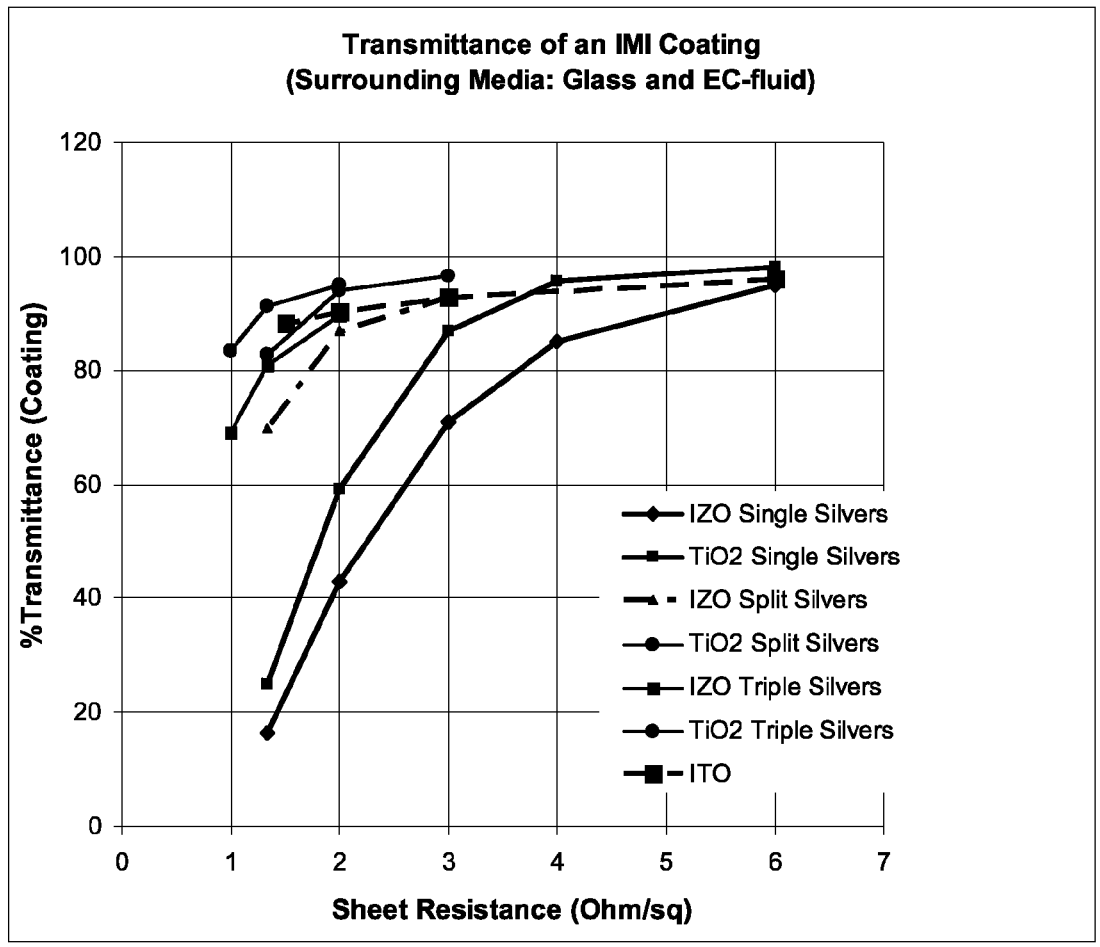
FIG. 12B shows dependences of optical transmittance on sheet resistance for several IMI-coating structures.
Figure 12C:
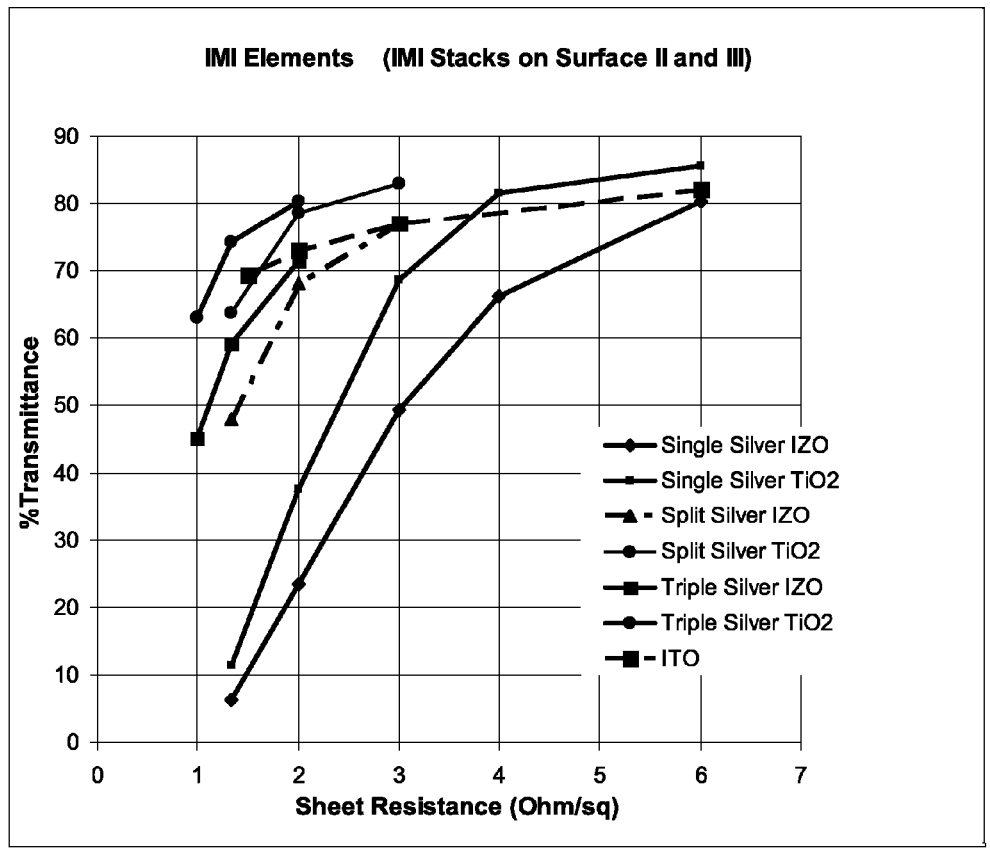
FIG. 12C shows dependences of optical transmittance on sheet resistance for an EC-cell of FIG. 12D that utilizes several; IMI-coating structures as its transparent electrodes.
Figure 12D:
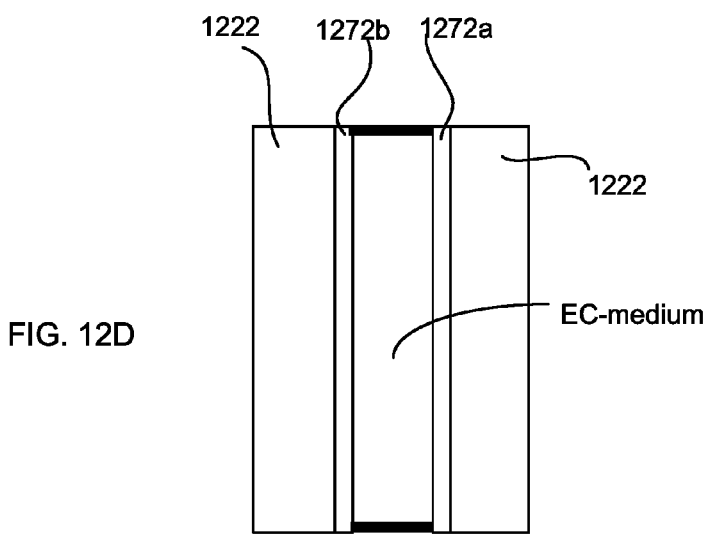
FIGS. 12(A-D) illustrate optical performance of complex IMI coatings employing "split" metallic layers.
FIG. 12E illustrates an embodiment of a triple-split-Ag coating optimized with respect to both color rendering index (CRI) and transmission.
FIG. 12F shows distributions of CRI for embodiments of coatings of FIGS. 12B and 12E.
Figure 12E:
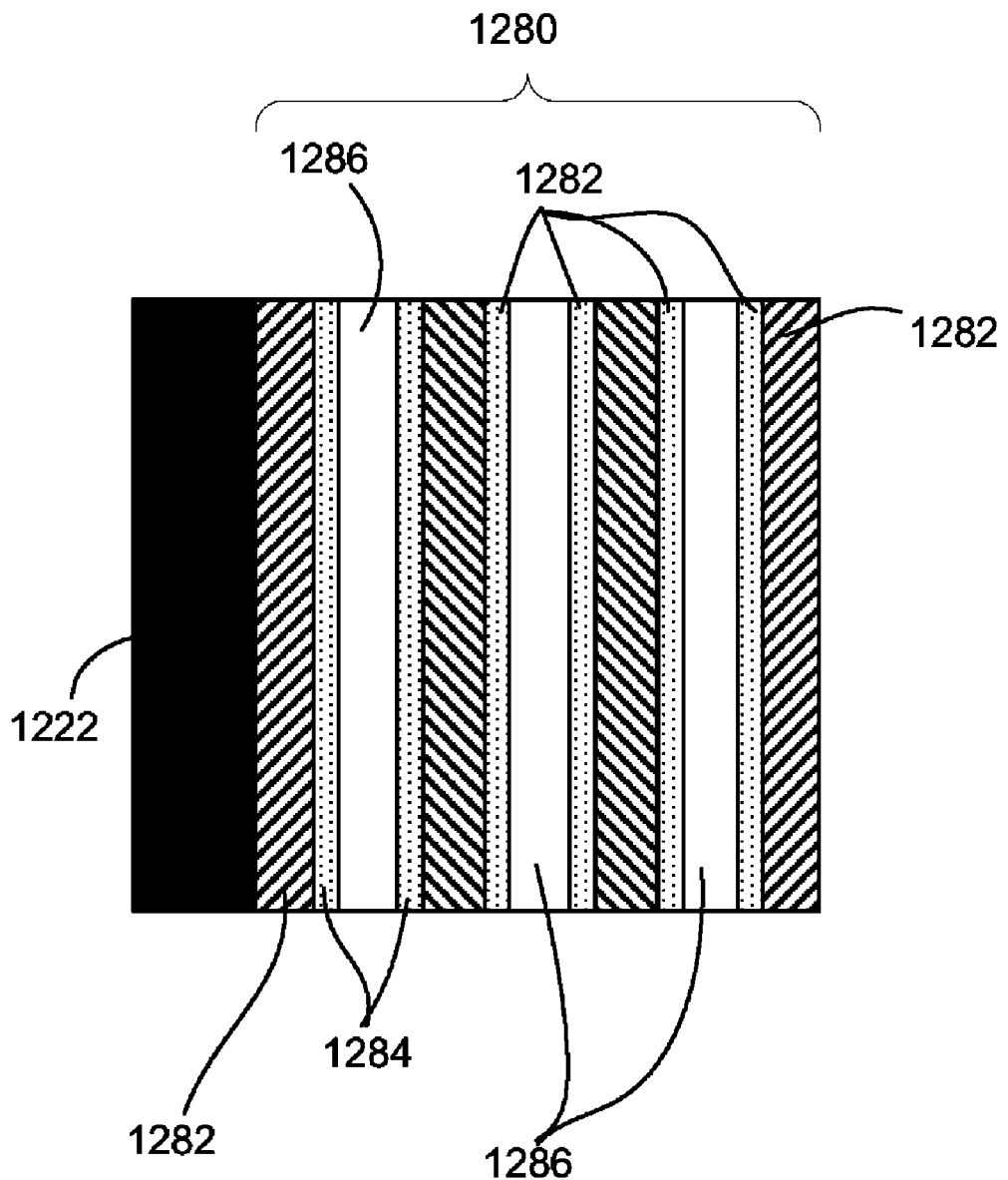
Figure 12F:
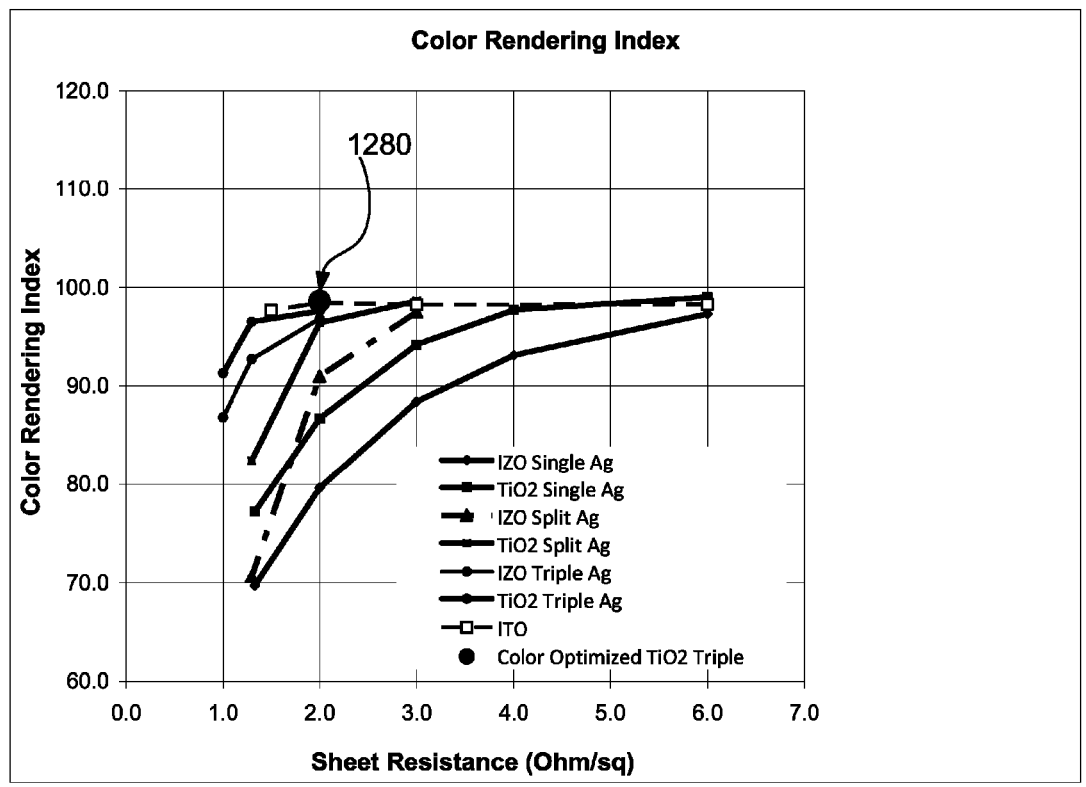
Figure 12G:
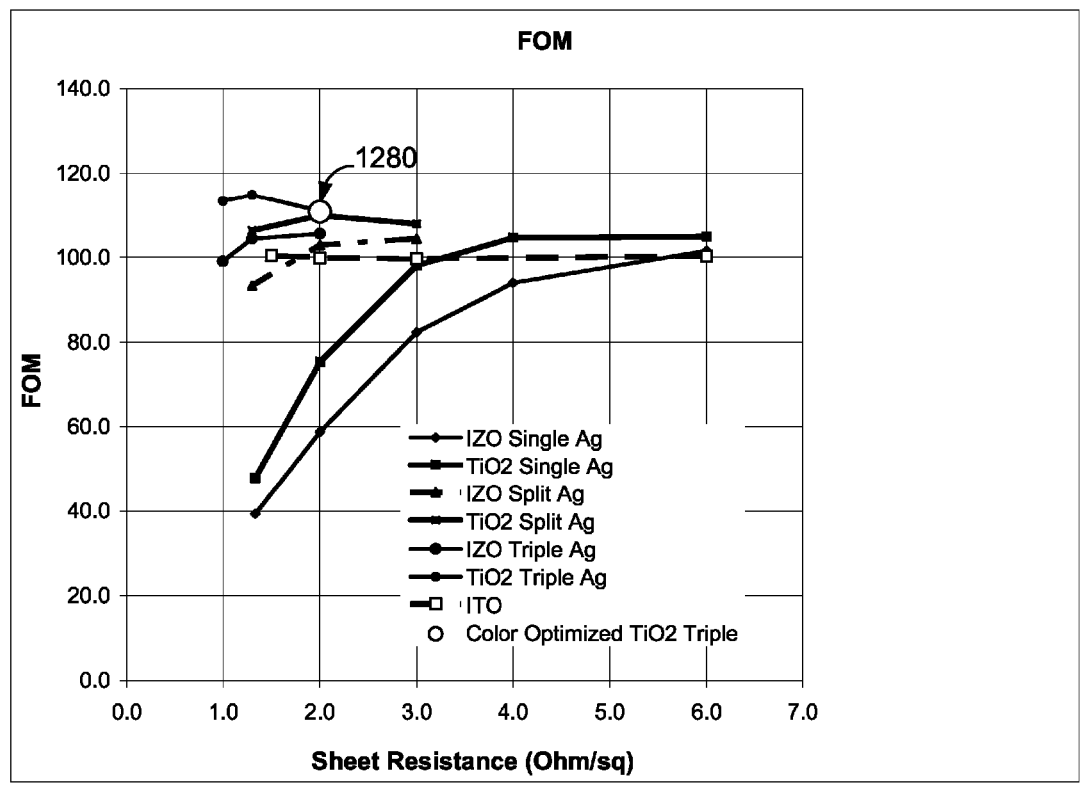
Figure 12H:
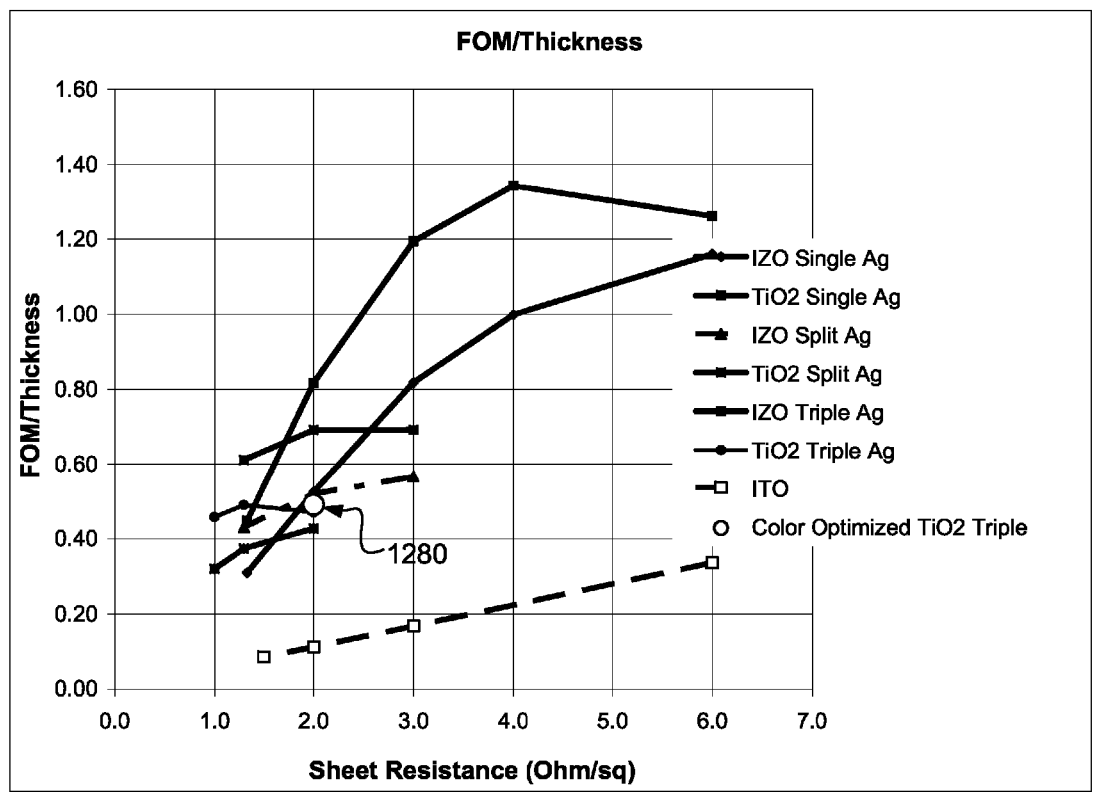

Reconfiguration of a conventional single IMI coating by "splitting" the metallic layer into two or more layers, thickness-wise, and thereby by forming a multi-period IMI superstructure having several metallic (e.g., silver) layers, facilitates the reduction of the sheet resistance of such multi-period IMI superstructure below the sheet-resistance limit prescribed to a single discrete IMI coating. FIGS. 12A through 12C illustrate this finding. FIG. 12A shows, not to scale, a principle of thickness-wise "splitting" the metallic (in a specific embodiment, silver) layer 1202 of the original single IMI coating 1210 in two or three ways. By splitting the single layer 1202 into two, a two-period IMI superstructure 1220 is formed having two metallic layers 1202a and 1202b the aggregate thickness of which is equal to that of the original layer 1202. Similarly, a three-period IMI superstructure 1250 results when the layer 1202 is split three-fold, the resulting three metallic layers separated from each other with dielectric media, to have the aggregate thickness of the three metallic layers 1202c, 1202d, and 1202e equal to that of the layer 1202. As shown, the IMI superstructure 1220 disposed on a substrate 1222 includes two IMI periods 1224a and 1224b, while the IMI superstructure 1250 includes three IMI periods 1254a, 1254b, and 1254c. Layers 1260a through 1260k in FIG. 12A represent dielectric layers in corresponding IMI structures. The dependence of transmittance on sheet resistance values for the single-, double- and triple-period IMI coatings 1210, 1220, and 1250, sandwiched between a lossless 1.6 mm-thick float-glass substrate 1222 positioned in air and the EC-medium (with a refractive index of about 1.4, not shown) is presented in FIG. 12B. Here, the coating 1210 is referred to as "single silver", the coating 1220 is referred to as "split silver", and the coating 1250 is referred to as "triple silver". Each of dielectric layers 1260a through 1260l of the coatings used to obtain the dependencies of FIG. 12B included either a quarter-wave IZO layer (with an index of approximately 2) paired with a 50-Angstrom thick layer of AZO in contact with the adjacent Ag layer, or a quarter-wave TiO₂ layer (with an index of approximately 2.5) paired with a 50-Angstrom thick layer of AZO in contact with the adjacent Ag layer. The deposition of a thin AZO layer under the Ag layer improves the structure and mechanical stability of the Ag layer. The use of the EC-medium as exit medium (not shown in FIG. 12A) was chosen to better approximate the performance of transparent conductive coatings 1210, 1220, and 1250 in an EC-device. FIG. 12C additionally illustrates the optical transmittance for a simple 160 micron thick EC-cell 1270 of FIG. 12D in which the same coatings 1210, 1220, and 1250 are used to construct both transparent electrodes 1272a and 1272b, disposed respectively on the second and third surfaces of the cell 1270. In other words, both electrodes on the EC-cell have equivalent structures. Data corresponding to FIGS. 12(B,C) are shown in Table 6b1. Corresponding data for an ITO layer are shown in Table 6b2.

TABLE 6b1

Characteristics of several IMI structures

| Total thickness of Ag-layers, Å | $R_{sheet}$, Ohm/sq | IZO | TiO₂ | IZO | TiO₂ |
|---|---|---|---|---|---|
| | | Thickness of some dielectric layers for single Ag-layer IMI coating | | % Transmittance for single Ag-layer IMI coating | |
| 100 | 6 | 289.6 | 296.2 | 94.8 | 98.1 |
| 150 | 4 | 320 | 341.2 | 85 | 95.6 |
| 200 | 3 | 342 | 373.6 | 71 | 86.8 |
| 300 | 2 | 385.6 | 418.6 | 42.8 | 59.3 |
| 450 | 1.33 | 484.6 | 499.8 | 16.3 | 24.9 |
| | | Thickness of some dielectric layers for double-split-Ag IMI coating | | % Transmittance for double-split-Ag IMI coating | |
| 200 | 3 | 386.2 | 393.2 | 93.1 | 96.6 |
| 300 | 2 | 473.8 | 487.8 | 86.9 | 93.9 |
| 450 | 1.33 | 589.6 | 615.6 | 69.8 | 82.8 |
| | | Thickness of some dielectric layers for triple-split-Ag IMI coating | | % Transmittance for triple-split-Ag IMI coating | |
| 300 | 2 | 479.2 | 490 | 89.6 | 95 |
| 450 | 1.33 | 611.8 | 632.4 | 80.9 | 91.2 |
| 600 | 1 | 738 | 766.8 | 69 | 83.4 |

TABLE 6b2

Optical Performance of an ITO electrode layer

| ITO layer thickness, ¼ waves | ITO layer thickness, Å | $R_{sheet}$, Ohm/sq | % Transmittance |
|---|---|---|---|
| 2 | 1450 | 12 | 98.1 |
| 4 | 2900 | 6 | 96 |
| 8 | 5800 | 3 | 92.9 |
| 12 | 8700 | 2 | 90.4 |
| 16 | 11600 | 1.5 | 88.2 |

Optimization of Multi-Period IMI Structures

While it has been shown, in reference to FIGS. 12(A-D) that multi-period IMI structures configured according to a "split-silver" approach of the present invention facilitate higher transmittance at lower sheet resistance values as compared to a conventional ITO-layer electrodes of an EC-element, the superior practical performance of the rearview assembly incorporating such an EC-element typically additionally requires optimization of color characteristics of the reflected light. A "triple IMI stack" embodiment 1280, sandwiched between the glass substrate 1222 on one side and the EC-fluid (not shown) on the other side, demonstrates an example of such optimization in FIG. 12E. Here, layers 1282 denote TiO₂ with thickness of 288 Å, layers 1284 denote AZO with thickness of 50 Å, and layers 1286 denote Ag with thickness of 100 Å. As a free-standing coating on a loss-less substrate 1222, this embodiment exhibits optical characteristics summarized in Table 6b3. However, when configured as electrodes on both the second and third surfaces of the EC-element of FIG. 12D, this coating imparts, upon the EC-element, the characteristics summarized in Table 6b4. The CRI of this embodiment is shown, in comparison with the distributions of CRIs of the embodiments corresponding to FIGS. 12(B,C), in FIG. 12F.

TABLE 6b3

| Y | 94.8 |
|---|---|
| L* | 98.0 |
| a* | −2.0 |
| b* | 1.3 |
| CRI | 98.6 |

TABLE 6b4

| | EC element in "bright" state | | | EC element in "dark" state | | |
|---|---|---|---|---|---|---|
| | Reflectance, % | Transmittance, % | Absorbance, % | Reflectance, % | Transmittance, % | Absorbance, % |
| Y | 7.69 | 79.92 | 12.39 | 4.55 | 5.18 | 90.27 |
| L* | 33.33 | 91.65 | | 25.41 | 27.23 | |
| a* | 6.36 | −4.8 | | 7.11 | −55.25 | |
| b* | −12.57 | 2.86 | | −12.33 | −1.21 | |

Embodiments discussed in reference to in Tables 6b1-6b3 describe symmetric thin-film stacks and are simplified for clarity of demonstrating the relationship between sheet resistance, transmittance, and index of refraction values involved. More involved embodiments may be formed, for example, by using multiple and/or different dielectric materials and added layers above, below, or within an exemplary IMI structure appropriately configured so as to allow for color tuning, optimization of adhesion, formation of secondary paths for electrical conductivity, and protection of the IMI structures against the ambient environment. For example, a functional layer can be added to the basic IMI stack, without significantly altering the optical performance of the IMI stack itself, to assure mechanical stability of the physical contact between the electrode including such IMI stack and the functional layer and an electrical contact applying voltage to the EC-element. For example, the IMI structure of the embodiment 1280 has a transmittance of 94.8% with transmitted color coordinates a* and b* of −2.0 and 1.3, respectively. The addition of an optical half-wave-thick layer of ITO (149 nm) to the top of this structure reduces the transmission of light down to only 92.9% with transmitted color coordinates of a*=−3.9 and b*=5.8, respectively. The alternative addition of an optical half-wave of ITO (149 nm) layer to the bottom of the stack 1280 only reduces the transmission of light through the structure down to only 93.0% with transmitted color coordinates a*=−3.5 and b*=5.2, respectively. Either addition, however, may allow to maintain the electrical contact between the coating and the external power supply even in the case of IMI-degradation. Comparison of the structure of the embodiment 1280 and the additional functional ITO layer, as well as corresponding optical properties are summarized in Table 6b5.

TABLE 6b5

| Layer Material | Thickness | Layer Material | ITO as overlayer Thickness | ITO as underlayer Thickness |
|---|---|---|---|---|
| Embodiment 1280 | | Embodiment 1280 modified with ITO over/under layers: | | |
| | | ITO | 149.0 | 0.0 |
| TiO2 | 28.8 | TiO2 | 28.8 | 28.8 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 54.1 | TiO2 | 54.1 | 54.1 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 54.1 | TiO2 | 54.1 | 54.1 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 28.8 | TiO2 | 28.8 | 28.8 |
| | | ITO | 0.0 | 149.0 |
| Optical Parameters in Transmission | | Optical Parameters in Transmission | | |
| Y | 94.8 | Y | 92.9 | 93.0 |
| L* | 98.0 | L* | 97.2 | 97.2 |
| a* | −2.0 | a* | −3.9 | −3.5 |
| b* | 1.3 | b* | 5.8 | 5.2 |
| CRI | 98.6 | CRI | 97.7 | 97.9 |

To demonstrate the advantages of the proposed use of embodiments of multi-period IMI structures configured according to the invention as electrodes of an EC-cell over the conventional use of the ITO-layer electrode in such a cell, a figure of merit (FOM) linking the sheet resistance value to the transmittance value of a given coating i was defined as $$FOM = 28/R_{sheet,i} + T_i + 2,$$

where $R_{sheet,i}$ denotes a sheet resistance value of the given IMI coating and $T_i$ denotes its transmittance. The FOM was devised to assure that, for a conventional ITO coating, the FOM is equal to 100 regardless of the thickness (or sheet resistance) of the coating. The comparison of the FOM distributions for the IMI-embodiments of the present invention and the conventional ITO layer is provided in FIG. 12G and in FIG. 12H (here, as normalized to the total thickness of a given coating, in nm). It becomes apparent that, for a given value of sheet resistance of a coating, the coating transmittance in increasing with the increase of the number of periods in a multi-period IMI coatings configured according to embodiments of the invention. One can also readily appreciate that the optical performance of the multi-period IMI coating configured according to an embodiment of the invention and used as an electrodes in an EC-element rivals and exceeds the performance of the conventional ITO electrode layer having similar sheet resistance values.

Other means are available to increase the transmittance of IMI type coatings. As noted above the refractive index of the silver or metal layer is critical to attaining high transmittance values. Post deposition annealing of a coating is another means to increase the transmittance. By heating the sample at elevated temperatures for a given period of time the transmittance of the coating can be increased while simultaneously reducing the sheet resistance of the coating.

Figure 7:
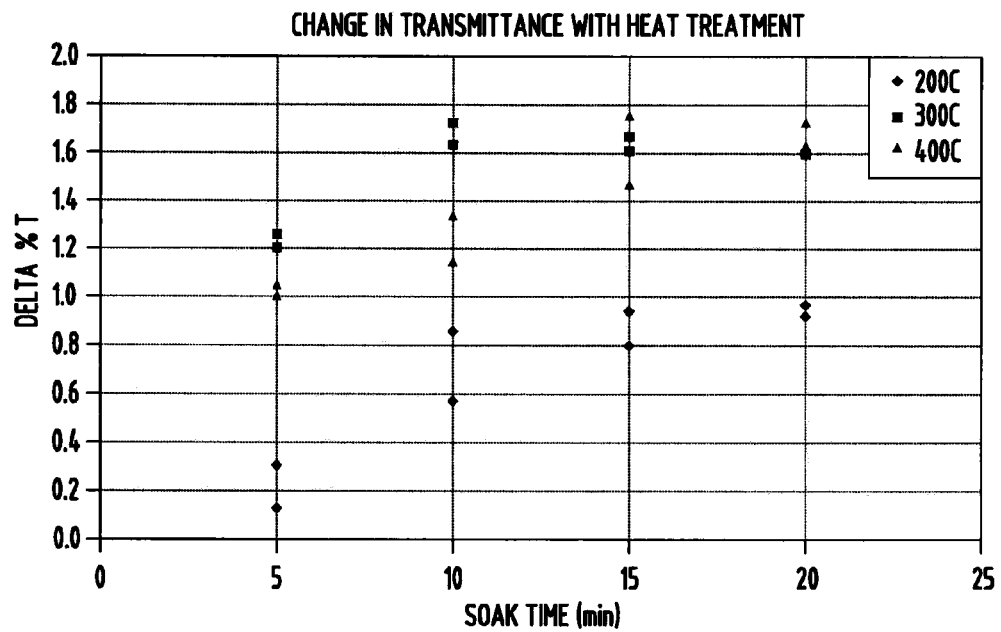
FIG. 7 is a graph of change to transmittance versus soak time of a five layer IMI stack.
Figure 8:
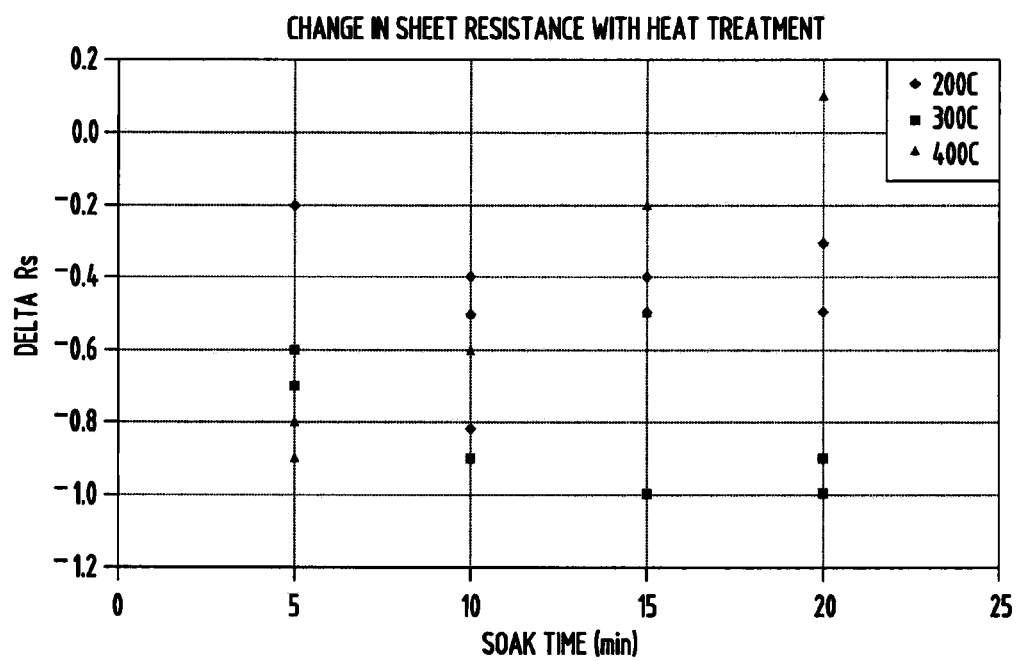
FIG. 8 is a graph of a change to resistance versus soak time of a five layer IMI stack.

A time-temperature study was conducted on a five layer IMI stack. The stack consisted of glass/IZO/AZO/Ag/AZO/IZO wherein IZO is indium zinc oxide with a percentage of zinc between about 1 and 99 percent and AZO is aluminum doped zinc oxide wherein the doping level of the aluminum is between about 0.25% and 10%. The AZO layers were approximately 50 angstroms thick, while the silver thickness was about 80 angstroms thick and the IZO layers were approximately 440 angstroms. The stacks were heated at three different temperatures and for various times. FIG. 7 illustrates the results of the change in transmittance with heating conditions, while FIG. 8 illustrates the change in sheet resistance for the same heating conditions. As is illustrated, improved IMI stacks are created with post deposition heat treatment. Other metals can, of course, be used in replacement of silver, with the preferred metals should have a low refractive index to allow appropriate admittance matching of the metal to occur. Preferred metals include silver, gold, copper, aluminum zinc, magnesium, beryllium, cadmium, zirconium, and vanadium. Preferably the coatings are heated between about 150 and 450C, more preferably between 200 and 400C and most preferably between 250 and 350C. Preferably the heating time should be between 5 and 40 minutes, more preferably between 5 and 20 minutes and most preferably between 10 and 20 minutes.

The color of the electrochromic window or mirror is a critical aesthetic characteristic, with color neutrality being preferred in many applications. For example, modern architectural windows are designed to have a high "color rendering index" (CRI) wherein the color of objects is not altered by viewing through a transparency, with a color rendering index of 100 being a perfect situation and values above 80 being acceptable, values above 90 being preferred, and values above 95 being more preferred. The color rendering index is defined in the following reference document "*CIE Publication 13.3. Method of measuring & specifying colour rendering properties of light sources. CIE*, 1995". The reflected color of a mirror changes when the mirror is transitioned to the darkened state. When the mirror is fully darkened, the observed color and reflectivity are due essentially from the first and second surfaces of the top surface of the glass. U.S. Pat. No. 6,816,297 entitled ELECTROCHROMIC MIRROR HAVING A SELF-CLEANING HYDROPHILIC COATING, issued Nov. 9, 2004, and U.S. Pat. No. 6,020,987, entitled ELECTROCHROMIC MEDIUM CAPABLE OF PRODUCING A PRE-SELECTED COLOR, issued Feb. 1, 2000, each commonly assigned with the present invention and incorporated herein by reference, detail how coatings on the first surface of the glass and the fluid color affect the appearance of a color from the bright (un-darkened state) to the fully dark state.

When the mirror is in a fully darkened state, with zero light from the reflector on either the third surface or the fourth surface reaching the observer, the appearance of the mirror is due to a combination of light from the first and second surfaces of the first substrate. With no coating on the first surface, about 4% reflectance from the uncoated glass interface is obtained, with any color due to thin film interference effects from the transparent electrode on the second surface. The color of the transparent conducting oxide is due primarily from the thickness of the layer. As the thickness of the TCO is increased, the color changes in a predictable manner. The color can be further altered by adding additional layers either above or below the TCO. The above-referenced patents teach methods for minimizing the color of TCO and other coatings. The reflectance of the mirror in the dark state is also affected by the thickness of the TCO and whether other layers are present in the coating stack. As a result of the absorption in ITOs or other TCOs being fairly low, there is little color change in the bright state of the mirror due to thickness changes in the layer. Similarly, in a window the ITO does not contribute substantially to the transmitted color nor is color tuning by adjusting the ITO an option.

In order not to affect the inherent color of the reflecting metal layer of the electrochromic mirror, an IMI transparent electrode must have a transmitted color rendering index greater than 80, preferably greater than 90 and most preferably greater than 95. Unlike a window, the light falling on a mirror must pass through the coating twice, the first as the light approaches the reflector and the second time after the light reflects off of the reflector. If the color rendering index of the IMI coated glass is too low then the color of the reflector is altered. In many electrochromic mirror applications, the mirror must be fairly neutral. Low color purity levels are preferred whereby the hue of the image is not substantially altered by the mirror. It is noted that not all IMI stacks inherently have sufficiently high color rendering indices. The refractive indices of the dielectric layers and the thicknesses of all the layers work in concert to yield a final transmitted color, with the color changing as the layers are altered. In many cases, the need for acceptable transmitted color conflicts with the need for maximum transmittance, with the optimization for high transmittance causing the transmittance spectra to shift from neutrality leading to a colored transmittance. Specifically, as discussed in terms of a* and b*, a negative a* will be obtained with relatively high transmittance coatings due to the biased response of the human eye toward green light. In order to obtain a positive a* a lower cap Y for the same average reflectance level must be maintained, which in most applications is not preferred. As a result of having a negative a* for high transmittance applications, the major difference in color is a shift is expected in a shift in b*. The hue therefore shifts between a yellow bias and a blue bias. As a result, the IMI stack is properly designed so that the color does not shift outside of a particular range for b*. Preferably the color shift of the reflector is less than about 10 C* units, more preferably less than about 5, most preferably less than about 2.5. Alternately, preferably the color shift of the reflector is less than about 10 b* units, more preferably less than about 5 b* units and most preferably less than about 2.5 b* units. In many applications, the reflector exhibits a color bias that is objectionable, thereby forcing designers to discard the particular reflector for the intended application. With the new ability to tune the transmitted color of the IMI coating, the final color of the mirror may be rendered acceptable by adjusting the color of the IMI coating to compensate for inadequacies in the reflector. In this manner the range of acceptable materials for the reflector is increased which may bring other benefits to the final mirror assembly. For example, a common problem with various reflectors is a yellow color bias, resulting in a yellow appearance of images in the final mirror assembly. However, the final mirror color may be made more blue by altering the IMI coating with the IMI coating being designed to yield a preferential blue transmitted color which would therefore transmit relatively less yellow color. The amount of blue shift is based on the relative transmittance of blue and yellow light through the IMI and can be approximated by the b* color value. Preferably the color correction of the reflector by the IMI coating is greater than about 2.5 C* units, more preferably greater than about 5, most preferably greater than about 10. Alternately, preferably the color shift of the reflector is greater than about 2.5 b* units, more preferably greater than about 5 b* units and most preferably greater than about 10 b* units.

The color of reflected light, as mentioned above, is also critical for an electrochromic mirror applications. In the darkened state, the color viewed by the observer is dominated by the color of the transparent electrode on the number second surface, with thicknesses and refractive indices of the layers affect the final color of the product. In addition to the thickness of the layers, the color can be tuned by selecting dielectrics with absorption at different wavelength bands. Typically, common dielectrics will have absorption in the blue part of the spectrum, while other dielectrics may have absorption in other bands of the visible spectrum. The dielectric materials may be selected based on their absorption properties to yield the desired final color properties of the IMI stack and final mirror. The color can also be tuned by having dielectric materials in the stack with different refractive indices. The change in index of the dielectric layers may be used to help attain different combinations of reflectance, transmittance and color not attainable with IMI coating consisting of only a fixed refractive index for the dielectric layers.

The color in the intermediate darkened states is also often important in electrochromic mirrors. The change in color as the mirror darkens is referred to as the color excursion. The mirror is often set to intermediate states of darkening and the reflected color is a combination of the color of the fluid, the color of the reflector and the color of the transparent electrode. The IMI coating should yield an acceptable color in the intermediate darkened states. Preferably the dark state reflected color has a C* value less than about 35, preferably less than about 20, more preferably less than about 10 and most preferably less than about 5.

In many applications the color at oblique viewing angles is critically important. In particular, for window applications it is often necessary to have a pleasing color at all or most viewing angles. Specific layers, thicknesses and refractive indices, are needed to attain this goal. Some IMI stacks are more susceptible than others to changes in color with angle. The thickness of the silver layer and the thickness of the dielectric layers have been shown to be critical for acceptable performance in an electrochromic element. The thickness of the silver layer should preferably range from about 50 angstroms and 500 angstroms, more preferably range from about 75 and to about 250 angstroms, and most preferably range from about 100 and 150 angstroms. The total thickness of the top and bottom dielectric layers will vary between about 100 angstroms and 700 angstroms. Thicker layers may some times be used if specific color objectives are needed. The thickness of the dielectric layers above and below the metal layer may be divided among many different dielectric materials which may be added to the stack to provide particular chemical, physical, and/or environmental durability requirements as described below. Preferably the reflected color shifts in going from normal incidence to 45 degrees less than about 20 C* units, more preferably less than 10 and most preferably less than 5.

In many cases it is difficult to meet all aesthetic, electrical and environmental requirements with an IMI stack which contains only a single metal layer. This is overcome by designing IMI stacks which consist of multiple metal layers. By making a stack with two or more metal layers, more degrees of freedom are allowed for more combinations of transmittance and reflected colors and intensities. The multiple metal layers also allow for a lower sheet resistance for the IMI coating which translates into faster switching time for the electrochromic window or mirror. Typically, a two metal layer stack would have a relatively thin base layer, a metal layer, a relatively thick center dielectric layer, a second metal layer and a relatively thin top dielectric layer. The thicknesses of the dielectric layers is relative to the other dielectric layers. The metal layers are typically thinner than the dielectric layers. The dielectric layers may comprise different materials to attain certain design goals similar to what has been described for single metal IMI coatings. The selection of dielectric materials and metals and their thicknesses are based on the particular design goals. For example, if a higher transmittance is critical then the metal layers tend to be thinner while if a low sheet resistance is the critical design goal then the metal layers may be thicker. The use of multiple metal layers in an IMI coating may often help attain higher transmittance at a given sheet resistance level. Further, multiple metal layers may provide uniform color at oblique viewing angles relative to single metal IMI stacks.

As is know in the art, ultraviolet shielding and solar shield is a requirement of electrochromic windows. Typically, these windows use a complicated series of glass panes and coatings to achieve the proper shielding. However, prior attempts at designing electrochromic windows that exhibit the necessary shielding properties fail to disclose the use the use of IMI coatings therein. Instead, past attempts have taught utilizing additional coatings on glass which are laminated to the electrochromic window. These additional layers, though functional, necessarily increase the weight of the associated window assembly and the cost thereof.

UV shielding or blocking may be attained in an IMI transparent electrode through a combination of material choices and the optical design of the stack. For example, the dielectric materials may be selected which display UV absorption properties. Specifically, TiO2, CeO2 and zinc oxide are effective UV absorbers. These materials display UV absorption typically due to their optical band gap. The absorption of the UV light by these materials may be augmented by the optical design of the coating. For instance, the IMI stack may reflect a portion of the UV light further reducing the overall UV transmittance.

The metal layer of the IMI stack 139 may also have UV blocking properties. For example, silver has absorption in the UV spectrum due to optical transition of electrons to the d-band from lower energy bands. These so called d-band transitions result in substantial absorption of UV light. In the case of silver, the d-band transitions occur at relatively high energies in the UV part of the spectrum. Other metals such as gold and copper have d-band transitions at lower energy states. In the case of these metals, the d-band absorption results in significant coloring of the metals, however, these metals display better UV blocking than silver. The properties of silver or other metals may be augmented by alloying with metals displaying higher UV absorptions, especially if the absorption is due to atomic absorption and not a crystal structure related absorption. Preferably the UV transmittance is less than about 75%, more preferably less than 50%, even more preferably less than 25% and most preferably less than 15%. UV transmittance is the non-weighted, average transmittance between 300 and 400 nm. In an alternative embodiment, it may be preferred that the UV transmittance is the damage weighted UV transmittance, $T_{UV}$.

Metals and other electrical conductive materials reflect infrared and solar radiation. The intensity of the reflected light is proportional to the electrical conductivity of the material and the thickness of the layer. As the thickness of the layer or coating is increased, the reflectance asymptotically approaches a maximum value which, to first order, is dependent on the conductivity of the material. Materials with higher conductivity have higher infrared reflectivity. In addition, the reflectivity increases at shorter wavelengths as the conductivity of the material is increased. As mentioned above, the origin of the conductivity affects the transmittance and reflectance of a coating. The conductivity of a material is a combination of the electron density and electron mobility. Each of these attributes affects the infrared reflectivity in different ways, with the infrared reflectivity being maximized when the conductivity is due to high electron density rather than high electron mobility.

The solar transmittance and reflectance may also be adjusted by the optical design of the IMI coating. For instance, multi-metal layer stacks may have a higher rejection of solar light than single metal layer stacks. The solar rejection properties of an electrochromic window can be further modified if additional layers are added to the first and fourth surfaces. These additional coatings can give low e benefits and/or may provide additional solar screening properties. Furthermore, the electrochromic window may be combined with another pane or panes of glass into an insulated glass configuration. The additional panes of glass may be uncoated or coated with layers to provide specific UV or solar rejection properties. To minimize solar heat gain (SHGC), the electrochromic window should be placed such that it is the first lite to the outside and a low e coating is placed on the fourth surface. Additional layers may be added on the surfaces of the glass panes as aesthetics or functionality require. In general, the use of an IMI layer in an electrochromic window will reject substantially more solar radiation at a given ohm/sq as compared to a transparent conducting oxide. Moreover, the IMI layer can accomplish this at a much reduced cost. In the bright state the SHGC is preferably less than about 0.7, more preferably less than about 0.5, most preferably less than 0.3. In the dark state the SHGC is less than about 0.5, more preferably less than about 0.3 and most preferably less than about 0.15.

Traditionally, dielectric layers in IMI coatings fall into two disparate categories. In architectural window applications the dielectric layers are typically non-conductive and, historically, transparent conducting oxides have been avoided due to the high cost of the materials and the manufacturing complexity which are typically associated with these materials. Often high temperatures or elaborately-controlled processes are needed to attain the optimal light transmittance and conductivity for the layer. In cases where the IMI coating would be used as a transparent electrode, the dielectric layers are usually transparent conducting oxide, with the transparent conducting oxides needed to allow electrical conduction perpendicular to the coating surface. Previous approaches severely limit the list of viable materials for use in an IMI coating for an electrochromic application.

The objective of a transparent electrode is to provide electricity to an electrochromic cell while providing sufficient transparency for a given application. However, additional benefits may be obtained by optimizing the conductivity of the different associated layers. The electrochromic cell may be treated as a group of resistors in parallel, with the first resistor as the high conductivity metal layer. The high conductivity of the layer allows more electricity to reach the center of the associated part rather than traveling perpendicular to the plane of the coating near the edge of the cell, which in turn leads to a more even darkening of the part. The assumption is that there are no appreciable voltage drops in the direction perpendicular to the metal coating, as is typically the case when using a TCO as the transparent electrode.

When additional layers are added to the top of a metal layer, such as in the case of an IMI stack, then additional design criteria come are necessary which may be tailored for additional benefits within the electrochromic cell. By placing a relatively high conductivity TCO on top of a metal layer, no appreciable voltage drop perpendicular to the metal layer is introduced. However, if the TCO or other dielectric layer has relatively low conductivity then an additional voltage drop occurs perpendicular to the metal surface thereby limiting the current flow. This additional voltage drop evens out the voltage drop perpendicular to the surface at the edge of the part compared to the center of the viewing area. The quantitative benefit is a function of many variables such as cell spacing, fluid properties, cell size and relative conductivity of the different materials. The net effect is that in certain applications more uniform darkening may be obtained by introducing a relatively low conductivity layer between the higher conductivity metal layer and the electrochromic medium.

The issue of necessary conductivity and the location of specific levels of conductivity are important for IMI coatings constructed of multiple metal layers. The cost of multiple metal IMI coatings is reduced dramatically if high cost materials such as ITO are not needed in all parts of the IMI stack. For example, in a two silver layer stack the center dielectric layer is often up to 700 angstroms or more in thickness and the top and bottom dielectrics can be in excess of 350 angstroms, with the total amount of ITO in the stack being about 1400 angstroms and thereby introducing a substantial cost to the product. By substituting some or all of the ITO with a material with less conductivity, the overall performance of the coating is not compromised but the cost is reduced dramatically.

The material immediately in contact with the electrochromic medium is critical to the performance of the electrochromic device. For instance, some materials react with materials in the seal or fluid and passivate all or parts of the surface which results in differences in the darkening properties of the electrochromic device. Passivation may be minimized by ensuring that the top layer of the IMI coating has certain desirable properties. One such property is the ability of the layer to conduct electricity which can be defined by the material's intrinsic conductivity which is measured in Siemens-per-cm (S/cm). The probability of passivation may be significantly reduced when the top layer is configured to have electrical conductivity as low as about 10 S/cm. According to embodiments of present invention, the conductivity of the top layer is preferably greater than about 10 S/cm, more preferably greater than about 100 S/cm and most preferably greater than about 1,000 S/cm. A normally low conductivity layer may be made viable as the top layer next to the electrochromic medium by altering the composition through doping or stoichiometry to introduce a level of conductivity sufficient to reduce the passivation. Other chemical means may be employed to render an incompatible material viable by altering the surface chemistry of the layer. Appropriate application of chemical ligands or moieties can sufficiently alter the surface properties to minimize the potential for passivations.

The dielectric layer under the metal layer may be a TCO, however, it is not required. The overall conductivity of the IMI stack is not substantially improved if the base layer is not a TCO due to the substantially higher conductivity of the metal layer. Other preferred materials for the dielectric layer due to the increased conductivity of the metal layer include: ITO, IZO, AZO, ZnO, TiOx, CeOx, SnO2, SiN, SiO2, ZnS, NiOx, CrOx, NbOx, and ZrOx. The materials may be pure, stoichiometric or partially stoichiometric, doped or mixed with one another to provide intermediate properties. Preferably, if transmittance is to be optimized, materials should be avoided that display appreciable absorption. The absorbing materials may be preferred in cases where the materials have a relatively high refractive index and the absorption in the layer augments the reflectance and transmittance properties of the thin film interference optics and results in attributes which would not be practically attainable without the absorption. Other conductive oxides, sometimes used as electrochromic layers, which when capped with additional layers would not appreciably darken might also function as part of the IMI stack. These layers may be acceptable and may not require to be capped even if the layers darken slightly with the applied electric field. Materials such as WO3, NiO or IrO2 would fall in this category.

The layer immediately above and more importantly below the metal layer is critical to the overall properties of the IMI stack. As discussed above, certain materials may have effects on the transmittance and electrical properties of the stack. The layers adjacent to the metal layers also affect the adhesion of the metal layers to the dielectric layers. The barrier layer above the metal layer also may play a role of protecting the metal layer from the effects of deposition process of the subsequent dielectric layer. The top barrier layer is often thought of, therefore, as a sacrificial layer since it often becomes altered by subsequent deposition steps.

The structural integrity of the IMI stack may be compromised if the proper base layer or top layer is not used. IMI stacks with good structural integrity may be needed if the IMI coating is installed between a substrate (such as glass) and the epoxy (or other sealing method) sealant in an electrochromic device. The IMI stack therefore needs to have good adhesion to the glass and epoxy and also have good internal adhesion. The coating may become ineffectual in this application if the adhesion between any of these areas fails. A common failure point within an IMI coating often is between the metal layers and the neighboring materials. If this area does not have sufficient adhesion then the electrochromic device may suffer a catastrophic failure and cease to function. Materials that function well as a barrier layers to promote acceptable adhesion include, Ru, Ni, NiCr, NiCrOx, ZnO (or doped ZnO), Cu, Ti, Nb, NbOx, Ni, Pd, and Pt. The thickness of these layers may be adjusted to attain the necessary protective and adhesion properties. Typically, the thickness of metal layers used in this capacity would vary between several angstroms in thickness on the thin side and greater than 20 angstroms or 40 angstroms on the thick side. Preferably the thickness of a metallic barrier layer is between about 1 and 40 angstroms, more preferably between about 2 and 20 angstroms and most preferably between about 3 and 10 angstroms. Oxide, nitrides or other materials with lower absorption could be substantially thicker than the corresponding metal layers, with the thickness preferably less than or equal to about 150 angstroms, more preferably less than or equal to about 100 angstroms, and most preferably less than or equal to about 50 angstroms.

The layers next to the metal layers may also affect the performance of the metal layers during electrical switching or "cycling". The potential at which a metal will break down or go into solution is a function of the properties of the electrochromic cell. The neighboring materials to the metal of the IMI stack effect the maximum attainable potential difference before damage to the coating occurs. Typically, noble metals as neighboring materials will help metals such as silver survive at higher applied switching potentials, and preferably include Au, Ru, Rh, Pd, Cd, Cu, Ni, Pt, and Ir. Barrier materials may also alter the electrical potential at which breakdown or de-plating occurs during electrical cycling. Preferably a neighboring material or electrical stabilization layer, will increase the viable usable applied electrical potential of silver or another metal described herein as a viable substitute for Ag by about 0.05 volts more preferably it will increase the usable potential by about 0.10 volts, even more preferably by about 0.20 volts, even most preferably above about 0.30 volts. Appropriate selection of the neighboring materials will increase the viable applied potential to the cell. The viable potential needed for an IMI stack will change if the IMI is used as the cathode or the anode.

Another means that may be used to further stabilize the IMI coating to survive higher applied potentials includes alloying the metal layer with metals which themselves can survive higher applied potentials. For instance, gold may be doped or alloyed with silver to allow the silver to survive higher applied potentials. Other materials which may be useful include other noble metals, and preferably include Pd, Si, Ge, Mg, Au, optisils, Ti, or Cu.

In addition to surviving at higher applied voltages, the IMI coating needs to survive scratches or other damages without the damage growing with time or electrical cycling. This may be attained by including additives to the metal which will "heal" a defect. For instance, indium or titanium doping in a silver metal layer may cause a migration to either the grain boundary or to the interfaces of the silver layer to prevent the silver from agglomerating or becoming further damaged. These healing capabilities may be obtained by doping the silver with elements or compounds which naturally migrate to the grain boundaries of the material or the interfaces.

The stability of IMI stacks, and, in particular, silver-based IMI stacks, is dependent on the properties of the metal layer. Typically, in environmentally-harsh conditions typical of accelerated weathering tests, the coatings break down or degrade at the metal layer. Ideally, the IMI stack would provide a pinhole free coating, however, it is nearly impossible to make a perfect coating in production. As a result, other means are needed to stabilize or protect IMI coatings so that these will not break down during the expected use life cycle.

A common degradation mechanism for silver-based IMI coatings is for the silver layer to re-crystallize or agglomerate forming large low-energy structures. This agglomeration process is caused by the thermodynamic drive for the silver layer to locate to a low energy state. The degradation mechanism can be slowed or stopped by interrupting the process by eliminating one or more of the intermediate steps in the overall degradation mechanism. For instance, the initial energy state of the silver layer is a critical factor for whether or not the agglomeration can take place or the rate of formation. If the silver layer is deposited or subsequent to deposition is put into a stable thermodynamic state by post processing, the IMI will resist agglomeration when subsequently exposed to external stimuli as there is no significant energy drive for the silver layer. The silver can be put into a lower energy state by several different means. The first is to select appropriate barrier or base layer materials for the stack such that during the deposition process the silver naturally falls into its low energy state. Zinc oxide as a base layer is particularly well suited for this task. Other materials also have benefits and are preferred such as Sb.

The second is the use of ion beam assisted deposition, while the third includes options such as plasmons, metastables, etc. The treatment of the base layer and/or the top of the metal layer before the deposition of the subsequent layers may also modify the surface and thus promote improved nucleation and/or adhesion. Chemical means may also be employed to allow the silver layer to be deposited into a lower energy state or to bind the silver layer to the barriers or base layers thus limiting the silver layer's ability to agglomerate. Preferable metal barriers include NiCr and other Ni alloys and noble metals. The pretreatment of the dielectric layer or metallic barrier or other neighboring material with a sulfur containing compound such as a di-sulfide can substantially improve the nucleation and bonding of an silver metal layer to the base layer. The enhanced nucleation and improved bonding which results from the treatment can substantially improve the stability of the silver or metal layer thus extending is usable lifetime. Other means may be used to introduce small amounts of sulfur into appropriate positions in the IMI stack. For instance, small amounts of a sulfur containing gas (such as $H_2S$ or SO2) may be added to the deposition process. Further, a given target may be intentionally doped with appropriate levels of sulfur. This approach has the added benefit of not introducing a highly reactive gas into a deposition chamber, while allowing the amount of sulfur to be easily controlled. The zinc oxide barrier layer described above may be doped with a small amount of sulfur to assist in the enhancement of adhesion of the silver layer to the barrier layer.

In addition to improving the useful life of the parts these means also help the intra-stack adhesion of the layers which comprise the IMI coating. Improving the intra-stack adhesion allows the stack to be used in more applications without the need for elaborate masking to protect the stack from the forces applied by epoxy sealants or other similar stressors.

Alloying Metal Layers of IMI Coatings.

The stability of the silver or metal layer can also be enhanced by the addition of dopants to the metal layer. In the case of silver, the diffusion of the silver atoms is approximately 100 times faster along the surface grain boundaries than in the bulk metal crystallites. It is expected therefore that the main pathway for agglomeration occurs due to silver atom diffusion along the surface or grain boundaries. The likelihood that diffusion will occur across the surfaces will be reduced when the silver is sandwiched between layers. The selection of appropriate materials or chemical treatments to the neighboring materials next to the metal layer will further reduce the likelihood of surface related diffusion and agglomeration. The grain boundaries then become the dominant pathway for the silver layer to agglomerate. The diffusion along the grain boundaries can be impeded by doping the silver with elements or compounds which have limited solubility in the silver grains and migrate to the grain boundary. These dopants limit the diffusion of the silver atoms along the grain boundaries, and preferably include Pd, Cu, In, Zn or Ti.

Dopants and stabilizing layers have been proposed and commercialized that give silver acceptable resistance to both copper-accelerated salt spray (CASS) testing from a chemical durability perspective and electrochemical stability from an EC device electrical cycling perspective. A commonly-assigned U.S. Pat. No. 6,700,692 taught that platinum group metals, such as Pt and Pd along with Au were the preferred dopants for Ag, and that noble metals such as Ru, Rh and Mo were preferred materials for stabilization layers. No specific examples were given, however, that pertain specifically to the dopants alone and their effect on chemical or environmental durability of Ag. Prior art simply implied that the platinum group metals within the silver layer provide the electrochemical stability while the layers below (and/or above) the silver provide the CASS resistance.

We discovered specific solutions that allow for substantial improvement of the durability of Ag and Ag-alloys through the use of alternate dopants and without stabilization layers. The basic structure of an underlying embodiment included Glass/125 nm ITO/50 nm silver or silver alloy/15 nm of ITO. Fully assembled EC-elements were run through the CASS testing and steam testing, while epoxy-sealed EC-cells without EC-medium were subjected to "blow" tests. CASS testing was performed according to recognized industrial standards. In the "steam" tests the parts were held in an autoclave at approximately 13 psi and 120 C in a steam environment and checked once a day until failure. In the case of CASS two failure modes are noted—coating degradation and seal integrity. In the case of the steam tests, only seal failure is reported. In the blow test, a hole is drilled in a part, the part is gradually pressurized until failure occurs, and the pressure at failure is noted. When conducting "blow" testing, a number of failure modes are possible. For example, adhesion of the coating materials to the glass, adhesion of the coating materials to each other and adhesion of the coating materials to the epoxy may be characterized using the "blow".

Table 6c shows the CASS, Steam and Blow results, obtained with multiple samples, for pure silver and different silver alloys. The average values are presented for the Steam and Blow tests, while results of the CASS tests are expressed in days to failure. It is believed that ability of a material to survive approximately 2 days without coating damage (in CASS test) is sufficient for most vehicle interior applications. All CASS tests were stopped at 17 days or 400 hours, which corresponds to a relatively long exterior vehicle test. Depending on the application the CASS requirement may vary between these two extrema. The pure silver has the worst performance in the steam test, relatively poor CASS results, and relatively poor adhesion in the blow tests that demonstrated substantial intra-coating delamination. Samples made with the traditional dopants, Pd, Pt and Au, are also shown in Table 6c. Improvements are demonstrated for the steam and blow tests relative to the pure silver but the CASS results are still not adequate. Similarly, the AgIn alloy has improved properties in Steam and Blow but the CASS results are improved but not adequate for all applications.

Silver alloys known as Optisil™ (supplied by APM Inc) were also evaluated. Three versions, 592, 595 and 598 were tested. The compositions are shown below in Table 6d. Each version demonstrates substantial improvement relative to the pure silver with the Optisil 598 showing the best performance. The Optisil 598 has some coating lift in the blow tests but percentage of coating lift was very small and this also corresponded with the highest average blow value. Therefore, even though some lift is present, the results do not show significant failure mode for this material. The Optisil materials are viable for interior vehicle applications and some are viable for external applications also. A number of sterling silver alloys were tested. The approximate compositions, based on analysis of the sputtering targets, are shown in Table 6d. These particular alloys show substantial improvement over the pure silver. The Sterling "88" and 51140 alloys had the best performance of the group with the 51308 and Argentium having lesser performance. In the Optisil family, the lower levels of Cu and Zn provide better CASS resistance. For the Argentium, the copper and germanium additions help improve the CASS resistance. The "Sterling" samples benefited from the addition of copper (all), zinc and Si (88 and 51308) and Sn (51308).

TABLE 6c

Days to Failure
(Results are for all parts in test unless noted)

| Material | CASS Coating | CASS Seal | Steam Day-To-Fail | Steam % Coating lift | Blow PSI |
|---|---|---|---|---|---|
| Ag 99.99% | 1 (1 part ok to day 12) | 1 (1 part ok to day 12) | 4.3 | 30 | 31.2[#] |
| Optisil 592 | 5.5 (2 part average) (2 parts ok to day 17) | 15 | 20.5 | 0.8 | 32.4 |
| Opti 595 | 17 | 17 | 20.2 | 15.8 | 30.1 |
| Optisil 598 | 17 | 17 | 24.3 | 0.83 | 41.5[#] |
| 83Ag/17In | 1 | 6.25 | 19.7 | 0 | 37.0 |
| Ag94/Pt6 | 1 | 1 | 18.7 | 4.2 | 35.2[#] |
| Ag96/Pd3 | 1 | 1 | 12.2 | 86.7 | 39.4[#] |
| Argentium sterling | 1 (2 part average) (2 parts ok to day 17) | 5.5 (2 part average) (2 parts ok to day 17) | 27.3 | 0 | 38.1[#] |
| Sterling "88" | 17 | 9 (2 part average) (2 parts ok to day 17) | 21.3 | 0 | 28.5 |
| Sterling 51140* | 7 (1 part) (3 parts ok to day 17) | 7 (1 part) (3 parts ok to day 17) | 23.7 | 0 | 32.1 |
| Sterling 51308 | 8 | 8 | 20.7 | 8.3 | 34.6 |
| Ag93/Au7 | 1 | 1.33 | 13.3 | 25.8 | 29.2[#] |
| Ag16Au | 2 | 2 | 18.3 | 22.5 | 30.2 |
| Ag76/Au24 | 1 | 1.33 | 11.3 | 95.8 | 40.5 |

*These parts had some suspended data in steam tests, therefore actual average is higher than reported values
[#]These part had some intra-coating adhesion failures TABLE 6d Silver Alloy Compositions

| Name | Ag | Cu | Ge | Zn | Sn | Si | Au | In |
|---|---|---|---|---|---|---|---|---|
| Argentium | 91.73 | 6.879 | 1.329 | | | | | |
| Sterling 51308 | 92.76 | 2.775 | | 4.194 | 0.1097 | 0.0894 | 0.0153 | |

TABLE 6d-continued

| | Silver Alloy Compositions | | | | | | | |
|---|---|---|---|---|---|---|---|---|
| Name | Ag | Cu | Ge | Zn | Sn | Si | Au | In |
| Sterling 51140 | 92.18 | 7.779 | | | | | | |
| Sterling 88 | 92.49 | 5.5403 | | 1.8833 | | 0.0422 | | |
| Optisil 598 | 98.24 | 1.134 | | 0.4805 | | 0.088 | | |
| Optisil 595 | 95.04 | 2.761 | | 1.892 | 0.0573 | 0.2066 | | |
| Optisil 592 | 92.95 | 4.767 | | 2.064 | 0.1183 | 0.0577 | | |
| Ag/In | 82.82 | 0.0124 | | 0.0056 | | | 0.0114 | 17.13 |

Material degradation usually occurs in multiple ways, and there are often multiple possible protection pathways and the different elements doped into or alloyed with the silver can act to stabilize the metal thus improving its performance. The different silver alloys may contain one or more elements that act on one or more of the protection pathways to stabilize the silver. Silver often degrades by migration into a lower energy state. The silver atoms are 100 times more mobile along the boundary of an Ag-grain than within the bulk of the grain. Therefore, addition of an element migrating to the Ag-grain boundary and inhibiting the mobility of the silver is expected act to improve the durability of Ag. Metals such as Ti and Al are often corrosion resistant because they oxidize and the surface oxide seals the metal preventing further reactions. In the case of silver, elements may be added to the metal that act to protect the silver from the corrosive or degradation of environmental stressors. In other cases an element may be added that forms an alloy with the silver that alters the chemical or environmental activity of the silver. The Sterling silver alloys described above may, in part, contribute to this stabilization method. Still other methods to stabilize the silver include the use of an interface treatment as taught in Our Prior Applications, where sulfur or other element is embedded into the surface of a coating or substrate prior to the deposition of the silver or silver alloy. Out Prior Applications also taught the deposition of silver or a silver alloy onto a ZnO or other surface that puts the deposited material into a low energy state, thereby improving its environmental durability. The silver layer may also be protected by the application of metal or non-metal (oxide, nitrides, etc) either above or below the silver layer. Additionally, the silver or silver alloy may be protected by being overcoated with a relatively thick oxide layer such as ITO. It is recognized that variation of deposition conditions such as target shielding angles, target to substrate distance, composition of residual background gasses, speed of layer growth, e.g., may produce somewhat varying results. Nonetheless, the trend of improvement of various characteristics for noted materials noted is expected to hold over a range of parameters, particularly those typical for magnetron sputtering.

Specific elements that may be added to the silver that can enable one or more of the stabilization mechanisms described above include: Al, Zn, Cu, Sn, Si, Ge, Mn, Mg, W, Sb, B, Cr, Th, Ta, Li and In. These can be used either alone or in combination to enable good CASS performance, adequate Steam lifetime and good adhesion. Preferably, the CASS resistance should be greater than about 2 days, preferably greater than 5 days, more preferably greater than 10 days and most preferably greater than 17 days. The steam lifetime should be greater than 10 days, preferably greater than 15 days, and more preferably greater than 20 days. The coating stack should maintain adherence to glass, epoxy and within itself during adhesion tests. The blow test described above demonstrates relative performance among a set of samples but the test is dependent on mirror shape, pressure ramp rate, edge treatment and epoxy type as well as coating performance.

Another factor which that affects the agglomeration of silver and other metals is the adhesion of the metal to the neighboring metals. While preferred metals and materials were discussed above, certain applications may render these previously acceptable materials unacceptable. Certain elements such as Na, Mg, Ca or other constituents found in glass substrates can cause adhesion problems between the silver or other metal layer and the neighboring materials. These elements affect the adhesion of the silver layer and thus weaken one of the links preventing or stabilizing the silver layer to agglomeration. These elements often diffuse from the substrate under high temperature and high humidity conditions or during thermal processing of the coated glass, and can diffuse from the substrate more slowly under normal operation conditions thereby resulting in so-called latent defects.

The amount of Na that may diffuse from the substrate is affected by the presence of elemental hydrogen or protons in the coatings stack. The sodium in the glass as a positive ion and in order to maintain charge neutrality, a counter ion must move into the glass matrix. The proton acts in this capacity. Therefore, it is critical that hydrogen is minimized in the coating. This may be accomplished by operating the deposition process in a manner to minimize the hydrogen or water content within the associated processing machinery. It is critical to minimize the water along with the hydrogen due to the fact that the water is easily broken down in the plasmas to liberate the hydrogen. The water and hydrogen may be minimized by the appropriate selection of pumps in the process and the use of water traps such as polycolds. Careful leak detection and elimination are also important.

Another way to minimize the impact of sodium and other glass constituents on the breakdown of an IMI coating include the use of a barrier layer. Typically, barrier layers are principally composed of silica and are deposited directly onto the glass substrate due to the close match in refractive indices. Dopants are often added to the silica barrier layer to help promote the blocking of elemental transfer. Materials such as phosphorus doped silica and aluminum phosphate may also be used.

It is important that barrier layers are amorphous in nature. Crystalline layers, with their numerous grain boundaries, typically are less effective in blocking the transfer of small elements. Further, the barrier layer does not need to be directly deposited onto the glass, and be integrated into the IMI stack as a function or optical layer and simultaneously play the role of a barrier layer. Silicon nitride and zinc stannate are particularly effective barrier layer materials. The efficiency of the silicon nitride for blocking the diffusion of elements may be improved by altering the composition of the silicon nitride by making the silicon nitride slightly silicon rich, thereby enhancing the sodium blocking properties of the layer.

The benefits of using an amorphous layer below the metal may also be applied to the layer above the metal. The top dielectric may be designed so that some or the entire layer is composed of an amorphous layer. The amorphous layer limits the diffusion of environmental moisture or other chemicals down to the IMI stack, thus extending the lifetime thereof.

The stress level in dielectric and/or the metal or silver layer also affects the lifetime of the IMI stack, as the stress in the materials creates different types of forces on the metal layers. For instance, if the layer above the silver layer is in compressive stress then it puts a vertically oriented force upon the metal. This force may then accelerate or enhance any inherent drive for the metals to agglomerate. The preferred state, from a stress standpoint, is when the metals and dielectrics are at comparable stress states, either both tensile or both compressive. The magnitude of the driving force the stress exerts on the metals dictates how significant an issue the stress becomes on the lifetime of the IMI stack. A preferred level of absolute stress for the dialetric layer is below 3 GPa, more preferably below 1.5, and most preferably below 0.5. The stress in the materials is usually a function of the material properties but are also dependent on the process parameters used to deposit the layers. If MSVD techniques are used to deposit the layers then the pressure is a key variable for adjusting the stress level in the coating. High stress levels promote tensile stress conditions while low pressure promotes compressive stresses. The ratio of the sputtered atom to the sputtering gas atomic masses also plays a role in the final stress in the coatings. A higher mass in the sputtering gas will promote more tensile stress while a lower mass will promote more compressive stresses. Dopants or low level additives can also be used to help tailor the stress levels in the layers. It is an advantage for one or more of the layers to be deposited with different sputtering gasses or pressures to attain the necessary stress levels. Ion beam assisted deposition or other means to provide energy to the system may be used to help tailor the stress levels in the different layers.

Construction IMI coatings with essentially neutral stress profiles have the added benefit of not distorting the glass or substrate. The internal stress in the coatings, inherent during the deposition process or due to differences in the coefficient of thermal expansion, exert forces on the substrate thus causing warping or deflection in the substrate. In mirror or window applications, where flatness and uniform cell spacing are critical features of the product, then deflection of the substrates due to stresses in the coatings can be very problematic. The IMI coatings with neutralized stresses help minimize the warping issue thus resulting in an overall superior product. As substrates are thinned for weight savings the amount of deflection for a given stress level increases. Therefore, the issue is exacerbated under these conditions and the need for a stress neutral product is more important. The stress in the IMI should be controlled such that the change in radius of curvature of the glass with the application of the IMI coating is greater 3000 mm, preferably greater than 5000 mm and most preferably greater than about 10,000 mm.

As noted above, the properties of IMI coatings may change with thermal processing. Epoxies are typically used to seal two lites of glass together to form an electrochromic cell with preferred time and temperature curing profiles giving rise to optimal epoxy profiles. Certain existing families of profiles yield equivalent epoxy properties. The selection of a given profile is often then based on other criteria such as economics, speed of processing or other practical matters. Typically, a TCO based transparent electrode will not significantly change properties during the thermal processing, thereby providing no reason to select a given furnace profile for curing the epoxy. However, these thermal profiles may be utilized to optimize the properties of an IMI coating. For example, the sheet resistance may be lowered by up to 2-3 ohms and the transmittance may be increased by 1-3% depending on the time temperature profile. In this manner, the IMI properties are improved to a state not necessarily attainable by adjusting the deposition properties. The reason for the improved properties is expected to be due to increases in the electron mobility of the electrons in the metal. As noted above, metals (silver) have lower refractive indices when the electron mobility is relatively large with the lower refractive index contributing to the higher light transmittance, and the higher electron mobility also then contributes to the lower sheet resistance.

If the epoxy cure-profile cannot be adjusted to fully optimize the IMI properties because of limitation in the epoxy or in other components of the electrochromic cell then the IMI coated glass can be pretreated in a different furnace or oven to attain the desired properties. The thermal processing of the IMI may also have the beneficial property of having lower stress levels, thereby keeping the glass relatively flat. The optimal increase in transmittance and decrease in sheet resistance is often a function of the ambient atmosphere. Typically, the coating may break down at earlier times or at lower temperatures if the preferred gas is not used. The preferred gas is often a function of the dielectric layers which are used in the IMI stack. Some materials are particularly effective at blocking the diffusion of different gasses. Silicon nitride, for example, an amorphous material, is particularly useful at blocking the diffusion of oxygen during the heat treatment of IMI stacks. The base layers and barrier layers discussed above for improving environmental durability also play a role in shifting the thermal cure behavior.

In some cases the method of heating the glass can be selected to alter the cure profile behavior. For instance, infrared wavelengths can be used which pass through the glass but couple effectively to the IMI coating. Heating the glass in this method is akin to heating the coated glass lite from the bottom up. Typically, in a convection oven or traditional infrared oven the electrochromic cell is heated from the outside in. The outer surface of the top and bottom glass lite is exposed to the convection gasses and/or the infrared radiation. If the infrared radiation is peaked at wavelengths greater than about 5 microns wavelength then only the surface of the glass is heated. The glass and epoxy are then heated by conduction from the surface into the bulk. The coated surface is the last portion of the part to receive the heat. When hotter infrared elements are used to heat the part then the bulk of the infrared radiation is at wavelength shorter than about 2.5 microns. As the glass is quite transparent, the radiation passes through the glass without being absorbed. The energy couples to the IMI coating due to its unique optical properties resulting in the coated surface potentially heating up at a faster rate than the outer surface which is actually closer to the heat source, thereby reducing the curing time such that the bulk temperature of the glass may be reduced in the process. The epoxy will heat up faster also as it is in direct contact with the epoxy.

The IMI coating may be applied using an on-line coater such as a rotary coater or in-line singles coater. These coater types will allow the coating to be laid up relatively quickly after the deposition has occurred. Each of these methods has different options for masking. These methods then allow for using a greater range of materials since the coatings will not be exposed to the atmosphere for any extended periods of time. The sealing of the IMI stack in an electrochromic cell can thus protect it from many harmful environmental stressors. In some cases, an IMI stack is optimized for a given set of criteria resulting in less than optimal environmental durability. As noted above, one method to deal with this situation is to mask the IMI coating in board of the epoxy. This is a viable method to deal with the issue. However, some applications may not allow for masking the IMI in board of the epoxy. In this case a protective edge coating, such as a polymer coater, etc., which can encapsulate the IMI coating thus preventing contact with any harmful chemicals in the environment is applied.

In other situations it may be advantageous to make the IMI stack in large area coaters and store the glass for use at later time on production lines which do not have coaters. Methods were discussed above on how the IMI stack can be designed to optimize the stack for this type of manufacturing scenario. For example, a temporary overcoat material such as a low tack plastic sheet or a chemical protective material such as PVA may be applied. These materials may be either physically removed after any mechanical process or before washing. In the case of using water soluble chemical protective layer such as PVA, the washer itself may be utilized as the means of removing the temporary coating. Other temporary coatings such as Zn metal may be used. In this case, a mild acid may be necessary in the first sections of the washer to remove the layer. Other treatments as known in the art are also viable.

Certain electrochemical mirror applications may incorporate the hiding of the epoxy seal by applying a reflective layer on the top lite of glass. The methods and materials useful in such applications are disclosed in U.S. Patent Application Publication No. 2004/0032638, entitled ELECTROCHROMIC DEVICES WITH THIN BEZEL-COVERED EDGE, filed May 6, 2003, which is incorporated herein by reference. The use of an IMI coating as the transparent electrode in these devices introduces some significant changes. For instance, it is not cost effective in some applications to deposit the reflective metal layers underneath the transparent electrode. This is because the TCOs such as ITO are used as the transparent electrode. These materials require high deposition temperatures to get adequate electrical and optical properties. The glass, with the reflective metal layer, is to be heated prior to the deposition of the TCO. The presence of this highly reflective metal around the edge of the glass substantially changes the heating behavior of the glass and can therefore introduce distortion into the part.

This problem is avoided if an IMI stack is used as the transparent electrode. The IMI coatings do not require high deposition temperatures during the deposition process. A metal layer or layers may then be applied prior to the IMI coating without the problems which would be associated with a TCO layer. If a rotary coater, or other coater capable of multiple masks, is used for the deposition then the metal layer can be applied to the glass in one (or more) station(s) with one mask then the IMI can be applied over the remainder of the glass with another mask. If necessary, the metal layer can then be masked in board from the epoxy while still maintaining good electrical contact to the edge of the part.

EXPERIMENTS

A first round of experiments demonstrated that the material next to the Ag layer affects the performance of the stack in blow tests, steam lifetime and the aesthetics of the final part. Steam lifetime is an accelerated test to gauge the stability of seals, coatings or combinations of these materials (described in more detail below). The tests showed that aluminum-doped zinc-oxide (AZO) is optimal for adhesion (29 psi and no intra-coating lift) while indium-zinc oxide (IZO) is optimal for steam lifetime (35 days). A second round of experiments were designed to build on these results and attained a compromise in steam lifetime but a match to the poorer blow test results of round 1 (lack of intra coating adhesion). Blow tests are a means to assess the adhesion of coatings to seals, substrates and intra-coating adhesion (described in more detail below). An unfilled EC element has a hole drilled in the glass and the chamber is pressurized until failure. The pressure at failure is noted along with the failure mode. The reflectivity of mirror elements was increased to 79% with optimized stacks from round 2 experiments. Room temperature electrical cycling of round 2 parts showed latent defects where scratches or finger prints were initially present.

It is noted that maximum transmittance and minimum resistance in was attained with IZO base layers and AZO top layers; that AZO/Ag/AZO stack provided maximum intra-coating adhesion and did not unzip in blow tests; that IZO directly on top of the Ag layer had poor adhesion; that stacks with IZO top layers have good stability in steam tests while the stacks with AZO top layer had poor performance in steam tests; and that the cosmetics with IZO top layer were improved.

In the first round of experiments silver was used in combination with aluminum-doped zinc oxide (AZO) and indium-zinc oxide (IZO) to produce 3 layer IMI stacks for evaluation. The AZO target used was ZnO containing 2% $Al_2O_3$ by weight. The IZO target used was $In_2O_3$ containing 15% ZnO by weight. AZO is a transparent conductive oxide similar to ITO but with somewhat lower conductivity. Like ITO, AZO requires significant substrate temperature during deposition to maximize crystallinity and develop optimum electrical properties. AZO has the unique property of lattice matching to Ag. This leads to IMI stacks with lower sheet resistance and higher transmittance. IZO, in contrast, is an amorphous material and can be deposited at room temperature without a loss of conductivity. The amorphous nature of IZO gives it the added benefit of smoothness. The IZO composition can vary from almost 100% zinc content to almost 100% indium content. We have selected one In/Zn composition for our study. AZO tends to form rougher films due to its crystalline nature. Too much roughness can adversely affect the transmittance and conductivity of the silver layer in an IMI stack thus negating the benefit to the Ag layer attained with appropriate AZO properties.

The absolute conductivity of the dielectric layers in the IMI stacks does not significantly affect the performance of the stacks since the functional conductivity is derived from the silver layer and the dielectric layers are too thin to function as insulators. AZO is extremely inexpensive and has the added benefit of having good adhesion to silver. In addition, silver shows enhanced properties when grown on top of AZO due to a good crystallographic lattice match between the materials. The chemical resistance of AZO however, is not exceptional. IZO, being chiefly comprised of indium-oxide, is expensive; however, it has better conductivity and chemical resistance than AZO. The 15% Zn/85% In target composition was used in this example but other mixtures that have either more or less indium can be used. In at least one embodiment it may preferred that the IZO is amorphous.

For simplicity, mechanical and chemical durability, not color or transmittance, was the primary concern for this series of experiments, the dielectric layer thickness was fixed at 350 Å. For these initial experiments, AZO was deposited with argon only. No oxygen was added. The IZO layers were deposited with 4% $O_2$ in argon.

The coating stacks prepared and their properties are given in Table 7. In each stack, the nominal dielectric layer thickness is 350 Å and the nominal silver thickness is 110 Å. These stacks were used to produce electrochromic mirrors. The modeled effect of having the coating next to air and electrochromic fluid are shown in Table 6. An automotive inside mirror shape was used with a highly reflective third surface coating. The IMI coated glass formed the transparent top plate. The optical properties of the mirror assemblies are listed in Table 7. Part "1173 IEC" refers to a reference part made with ½ wave ITO as the transparent electrode. The mirror assemblies were blow-tested to evaluate the IMI coating adhesion. Filled mirrors were steam tested for durability.

TABLE 7

IMI coatings and their properties.

| Stack | % T (D65-10°) | % T Post Curing Oven | Sheet Resistance (Ω/□) |
|---|---|---|---|
| Glass | AZO | Ag | AZO | 83.1 | 85.4 | 6.8 |
| Glass | AZO | Ag | IZO | 80.9 | 83.5 | 7.3 |
| Glass | IZO | Ag | AZO | 85.3 | 86.5 | 6.1 |
| Glass | IZO | Ag | IZO | 82.8 | 84.5 | 7.0 |
| Full Wave ITO (2895 Å) | 85.2 | — | 6.2 |
| ½ Wave ITO (1447 Å) | 88.9 | — | 12.4 |

The transmittance data given in Table 7 corresponds to monolithic glass measured in air, not against EC fluid. The sheet resistances in the 6 to 7 ohm range are roughly equivalent to that of full wave ITO. As shown, the transmittance of full wave ITO on 1.6 min glass is approximately 85%. The IMI stack shows an increase in transmittance caused by thermal processing in the epoxy cure oven for an element whose epoxy is made and cured in accordance with the general principles described in U.S. Pat. Nos. 6,195,193B1 and 6,963,439B2. The direct comparison of transmittance between the two transparent electrodes can only be made when both coatings are in contact with the EC fluid. This requires either calculation using thin film models or measurement of an EC cell with both materials. The modeled transmittance values for these options are shown in Table 8.

TABLE 8

Change in transmittance with adjacent medium (sample stack models).

| Sample | Ag (Å) | Top Dielectric (Å) | % T (air) | % T (EC fluid) | Change |
|---|---|---|---|---|---|
| ½ λ ITO | — | — | 88.0 | 92.4 | +4.4 |
| AZO|Ag|AZO | 110 | 350 | 87.1 | 82.5 | −4.6 |
| IZO|Ag|AZO|IZO | 110 | 450 | 88.0 | 84.6 | −3.4 |
| IZO|AZO|Ag|AZO|IZO | 85 | 500 | 88.2 | 87.4 | −0.8 |
| IZO|AZO|Ag|AZO|IZO | 85 | 550 | 85.2 | 86.3 | +1.1 |

The reflectance of the cells prepared with the IMI top plates is significantly lower than a mirror with a ½ wave ITO top plate. Again, the sheet resistance of the IMI top plates is half that of the production ½ wave ITO used for the standard part. However, as stated above, the IMI stacks from the Round-1 experiments were not optimized for color or transmittance. The relative reflectance for the cells listed in Table 9 is inconsistent with the singles transmittance values. It is unclear why this is so. The transmittance change with heat treatment is consistent from sample to sample in this group. However, this change, as well as levels of adhesion and to some degree optical constants of materials will to some level be a function of coating parameters and conditions. Blow test values are obtained by taking an empty element cell which has undergone curing of the epoxy and having the fill hole plugged, drilling a hole of approximately 1.5 mm in diameter approximately ½ inch from the edge of the element. Parts are pressurized at a rate of 0.5 or 1 psi/second and the pressure at failure is noted. The failure mechanism is also noted such as coating separating from the glass or separation within the coating stack or separation of the epoxy within itself. Steam tests values are obtained via the test procedure described in U.S. Pat. No. 6,195,193, entitled SEAL FOR ELECTROCHROMIC DEVICES, issued Feb. 27, 2001, which is hereby included by reference.

TABLE 9

Mirror cell optical properties (GMR4 back plate, light state, averaged data).

| Stack | % R | L* | a* | b* |
|---|---|---|---|---|
| Glass | AZO | Ag | AZO | 70.8 | 87.4 | −3.5 | 7.0 |
| Glass | AZO | Ag | IZO | 69.5 | 86.8 | −3.3 | 6.1 |
| Glass | IZO | Ag | AZO | 74.8 | 89.3 | −3.8 | 4.0 |
| Glass | IZO | Ag | IZO | 74.0 | 88.9 | −3.8 | 3.4 |
| 1173 IEC Part | 86.8 | 94.7 | −3.7 | 6.0 |

Often, in order to compensate for variations in seal widths, it is sometimes valuable to "normalize" the data before performing further statistical analyses. One way to do this is to take the test value multiplied by the normal seal widths and divide this by the actual seal widths for each individual part.

The average blow value for the AZO|Ag|AZO stack is essentially equivalent to the parts with ITO as the transparent electrode. For the different stacks evaluated we found Glass/AZO/Ag/AZO is equivalent to ITO while the other stacks were approximately 20% lower in value with some intra-stack layer delaminations. Having an AZO layer on each side of the silver provides the highest level of adhesion. The high blow value is reinforced by the total lack of lift in the IMI layer for the AZO|Ag|AZO samples. The percent of IMI coating lift is apparently correlated to the layer on top of the silver; AZO again giving the better result. The strongest trend in the steam data is enhanced performance for the stacks having IZO as the top layer.

In steam life testing for the same series of stacks shows on average, the IZO|Ag|IZO stack was the strongest performer in the steam test however the AZO|Ag|IZO stack is not far behind. Unfortunately, the strongest performer in the blow test is the poorest performer in the steam test. These strengths and weaknesses can be controlled to through innovative stack design.

The aesthetics of the element related to coloring and clearing uniformly can be affected my many factors, including the cure profile, choice of materials in the coating stack, and choice of materials in the seal material.

It is presently preferred to use the materials and cure methods much like those described in U.S. Pat. No. 6,195,193. Because of their excellent adhesion to glass, low oxygen permeability and good solvent resistance, epoxy-based organic resin sealing systems are preferred. These epoxy resin seals may be UV curing, such as described in U.S. Pat. No. 4,297,401, entitled LIQUID CRYSTAL DISPLAY AND PHOTOPOLYMEZIRABLE SEALANT THEREFOR or thermally curing, such as with mixtures of liquid epoxy resin with liquid polyimide resin or dicyandiamide, or they can be homopolymerized. The organic sealing resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability and spacers such as glass beads or rods can be used to control final seal thickness and substrate spacing. Suitable epoxy sealing resins for use in a perimeter seal member 116 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N." 431, 438, 439 and 444 available from Dow Chemical Co., Midland, Mich., meta-xylene diamine, 1,8-diamino-p-methane, isophrone diamine, 1,3-bis aminomethyl cyclohexane, 1,6-hexanediamine, diethylene triamine, 1,4 diamino cyclohexane, 1,3 diamino cyclohexane, 1,2 diamino cyclohexane, 1,3 pentane diamine, and 2-methylpentamethylene diamine.

Suitable epoxy curing agents include V-15, V-25 and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 2049, 352, CG, CG-325 and CG-1200 available from Air Products, Allentown, Pa.

Optional fillers include fumed silica such as "CAB-O-SIL" L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONF SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable precision glass microbead spacers are optionally available in an assortment of sizes from Duke Scientific, Palo Alto, Calif.

Optionally, silane coupling agents that may be incorporated to improve the seal's hydrolytic stability include Z-6020 (which is the same or very similar to A-1120 from Union Carbide), Z-6030, Z-6032, Z-6040, Z-6075 and Z-6076 available from Dow Corning Corporation, Midland, Mich.

In addition, the choice of crosslinked polymer or thickening agent, method of in situ crosslinking, choice of plug material, and the electrochromic species used may affect whether a particular combination of materials yields acceptable cosmetic results. Nonetheless, there is a tendency for TCO materials with better bulk conductivity to be somewhat less sensitive to various cosmetic issues when placed adjacent to the electrochromic medium.

Figure 9:
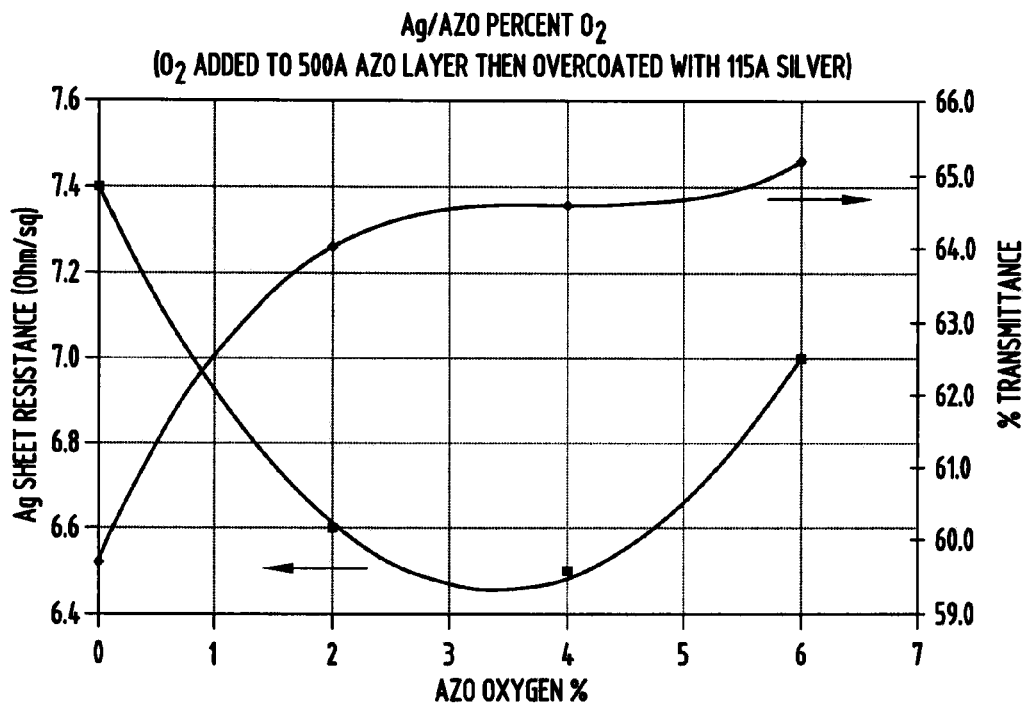
FIG. 9 is a graph of sheet resistance and transmittance versus oxygen percentage of a two-layer IMI stack.
Figure 10:
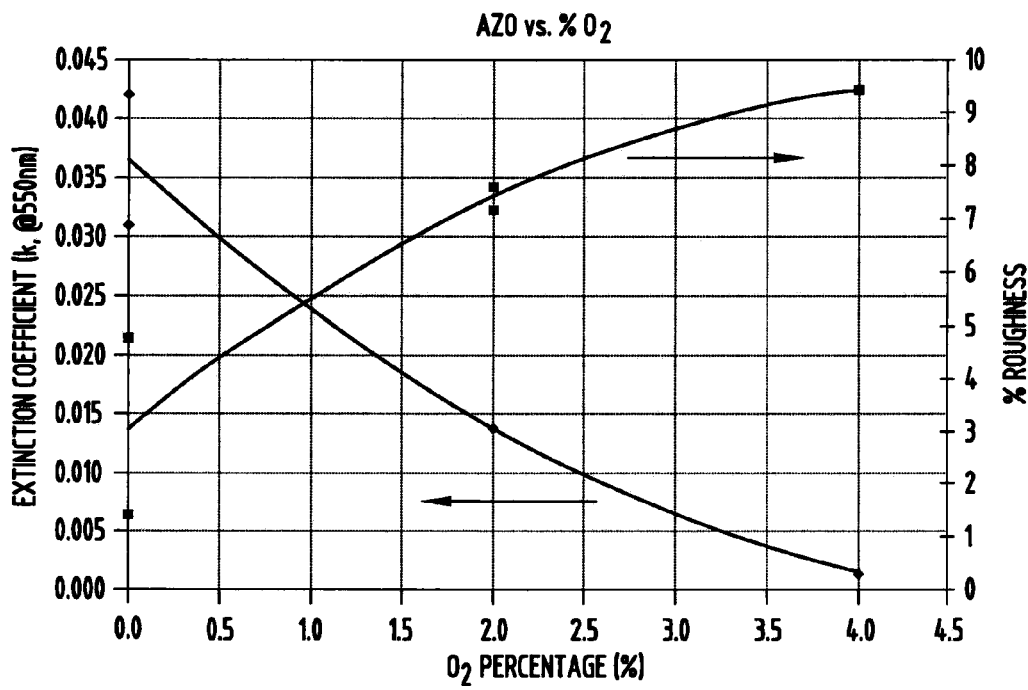
FIG. 10 is a graph of oxygen percentage versus extinction coefficient versus percent roughness of the two-layer IMI stack.
Figure 11:
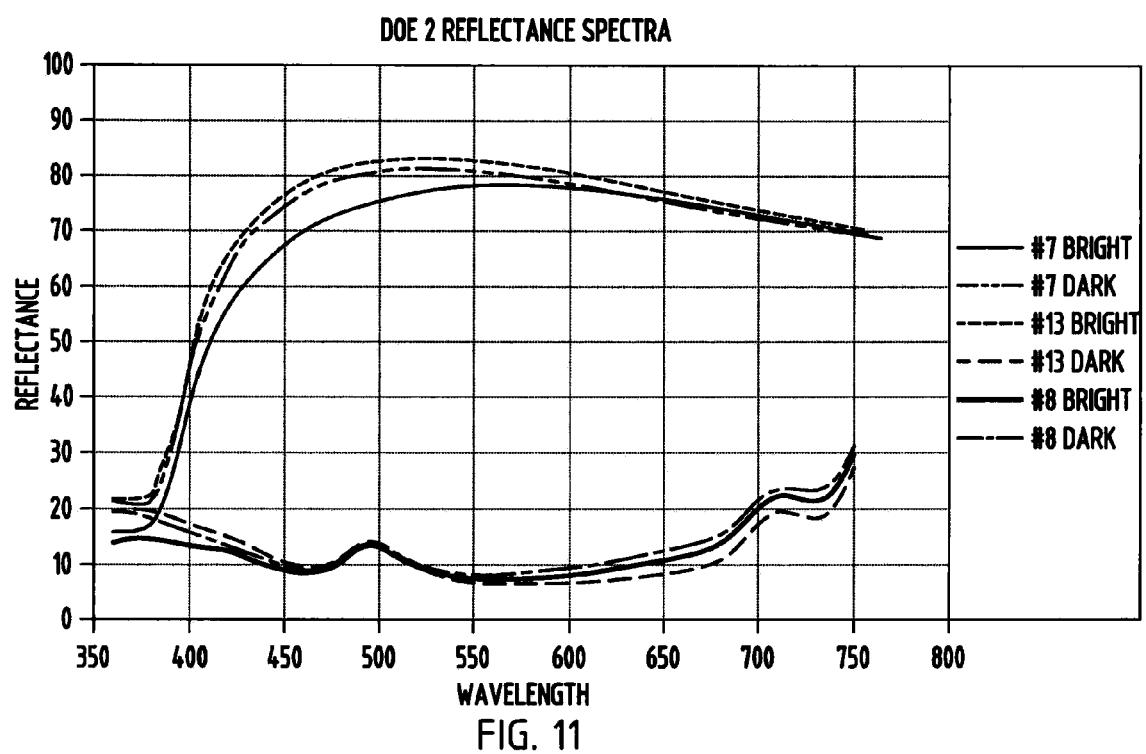
FIG. 11 is a graph of wavelength versus reflectance for DOE2 sample 7, 8, and 13.

In an experiment where the AZO oxidation level was optimized the effects of added $O_2$ on the conductivity and transmittance of a glass/AZO/Ag stack was shown. This will vary for different equipment and target compositions but the trends are indicative of some steps necessary for optimizing this type of stack. The sheet resistance and transmittance of the Glass|AZO|Ag stack were optimized in this manner. The effect of added $O_2$ on the conductivity and transmittance of this stack is shown in FIG. 9. The absolute conductivity of the AZO layer itself is not important, only its effect on the properties of the silver layer. This is the rationale for the optimization route taken. The addition of 4% $O_2$ to the argon gas feed gave optimum conductivity and transmittance. FIG. 10 shows the change in the extinction coefficient (absorbtivity) and roughness of the AZO with added $O_2$. The addition of 6% $O_2$ produces AZO with lower absorbance than at 4% however the roughness is also increasing. The increased roughness is the likely cause of the increase in sheet resistance observed at 6% $O_2$ in FIG. 9. This does suggest the potential to slightly increase the transmission of the stack by sacrificing some conductivity.

The AZO deposited for all the stacks prepared in this series of experiments was sputtered with 4% $O_2$, as was the IZO. Table 10 lists the stacks deposited in DOE-2 for evaluation. Also included, for comparison, are the transmittance and sheet resistance of full and half-wave ITO top plates. The rationale for these stack designs is to address adhesion and steam life. The AZO layers were placed on one or both sides of the Ag layers to improve adhesion, as measured by blow testing. The IZO was placed as the top most layer to help address steam lifetime. The layer thicknesses were adjusted to tune the stack for a bluish color in the darkened state and to maximize transmittance.

The transmittance of the stack designs varies from 84.5 to 87.3 percent. The sheet resistance varies from 5.0 to 9.0 Ohm/sq. For a given Ag thickness, the maximum transmittance and minimum sheet resistance occurs when the bottom layer consists of glass/IZO/AZO/Ag. The IZO keeps the layers smooth and the AZO enhances the microstructure of the Ag due to a crystal lattice match between the AZO and Ag. This yields improved Ag conductivity and adhesion. Since the AZO layer is crystalline the surface roughness is increased as the layer thickens. Therefore, the bi-layer of IZO/AZO provides the needed optical thickness while having the proper interface layer to seed the Ag. The significantly higher resistance of sample #11 is likely due to the roughness associated with the over-thick AZO layer under the silver. This is also evident in samples 7 and 8. The roughness associated with the thick AZO base layer in sample 7 causes the observed 1Ω/square higher sheet resistance than sample 8 which has a relatively smooth IZO base layer. The roughness will have more of an impact on electrical properties as the Ag layer is thinned.

The optical characterization data for the fabricated EC-elements is given in Table 11. An automotive inside mirror shape was used with a highly reflective $3^{rd}$ surface reflector electrode where the reflectivity is essentially all coming from 7% Au 93% Ag alloy.

TABLE 10

Round-2 stack designs and properties.

| Stack | Å | $R_s$ (Ω/sq) | % T |
|---|---|---|---|
| #7 | | | |
| IZO | 400 | 6.9 | 85.3 |
| AZO | 50 | | |
| Ag | 110 | | |
| AZO | 500 | | |
| Glass | | | |
| #8 | | | |
| IZO | 400 | 5.9 | 86.0 |
| AZO | 50 | | |
| Ag | 110 | | |
| IZO | 450 | | |
| Glass | | | |

TABLE 10-continued

Round-2 stack designs and properties.

| Stack | Å | $R_s$ (Ω/sq) | % T |
|---|---|---|---|
| #9 | | | |
| IZO | 400 | 5.0 | 86.5 |
| AZO | 50 | | |
| Ag | 110 | | |
| AZO | 50 | | |
| IZO | 400 | | |
| Glass | | | |
| *ITO (Half λ) | 1447 | 12.4 | 88.9 |
| #11 | | | |
| AZO | 500 | 9.0 | 86.0 |
| Ag | 80 | | |
| AZO | 480 | | |
| Glass | | | |
| #12 | | | |
| IZO | 500 | 6.5 | 84.5 |
| AZO | 50 | | |
| Ag | 80 | | |
| AZO | 50 | | |
| IZO | 350 | | |
| Glass | | | |
| #13 | | | |
| IZO | 450 | 6.5 | 87.3 |
| AZO | 50 | | |
| Ag | 80 | | |
| AZO | 50 | | |
| IZO | 430 | | |
| Glass | | | |
| **ITO (Full λ) | 2895 | 6.2 | 85.2 |

TABLE 11

Average optical properties of the EC elements.

| Stack | % R | L* | a* | b* |
|---|---|---|---|---|
| 7. G-AZO-Ag-AZO-IZO | 75.8 | 89.8 | −3.5 | 7.4 |
| 8. G-IZO-Ag-AZO-IZO | 77.7 | 90.7 | −4.1 | 4.0 |
| 13. G-IZO-AZO-Ag-AZO-IZO | 79.4 | 91.4 | −3.9 | 4.0 |
| ITO IEC Part | 86.8 | 94.7 | −3.7 | 6.0 |

In the second set of experiments the steam results of an AZO/Ag/AZO stack were improved by about 50% compared to the previous experiment by putting an IZO layer on as the top layer. Conversely, the steam life performance was reduced by about one third with the addition of a thin AZO layer placed between the Ag and the IZO layers in an IZO/Ag/IZO stack.

The reflectance of the IMI based cells ranged from 76 to 79% in comparison to approximately 87% for an 1173 IEC part and 69 to 75% for round 1 experiments. The reflected color of the IMI based cells was equivalent to that of production parts with #8 and #13 being slightly less yellow than the average production part. Stack #7 produced reasonable blow numbers but showed a high failure rate at the IMI stack. Stacks 8 and 13 failed at lower blow pressures and gave very high adhesion failure rates within the IMI stack. The steam testing results were fairly flat and mediocre. While the best and worst stacks from round-1 lasted between 30 and 15 days, respectively, the round-2 samples failed at 20 days, average. Several differences (in addition to stack design changes) existed between round 1 and round 2 which may have affected the blow and steam performance. One issue in the performance of the round 2 EC-cells is their lay-up. The IMI coated glass sat for several days prior to lay-up and showed signs of handling. The sequencing of the layers in the coater also changed. In round 1 we produced layers going both in the forward and backward direction in the coater. In round 2 we produced all layers going in the forward direction. We also had oxygen present in the AZO layers in round 2 which was not present in round 1.

The cosmetic appearance of the round 2 parts matched the good appearance we attained in round 1 with the same fluid and epoxy. Upon room temperature cycling at 1.2 volts the parts developed latent defects where fingerprints, scuff marks or other defects were present.

Figure 13:
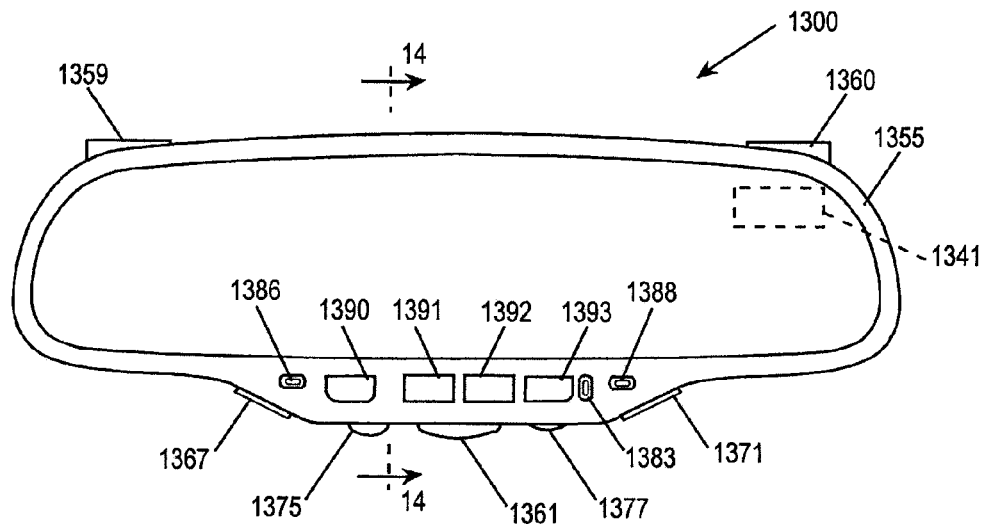
FIG. 13 depicts a plan view of an interior rearview mirror assembly.

The performance of sample #13 was run on a final tester to generate darkening and clearing performance for comparison to a standard product. Table 12 shows some of the performance statistics. The IMI stack #13 darkened 20% faster than a standard product. The lower sheet resistance leads to a higher current draw as expected. FIG. 13 illustrates and Table 10 lists the reflected color in the bright and dark states for the DOE2 sample numbers 7, 8 and 13.

TABLE 12

EC switching performance for stack #13

| Sample | MRH | MRL | Current | Peak Current | 70-15 Time | 10-60 Time |
|---|---|---|---|---|---|---|
| IMI #13 | 82.3 | 8.13 | 142 | 475.7 | 2.56 | 5.12 |
| ITO | 86.5 | 7.3 | 123 | 300.9 | 3.2 | 4.7 |

TABLE 13

Reflected color in the bright and dark state for DOE 2 samples 7, 8 and 13

| Sample | Cap Y bright | a* bright | b* bright | Cap Y dark | a* dark | b* dark |
|---|---|---|---|---|---|---|
| 7 | 76.9 | −3.5 | 8.5 | 8.8 | −1.4 | −3.8 |
| 8 | 79.7 | −4.2 | 4.8 | 9.6 | 1 | −3.6 |
| 13 | 81.7 | −4.1 | 4.8 | 8.2 | −2.9 | −10.4 |

The color of the IMI stacks in the dark state is comparable to the standard product with ITO as the transparent electrode. The dark state reflectivity is within the design targets for flat mirrors.

The following are experimental results and wording from several sets of experiments loosely lumped into IMI DOE-3. Layer stress was analyzed at two process pressures for aluminum-doped zinc-oxide (AZO), zinc-doped indium-oxide (IZO) and metallic silver (Ag). The results indicate that AZO has the highest compressive stress which can be decreased slightly by processing at higher chamber pressure. Based upon the small change in stress it was determined that little could be gained from processing at higher pressure. This conclusion was called into question by the results which showed a potential correlation between chamber pressure and coating lift for a particular layer design.

Order of deposition was studied to determine the sensitivity of the IMI stack to processing steps in a coater. The aim of these experiments was to determine if there are significant risks in implementing the IMI coating in a rotary coater which utilizes stationary substrates for deposition. No significant change in coating properties was observed for the differing processing methods.

Due to the sensitivity of thick AZO layers to failure in steam autoclave exposure a series of experiments were carried out to determine the optimum thickness of bottom and top AZO buffer layers for maximized adhesion and steam stability. For the top buffer it was determined that adhesion is gained with as little as 50 Å of AZO and there is no enhancement gained by thickening the AZO layer beyond that level. For the bottom AZO buffer layer, the results were inconclusive. As discussed above, stress in thick AZO is significant enough to affect adhesion and likely overwhelmed any property changes caused by the modification of the bottom buffer thickness.

Two sets of heat treatment tests were carried out. The first showed that heat treatment for extended period up to 30 minutes at 300° C. do not damage the IMI coating and actually improve its properties. A second set of experiments showed that IZO based IMI stacks perform better after heat treatment for IZO compositions rich in zinc-oxide.

Optical modeling of IMI stacks was carried out. This modeling studied the effect of the dielectric index of refraction on the transmittance of the IMI coatings and ultimately its effect on the performance of an EC cell. The results show that the use of high index layers like $TiO_2$ help to give performance and color very close to what is possible with the ½-wave ITO coating that is currently in use.

Layer stress in multilayered coating stacks can adversely affect the adhesion of the coating. For this reason it was important to verify that the dielectric layers being used in the IMI stacks under investigation were being deposited with reasonably low stress. The argon pressure utilized for deposition was run high and low for each material to determine the response slope for each material. The results are shown in Table 14. The stress measured for all of the coatings was reasonably low, being less than 1 Giga-Pascal. The stress in the AZO layers was higher than the IZO layers, however the small change caused by the increased pressure indicates that pressure tuning would have limited benefit. Based upon the results from these experiments, depositions for the rest of the DOE were carried out at 3.0 mTorr.

TABLE 14

Effects of deposition pressure on layer stress:

| Exp. # | Composition | Thickness (Å) | Pressure (mTorr) | Stress (GPa) |
|---|---|---|---|---|
| 1 | AZO | 500 | 3.0 | −0.77 |
| 2 | AZO | 500 | 5.0 | −0.64 |
| 3 | IZO | 500 | 3.0 | −0.20 |
| 4 | IZO | 500 | 5.0 | −0.19 |
| 5 | Ag | 500 | 2.0 | 0.04 |
| 6 | Ag | 500 | 4.0 | 0.05 |

AZO is a very good material for use in contact with a silver layer as it provides optimum adhesion and thermal stability. Unfortunately, AZO is not extremely stable to chemical attack. For this reason, a multilayer approach is preferred utilizing a minimum thickness of AZO as a buffer against the silver layer and making up the remainder of the coating thickness with IZO, ITO, or another dielectric which has adequate steam stability. Section 3 is broken into two parts, studying the bottom and top AZO buffers separately. Table 15 shows the stack design and layer thicknesses utilized for this evaluation. The first half of the experiments (13-17) investigated the effect of varying the top AZO buffer layer thickness on adhesion and steam stability. The second half of the experiments (18-22) investigated the effect of varying the bottom AZO buffer layer thickness on adhesion. Because experiments 18 through 22 used a thick AZO top layer, they were not tested for steam stability due to the known weakness of a monolithic AZO top layer to this test. The averaged results of the testing are shown in Table 16. The thick AZO base layer used in experiments 13 through 17 gave very good results in both blow and steam testing averaging 26 psi and 34 days, respectively. Being below the silver layer is adequate protection from steam autoclave exposure. Experiments 18 through 22, which studied the thickness of the AZO bottom layer, averaged 21.5 psi in blow testing. No clear trends are apparent for the thickness of the AZO layer either above or below the silver layer. Apparently, a 50 Å AZO buffer layer is adequate to give good adhesion. The clearest trend from this series is the lack of coating lift observed for the samples with the 450 Å AZO bottom layer (exp's 13-17). Experiments 18 through 22 averaged 65% coating lift in blow testing. Also, the blow testing of the samples from experiments 13 through 17 were dominated by glass breakage. The fraction of failures due to glass breakage for the samples from experiments 18 through 22 was low. Instead, the failures were dominated by coating lift. Unfortunately, experiments 18-22 were probably invalidated by the fact that a thick AZO top layer was used. Apparently the strain in this thick layer is high enough to dominate the adhesion of the IMI coating. Any perturbation caused by the change in the thickness of the bottom AZO buffer layer was likely swamped by the stress of the top layer.

TABLE 15

AZO/IZO layer thicknesses utilized for the buffer layer study:

| Exp. # | Glass | IZO (Å) | AZO (Å) | Ag (Å) | AZO (Å) | IZO (Å) |
|---|---|---|---|---|---|---|
| 13 | | | 450 | 100 | 50 | 450 |
| 14 | | | 450 | 100 | 75 | 425 |
| 15 | | | 450 | 100 | 100 | 400 |
| 16 | | | 450 | 100 | 125 | 375 |
| 17 | | | 450 | 100 | 150 | 350 |
| 18 | | 400 | 50 | 100 | 450 | |
| 19 | | 375 | 75 | 100 | 450 | |
| 20 | | 350 | 100 | 100 | 450 | |
| 21 | | 325 | 125 | 100 | 450 | |
| 22 | | 300 | 150 | 100 | 450 | |

TABLE 16

Averaged testing results for the samples from Section 3:

| | Exp. # | AZO Thick. (Å) | Blow (psi) | IMI Lift (%) | Steam Life (days) |
|---|---|---|---|---|---|
| Top | 13 | 50 | 26.7 | 0 | 31.3 |
| | 14 | 75 | 27.4 | 1 | 39.4 |
| | 15 | 100 | 24.2 | 0 | 30.5 |
| | 16 | 125 | 25.7 | 0 | 39.4 |
| | 17 | 150 | 25.8 | 0 | 29.5 |
| Bottom | 18 | 50 | 24.3 | 57 | |
| | 19 | 75 | 21.7 | 93 | |
| | 20 | 100 | 19.3 | 66 | |
| | 21 | 125 | 20.3 | 64 | |
| | 22 | 150 | 21.9 | 44 | |

The run conditions from experiment 10 were used to prepare several 11.8"×16" lites coated with the 5 layer IMI stack including IZO at 440 angstroms, AZO at 50 angstroms, Ag at 80 angstroms, AZO at 50 angstroms, IZO at 449 angstroms and glass. Samples were cut from these lites measuring 4"×4" in size. The optical transmittance, haze and sheet resistance of each sample was then measured as a baseline. The samples, two each, were soaked at one of the three following temperatures, 200° C., 300° C. and 400° C., for one of four times, 5 min, 10 min, 15 min and 20 min. The transmittance, haze and sheet resistance of each sample was then remeasured and compared to its baseline values. The averaged data is presented in Table 17.

The transmittance of the IMI stacks increases for all of heat treatments however the maximum change is observed for the 300° C. samples. The 400° C. samples show a reduced transmittance increase relative to the 300° C. samples. This is caused by the significant optical property change that is also causing a significant b* shift. A potential explanation for the observed shift of the UV absorption edge into the visible is that the IZO is being modified by the high temperature. A second possible explanation is that the Ag surface plasmon band is shifting at high temperature due to a chemical or structural change at the AZO/Ag interfaces. This is less likely based on the observed high temperature response of existing Ag/AZO based low emissivity coatings.

TABLE 17

Average IMI property changes with heat treatment:

| Soak | | | | | | Change | | | |
|---|---|---|---|---|---|---|---|---|---|
| Temp (° C.) | Time (min) | Initial | | | | Δ | Δ | Δ | Δ |
| | | % T | % H | $R_{sheet}$ | b* | % T | % Haze | $R_{sheet}$ | b* |
| 200 | 5 | 85.54 | 0.011 | 7.3 | 7.8 | 0.21 | −0.001 | −0.2 | −0.1 |
| 200 | 10 | 85.37 | 0.007 | 7.0 | 8.2 | 0.71 | 0.001 | −0.5 | −0.5 |
| 200 | 15 | 85.23 | 0.013 | 7.0 | 8.1 | 0.87 | −0.007 | −0.5 | −0.4 |
| 200 | 20 | 85.39 | 0.007 | 7.4 | 8.0 | 0.94 | 0.002 | −0.4 | −0.3 |
| 300 | 5 | 84.98 | 0.009 | 6.9 | 9.0 | 1.23 | 0.001 | −0.7 | −0.5 |
| 300 | 10 | 85.45 | 0.007 | 7.3 | 8.1 | 1.68 | 0.001 | −0.9 | 0.4 |
| 300 | 15 | 85.50 | 0.008 | 7.0 | 7.8 | 1.64 | 0.011 | −1.0 | 0.3 |
| 300 | 20 | 85.06 | 0.007 | 6.9 | 8.8 | 1.60 | 0.002 | −1.0 | 0.7 |
| 400 | 5 | 85.58 | 0.006 | 7.0 | 7.5 | 1.66 | 0.002 | −0.9 | 1.1 |
| 400 | 10 | 84.99 | 0.007 | 7.0 | 8.9 | 1.02 | 0.016 | −0.6 | 5.3 |
| 400 | 15 | 85.41 | 0.006 | 7.4 | 7.9 | 1.24 | 0.014 | −0.4 | 7.5 |
| 400 | 20 | 85.53 | 0.006 | 7.1 | 7.5 | 1.61 | 0.018 | −0.1 | 7.6 |

For the purposes of these experiments, haze is defined as the non-specular component of the surface reflectance ($Y_R$). At both 200° C. and 300° C. there was no measurable change in haze. This was also true for the shortest soak duration (5 min) at 400° C. The longer soak durations at 400° C. produced a measurable increase in haze; however the total haze was still minimal.

As was the case for transmittance, all of the heat treatments decreased the sheet resistance. The 300° C. treatments caused more improvement than the 200° C. experiments. The 400° C. experiments gave good results at 5 minutes, which were comparable to the 300° C. results. Beyond 5 minutes at 400° C., the improvement in sheet resistance was gradually lost, leaving the 20 minute samples almost equivalent to their pre-heat conductivity. If all of the IMI stacks were heat treated at 300° C. for between 10 and 15 minutes to achieve optimum characteristics.

These results indicate that any heat treatment or epoxy cure method likely to be employed in production will improve the IMI performance rather than degrade it. Increasing the temperature of the epoxy cure oven to 300° C. would be best for optimizing the properties of the IMI coating, however, it would likely not be advantageous for the epoxy performance.

The following relates to samples of three layered IMI stacks for evaluation. These stacks benefit from the combinatorial sputtering capabilities at the National Renewable Energy Laboratory (NREL) in that the dielectric layers of each sample form a compositional gradient across the sample, allowing multiple compositions of IZO to be simultaneously evaluated. IZO is a non-specific combination of indium-oxide ($In_2O_3$) and zinc-oxide (ZnO). Commonly, ~20% Zn is used for optimum conductivity however we would like to preferentially optimize the physical and chemical properties of the IZO to improve the stability and adhesion of the IMI stack. The absolute conductivity of the dielectric layers is not very important to the performance of the IMI stack. Four libraries of indium-zinc compositions were applied onto 2"×2" glass substrates (1.1 mm) as three layer IMI stacks: base dielectric (400 Å), silver (100 Å), top dielectric (400 Å). In each case, as close to a uniform dielectric and silver thickness as possible was deposited. Because the NREL system uses small, 2" toroidal magnetrons and a stationary substrate, the uniformity is less than optimal. For this and several other reasons we have set up a combinatorial system in the Temescal coater with 3" toroidal magnetrons and linear motion that will give better uniformity and repeatability than the system at NREL. The composition ranges of the four libraries are listed in Table 18.

TABLE 18

Composition ranges of the four libraries:

| Library | Indium Fraction (atomic %) |
|---|---|
| L1 | 4-15% |
| L2 | 15-50% |
| L3 | 35-70% |
| L4 | 70-95% |

Prior to heat treatment, the baseline values of transmittance, sheet resistance and haze was measured in 5 positions across each sample. The samples were then put through an epoxy cure oven (line 502) set for standard production (200° C.). The transmittance, sheet resistance and haze were then remeasured. The results are presented in Table 19. The data can be broken down by the In/Zn ratio. The low In, high Zn, content dielectrics produced IMI stacks with higher transmittance and lower sheet resistance. The haze was comparable before heat treatment. After heat treatment there was an increase in haze at very high Zn content, but a much larger increase for the In rich samples. The large haze increase is a possible indication of crystallization of the IZO during the heat treatment. This behavior has been documented in the literature for compositional extremes of IZO.

TABLE 19

IMI properties before and after heat treatment:

| Library | | ~% In | Baseline | | | Post-Heat | | | Change | | |
|---|---|---|---|---|---|---|---|---|---|---|---|
| | | | % T | % Haze | $R_{Sheet}$ | % T | % Haze | $R_{Sheet}$ | Δ% T | Δ% H | $ΔR_{Sheet}$ |
| L1 | 1 | 4 | 85.11 | 0.049 | 8.6 | 84.77 | 0.066 | 8.5 | −0.34 | 0.017 | −0.1 |
| | 2 | 6.5 | 87.48 | 0.037 | 7.6 | 87.21 | 0.06 | 7.2 | −0.27 | 0.023 | −0.4 |
| | 3 | 9 | 86.48 | 0.036 | 8.2 | 86.31 | 0.054 | 7.7 | −0.17 | 0.018 | −0.5 |
| | 4 | 11.5 | 86.26 | 0.036 | 9.1 | 85.86 | 0.05 | 8.7 | −0.4 | 0.014 | −0.4 |
| | 5 | 14 | 83.99 | 0.039 | 12.5 | 83.51 | 0.084 | 10.6 | −0.48 | 0.045 | −1.9 |

TABLE 19-continued

IMI properties before and after heat treatment:

| Library | | ~% In | Baseline | | | Post-Heat | | | Change | | |
|---|---|---|---|---|---|---|---|---|---|---|---|
| | | | % T | % Haze | $R_{Sheet}$ | % T | % Haze | $R_{Sheet}$ | Δ% T | Δ% H | $ΔR_{Sheet}$ |
| L2 | 1 | 16 | 85.76 | 0.044 | 11.8 | 86.1 | 0.046 | 10 | 0.34 | 0.002 | −1.8 |
| | 2 | 24.5 | 87.52 | 0.034 | 8.8 | 88.05 | 0.032 | 8.2 | 0.53 | −0.002 | −0.6 |
| | 3 | 33 | 87.5 | 0.036 | 9.3 | 88.03 | 0.038 | 8.4 | 0.53 | 0.002 | −0.9 |
| | 4 | 41.5 | 87.08 | 0.023 | 10.7 | 87.37 | 0.03 | 10.6 | 0.29 | 0.007 | −0.1 |
| | 5 | 50 | 86.17 | 0.011 | 14.4 | 86.21 | 0.017 | 13.2 | 0.04 | 0.006 | −1.2 |
| L3 | 1 | 35 | 85.58 | 0.04 | 11.4 | 86.29 | 0.04 | 9.8 | 0.71 | 0 | −1.6 |
| | 2 | 43.5 | 86.34 | 0.036 | 9 | 87.16 | 0.049 | 8.5 | 0.82 | 0.013 | −0.5 |
| | 3 | 52 | 86.33 | 0.038 | 9.3 | 87.23 | 0.048 | 8.8 | 0.9 | 0.01 | −0.5 |
| | 4 | 60.5 | 86.07 | 0.04 | 10.3 | 87.12 | 0.053 | 9.7 | 1.05 | 0.013 | −0.6 |
| | 5 | 69 | 85.77 | 0.049 | 12.7 | 86.97 | 0.051 | 11.5 | 1.2 | 0.002 | −1.2 |
| L4 | 1 | 71 | 83.67 | 0.011 | 17.3 | 83.72 | 0.022 | 15.6 | 0.05 | 0.011 | −1.7 |
| | 2 | 77 | 85.88 | 0.013 | 13.5 | 85.88 | 0.041 | 13.1 | 0 | 0.028 | −0.4 |
| | 3 | 83 | 86.12 | 0.023 | 12.9 | 86.15 | 0.1 | 12 | 0.03 | 0.077 | −0.9 |
| | 4 | 89 | 85.53 | 0.032 | 13.5 | 85.72 | 0.175 | 12.3 | 0.19 | 0.143 | −1.2 |
| | 5 | 95 | 79.98 | 0.031 | 17 | 80.6 | 0.126 | 16 | 0.62 | 0.095 | −1 |

The results of these experiments are very interesting. IZO, in general, is deposited at approximately 20% ZnO content to maximize conductivity. The conductivity of the IMI stack is not very sensitive to the absolute conductivity of the dielectric layers used on either side of the silver. The high ZnO content range (~70%) of the combinatorial samples showed the best performance in heat treatment. Even though the conductivity of the IZO layers is poor at high zinc content, the overall conductivity of the IMI stack was highest in this range. Post heat treatment haze and transmittance was also optimum at high ZnO content. If ~30% $In_2O_3$ content is high enough to give adequate steam performance while maintaining adequate adhesion then a 3 layer design may be feasible for the IMI stack.

Optical modeling was conducted as part of an evaluation of the benefits of alternative dielectric layers and to support some patent documentation. The aim of the modeling was to quantify the potential improvements to the color and transmittance of the IMI stacks through material substitutions. As was described in the second IMI DOE report, the transmittance of coated glass can change considerably depending on whether the exit medium is air or propylene-carbonate (PC) solution. In the case of ½-wave ITO on glass, the modeled transmittance improves from 88.0% against air to 92.4% against propylene-carbonate. For simplicity, 3 layer stacks were used in the model, (Table 20). The addition of 50 Å AZO buffer layers above and below the Ag layer have minimal effect on the optical properties of the stack.

TABLE 20

Stack design used for Section 5

| Exit Medium | Propylene-Carbonate |
|---|---|
| Layer of Dielectric | 250 to 600 Å |
| Layer of Ag | 25 to 200 Å |
| Layer of Dielectric | 250 to 600 Å |
| Substrate | Glass |
| Entrance Medium | Air |

Four dielectric materials were chosen for evaluation covering a range of refractive index from medium to high. These materials are $TiSi_2O_6$ (1.7), IZO (2.0), cold $TiO_2$ (2.4) and hot $TiO_2$ (2.8). In the original study, the stacks were optimized for both air and propylene-carbonate exit mediums. The data presented here is based entirely upon optimization for the propylene-carbonate case. For each dielectric material, several Ag thicknesses were evaluated. The data is presented in Table 21. In each example, a dielectric material and a silver thickness were chosen. Then, utilizing TFCalc, the dielectric layer thicknesses were refined to give optimum transmittance. For comparison, in each case the transmittance for the air exit medium is also given. For the two low index cases, the transmittance in air is higher for the thin Ag cases. The relationship reverses for the thicker Ag cases which have higher transmittance against propylene-carbonate. Both of the $TiO_2$ cases uniformly gave higher transmittance against propylene-carbonate. For silver thickness above about 30 Å, optimum transmittance is obtained through the use of high index dielectric layers like $TiO_2$. To obtain a 6Ω/square IMI coating requires a Ag layer approximately 100 Å in thickness. Color was calculated for the 100 Å Ag layer cases with Cr/Ru back reflectors. This data is presented in Table 22. An identically calculated OEC cell (½-wave ITO) is included for comparison. The high light state reflectance of the $TiSi_2O_6$ case is misleading. A significant fraction of the reflectance is coming from the second surface, as is indicated by the very high dark state reflectance. The reflected color is somewhat green in the light state and very bronze in the dark state. For the IZO case, light state reflectance was lower and somewhat green. The IZO cell dark state reflectance is only slightly higher than the reference OEC cell and very neutral. The light state reflectance of the $TiO_2$ cell is only 1 percent lower than the reference and the hue is the same as the IZO cell, slightly green. The dark state has very low reflectance and an essentially neutral color. The hot $TiO_2$ cell gives reflectance higher than the reference cell and a very neutral color. The dark state has low reflectance and a slightly purple hue.

TABLE 21

Optical data from IMI stack modeling (thickness in Å):

| $TiSi_2O_6$ | Ag | $TiSi_2O_6$ | % T | % T-Air | IZO | Ag | IZO | % T | % T-Air |
|---|---|---|---|---|---|---|---|---|---|
| 557 | 25 | 504 | 94 | 91.7 | 514 | 25 | 493 | 90.6 | 85.3 |
| 479 | 50 | 472 | 91 | 92.7 | 429 | 50 | 418 | 91 | 87.5 |
| 491 | 75 | 488 | 85 | 90.5 | 384 | 75 | 388 | 89.4 | 89.2 |
| 506 | 100 | 504 | 77 | 85.4 | 397 | 100 | 401 | 85.2 | 88.4 |
| 519 | 125 | 517 | 68 | 78.1 | 407 | 125 | 410 | 79 | 85 |
| 530 | 150 | 529 | 58.9 | 69.7 | 415 | 150 | 418 | 71.6 | 79.6 |

TABLE 21-continued

Optical data from IMI stack modeling (thickness in Å):

| TiO$_2$ | Ag | TiO$_2$ | % T | % T-Air | TiO$_2$ (hot) | Ag | TiO$_2$ (hot) | % T | % T-Air |
|---|---|---|---|---|---|---|---|---|---|
| 484 | 50 | 440 | 92.9 | 89.1 | 451 | 50 | 409 | 92 | 87.7 |
| 434 | 75 | 410 | 92.86 | 89.3 | 410 | 75 | 386 | 92.2 | 88.1 |
| 383 | 100 | 371 | 92.6 | 89.7 | 371 | 100 | 356 | 92.3 | 88.6 |
| 340 | 125 | 336 | 91.6 | 90.5 | 330 | 125 | 323 | 92.1 | 89.3 |
| 326 | 150 | 324 | 88.8 | 90.64 | 302 | 150 | 298 | 90.8 | 90.2 |
| 323 | 175 | 322 | 84.2 | 88.8 | 292 | 175 | 290 | 87.8 | 89.9 |
| 323 | 200 | 322 | 78 | 85 | 288 | 200 | 288 | 82.9 | 87.7 |

TABLE 22

Cell color for the transmittance-optimized stacks (100 Å Ag case):

| Dielectric | Bright State | | | | Dark State | | | |
|---|---|---|---|---|---|---|---|---|
| | % R | L* | a* | b* | % R | L* | a* | b* |
| TiSi$_2$O$_6$ | 56.1 | 79.6 | −3.1 | 3.0 | 19.3 | 60.0 | 3.1 | 11.5 |
| IZO | 52.8 | 77.7 | −2.5 | 1.9 | 9.3 | 36.5 | 5.2 | 6.8 |
| TiO$_2$ | 59.2 | 81.4 | −2.5 | 1.0 | 5.6 | 28.4 | 5.2 | −18.9 |
| Hot TiO$_2$ | 60.3 | 82.0 | −0.1 | −1.1 | 6.1 | 29.8 | 21.5 | −35.9 |
| Ref. OEC* | 60.1 | 81.9 | 0.3 | 0.9 | 8.1 | 29.1 | 4.6 | −13.8 |

*Full cell with ½-wave ITO top plate and identical back plate and fluid.

A three layered IMI stack (100 Å Ag) based on AZO, IZO, ITO or some combination of these materials will be limited to about 52.8% reflectance for an OEC type Ru based mirror. A similarly modeled standard ½ wave ITO based cell will have about 60.1% reflectance. In order to increase the reflectance of an IMI based cell to the level currently obtained for ½ wave ITO we will need to incorporate high index layers such as the TiO$_2$ used in the models. A five layer IMI stack incorporating TiO$_2$ will likely approach 59.2% reflectance. A higher index material will allow cell reflectance to approach 60.3% which is actually slightly higher than the standard cell. A single TiO$_2$ layer deposited onto the glass, below the IMI stack will give a reflectance of approximately 57.8% If it is necessary that the transmittance of the IMI coating be as high as ½ wave ITO then high index layers will have to be part of the stack.

The present inventive electrochromic element includes a transparent electrode whose components reduce the overall cost of the electrochromic element without sacrificing optical and physical characteristics, such as reflectivity, color, electrical switch stability, environmental durability and the like. Moreover, the inventive electrochromic element is relatively easy to manufacture, assists in providing a robust manufacturing process, provides versatility in selection of components utilized in constructing insulator/metal/insulator stacks, and allows tailored construction thereof to achieve particular optical and physical properties.

Exemplary Embodiments of a Rearview Assembly Including Auxiliary Optical Elements.

With reference to FIG. 13, mirror assembly 1300 includes first and second illumination assemblies 1367, 1371. Various illumination assemblies and illuminators for use with the present invention are described in commonly assigned U.S. Pat. Nos. 5,803,579; 6,335,548; and 6,521,916. The disclosure of each of these patent documents is incorporated herein by reference in its entirety. As further discussed in reference to FIG. 15, each illumination assembly preferably comprises a reflector, a lens, and an illuminator. Most preferably there are two illumination assemblies with one generally positioned to illuminate a front passenger seat area and the second generally positioned to illuminate a driver seat area. There may be only one or may be additional illuminator assemblies such as one to illuminate a center console area, overhead console area, or an area between the front seats.

With further reference to FIG. 13, mirror assembly 1300 includes first and second switches 1375, 1377. Suitable switches for use with the present invention are described in detail in commonly assigned U.S. Pat. Nos. 6,407,468; 6,420,800; 6,471,362; and 6,614,579. The disclosure of each of these patent documents is incorporated herein by reference in its entirety. These switches may be incorporated to control the illumination assemblies, the displays, the mirror reflectivity, a voice-activated system, a compass system, a telephone system, a highway toll booth interface, a telemetry system, a headlight controller, a rain sensor, etc. Any other display or system described herein or within the reference incorporated by reference may be incorporated in any location within the associated vehicle and may be controlled using the switches.

With further reference to FIG. 13, mirror assembly 61300 includes indicators 1383. Various indicators for use with the present invention are described in commonly assigned U.S. Pat. Nos. 5,803,579; 6,335,548; and 6,521,916. The disclosure of each of these patent documents is incorporated herein by reference in its entirety. These indicators may indicate the status of the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

With further reference to FIG. 13, mirror assembly 1300 includes first and second light sensors 1386, 1388. Preferred light sensors for use within the present invention are described in detail in commonly assigned U.S. Pat. Nos. 5,923,027 and 6,313,457. The disclosure of each of these patent documents is incorporated herein by reference in its entirety. The glare sensor and/or ambient sensor automatically control the reflectivity of a self-dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays.

With further reference to FIG. 13, mirror assembly 1300 includes a plurality of operator interfaces, for example first, second, third, and fourth operator interfaces 1390, 1391, 1392, 1393. Each operator interface may comprise a backlit information display. It should be understood that these operator interfaces can be incorporated anywhere in the associated vehicle, for example, in the mirror case, accessory module, instrument panel, overhead console, dashboard, seats, or center console. In an embodiment of the assembly having an optional mirror bezel 1355, as shown in FIG. 13, there operator interfaces may be disposed in the bezel. Suitable operator-interface constructions are described in detail in commonly assigned U.S. Pat. Nos. 6,407,468; 6,420,800; 6,471,362; and 6,614,579. The disclosure of each of these patent documents is incorporated herein by reference in its entirety. These operator interfaces may control various sub-systems of the rearview assembly and their operational parameters. For example, just to name a few, an operator interface may coordinate the operation of an illumination assembly, a display, a voice-activated system, a compass system, a telephone system, a highway toll booth interface, a telemetry system, a headlight controller, and a rain sensor of the rearview assembly. Any other display or system described herein or within the references incorporated by reference may be incorporated in any location within the associated vehicle and may be controlled using an appropriate operator interface. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may e connected to a controller and combined with a display in a rearview mirror to indicate to a driver the distance to an object; the display may be configured as a bar that has a length proportional to the given distance. In addition to or instead of the above-mentioned devices, fewer or more individual devices may be incorporated in any location within the associated vehicle and as described within the references incorporated herein.

Figure 14:
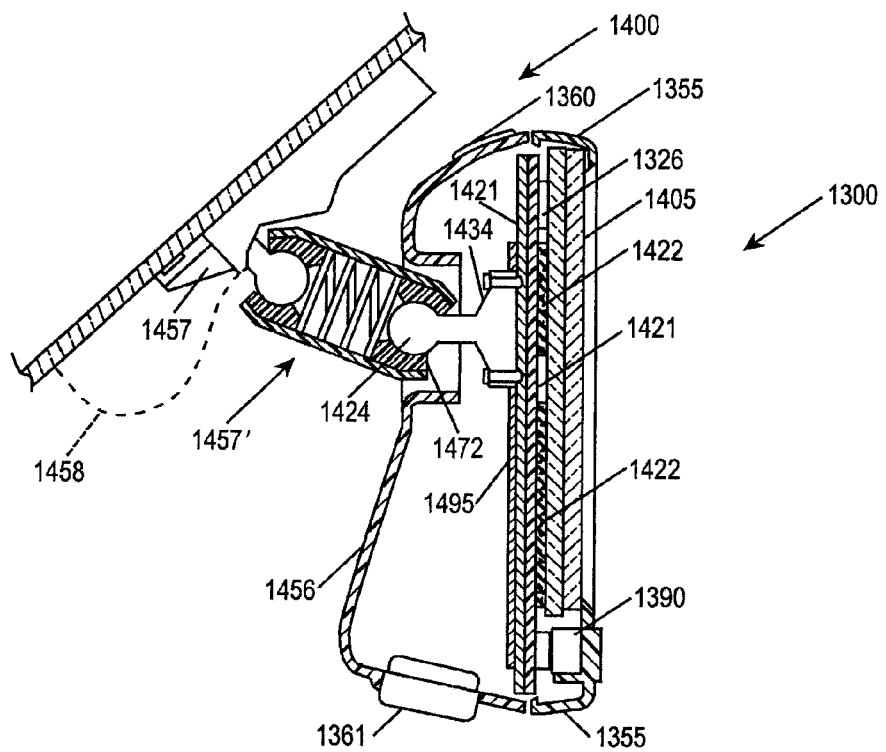
FIG. 14 depicts a sectional view of an interior rearview mirror assembly.

Turning now to FIG. 14, there is shown a section view of the mirror assembly 1400 that includes the embodiment 1300 of FIG. 13, with a reflective electrochromic mirror subassembly 1405 affixed to an internal plate frame 1421 with double-sided adhesive foam tape 1422. An attachment component 1434 is screwed to (or integrally formed from) plate frame 1421 and defines a ball section 1424 that engages a crown section 1472 in the two-ball mount 1457 with tube assembly 1457'. The depicted sections of FIG. 14 are taken along a cut line VI-VI of FIG. 13. FIG. 14 shows a preferred positional relationship of information displays 1426 and/or backlighting (not specifically shown located at a bottom of the mirror subassembly 1425) with respect to reflective element 1405 within a housing defined by case 1456 and bezel 1355. In further reference to FIGS. 13 and 14, the mirror assembly 1400 is also shown to comprise a microphone 1359; first operator interface 1390 along with circuit board 1495; mirror mount 1457 and accessory module 1458. The mirror mount 1457 and/or an accessory module 1458 may comprise such sub-systems as, for example, a compass sensor, a camera, a headlight control, an additional microprocessor, a rain sensor, an additional information displays, and an additional operator interface.

Figure 15:
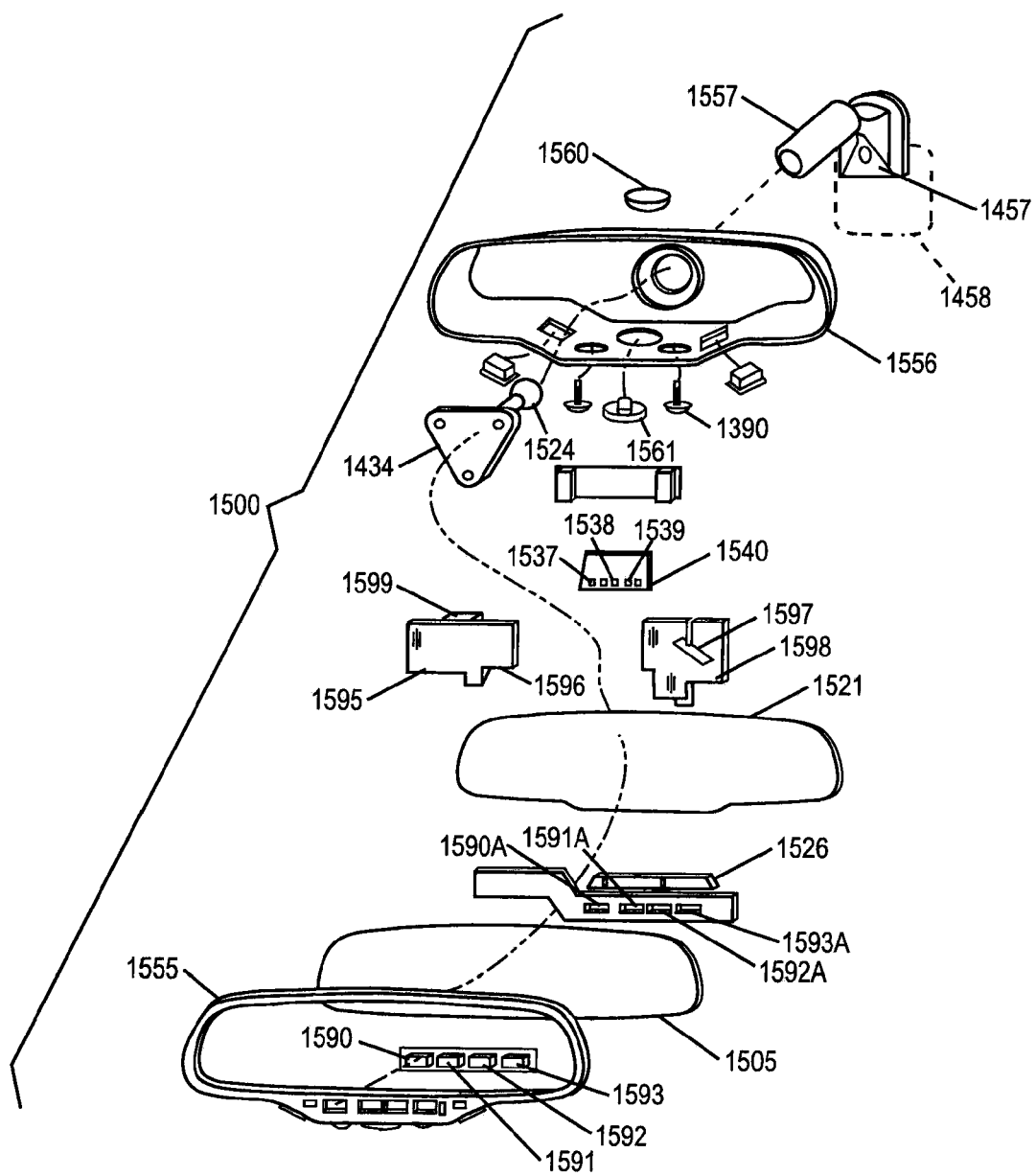
FIG. 15 depicts an exploded view of an interior rearview mirror assembly.

Turning now to FIG. 15, there is shown an exploded view 1500 of the mirror assembly 1400. FIG. 15 provides details describing one exemplary positional relationship of individual components, as well as structural details of a rearview assembly. As shown, the rearview assembly comprises a reflective element 1505 within a bezel 1555 and a mirror case 1556. A mirror mount 1557 is included for mounting the mirror assembly within a vehicle. It should be understood that a host of accessories may be incorporated into the mount 1557 and/or onto the plate frame carrier 6321 in addition to a power pack adjuster. Examples of such accessories are provided by a rain sensor, a camera, a headlight control, an additional microprocessor, an additional information display, and a compass sensor. These accessories/sub-systems may be integrated, at least in part, in a common control with information displays and/or may share components with the information displays. In addition, the status of these systems and/or the devices controlled thereby may be displayed on the associated information displays.

The rearview assembly is shown in FIG. 15 to further comprise a third information display 1526 with third information display backlighting components 1537, 1538, 1539; first and second microphones 1560, 1561. The rearview assembly may include other known options such as a first reflector with a first lens; a second reflector with a second lens; a glare sensor; an ambient light sensor; first, second, third, and fourth operator interfaces 1590, 1591, 1592, 1593 with first, second, third, and fourth operator interface backlighting 1590a, 1591a, 1592a, 1593a; a circuit board 1595 having a compass sensor module 1599; and a daughter board 1598 with an input/output bus interface 1597.

Preferably, the illumination assemblies with associated light source(s) are constructed in accordance with the teachings of commonly assigned U.S. Pat. Nos. 5,803,579; 6,335, 548; and 6,521,916. The disclosure of each of these patent documents is incorporated herein by reference in its entirety.

Preferably, the glare light sensor and the ambient light sensor are active light sensors that are configure as described, for example, in commonly assigned U.S. Pat. Nos. 6,359,274 and 6,402,328. The disclosure of each of these patent documents is incorporated herein by reference in its entirety. The electrical output signal from either or both of these sensors may be used as inputs to a controller on the circuit board 1540 or 1595 to control the reflectivity of reflective element 1505 and/or the intensity of third information display backlighting components. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328. The disclosure of each of these patent documents is incorporated herein by reference in its entirety. These sensor systems may be integrated, at least in part, in a common control with information displays and/or may share components with the information displays. In addition, the status of these systems and/or the devices controlled thereby may be displayed on the associated information displays.

Although the compass sensor module 1599 is shown, in FIG. 15, to be mounted on a circuit board 1595, it should be understood that the sensor module may be located within mount 1557, an accessory module 1558 positioned proximate mirror assembly 1500 or at any location within an associated vehicle such as, for example, under a dashboard, in an overhead console, a center console, a trunk, or in the engine compartment. Commonly assigned U.S. Pat. Nos. 6,023,229, 6,140,933, and 6,968,273 as well as commonly assigned U.S. Provisional Patent Application 60/360,723 described in detail various compass systems for use with the present invention. The disclosure of each of these patent documents is incorporated herein by reference in its entirety. These systems may be integrated, at least in part, in a common control with information displays and/or may share components with the information displays. In addition, the status of these systems and/ or the devices controlled thereby may be displayed on the associated information displays.

A daughter board 1598 is in operational communication with circuit board 1595. Circuit board 1595 may comprise a controller 1596, such as a microprocessor, and daughter board 1598 may comprise an information display. The microprocessor may, for example, receive signal(s) from the compass sensor module 1599 and process the signal(s) and transmit signal(s) to the daughter board to control a display to indicate the corresponding vehicle heading. As described herein and within the references incorporated by reference herein, the controller may receive signal(s) from light sensor(s), rains sensor(s) (not shown), automatic vehicle exterior light controller(s) (not shown), microphone(s), global positioning systems (not shown), telecommunication systems (not shown), operator interface(s), and a host of other devices, and control the information display(s) to provide appropriate visual indications.

Controller(s) 1596 may, at least in part, control the change in mirror reflectivity, exterior lights, rain sensor, compass, information displays, windshield wipers, heater, defroster, defogger, air conditioning, telemetry systems, voice recognition systems such as digital signal processor-based voice-actuation systems, and vehicle speed. The controller(s) 1596 may receive signals from switches and/or sensors associated with any of the devices described herein and in the references incorporated by reference herein to automatically manipulate any other device described herein or described in the references included by reference. The controller(s) 1596 may be located on the outside the rearview assembly, or may include a controller disposed elsewhere in the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,399,049; 6,465,963; 6,587,573; 6,429,594; 6,379,013; 6,871,809; 6,774,988 and U.S. Provisional Patent Application No. 60/404,879 may be incorporated in accordance with embodiments of the present invention. The disclosure of each of the above-mentioned patent documents is incorporated herein by reference in its entirety. These exterior light control systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457. The disclosure of each of the above-mentioned patent documents is incorporated herein by reference in its entirety. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These power supplies may be integrated, at least in part, in a common control with information displays and/or may share components with the information displays. In addition, the status of these systems and/or the devices controlled thereby may be displayed on the associated information displays.

Figure 16:
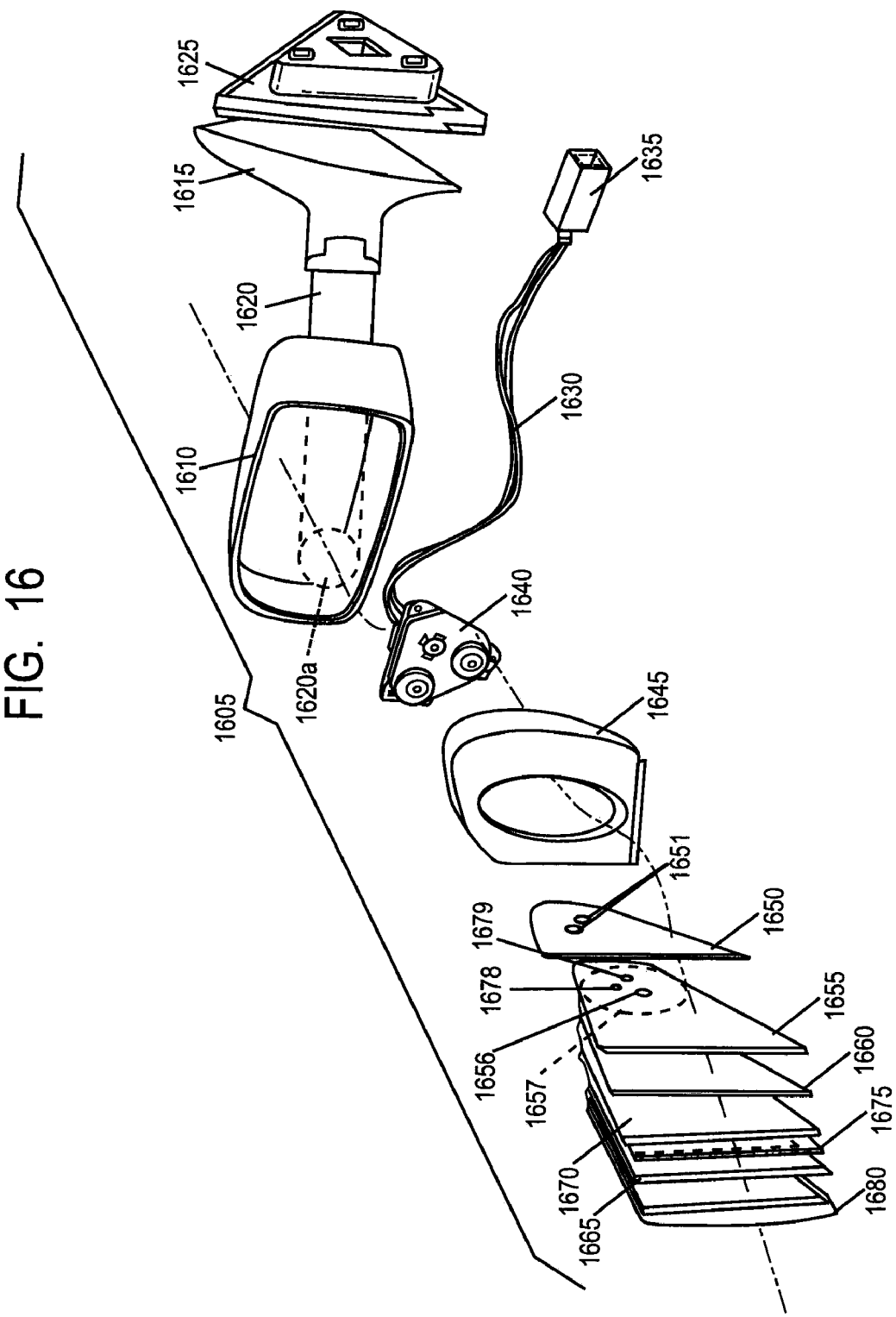
FIG. 16 depicts an exploded view of an exterior rearview mirror assembly.

Turning now to FIG. 16, there is shown an exploded view of an exterior rearview mirror assembly 1605 having a housing 1610 connected to an attachment member 1615 via a telescoping extension 1620. In at least one embodiment, the telescoping extension 1620 comprises a single arm having a linear actuator for extending and retracting the telescoping extension from within the associated vehicle. The telescoping extension 1620 may comprise a rack and pinion type linear actuator, an electrical solenoid type linear actuator, a pneumatic piston or a hydraulic actuator. The housing 1610 may be configured such that the housing axially pivots about the telescoping extension. Additionally, the telescoping extension may be configured such that the housing may be folded inward toward the associated vehicle and outward away from the associated vehicle. The attachment member 1615 is configured to be received by a vehicle mount 1625. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 1620*a* such that the housing pivots about the connection 1620*a* such that the mirror may be positioned closer or farther from the vehicle as desired; this feature may be accompanied by a power positioning mechanism such that actuation may be performed inside the vehicle. It should be understood that the mirror housing, extension and attachment member may be configured such that the telescoping, pivoting and folding requires a manual operation.

A wiring harness 1630 with a connector 1635 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 1640 is provided for aligning the associated reflective element within the housing from the interior of the associated vehicle. It should be understood that a corresponding operator interface is provided within the vehicle for positioning of the reflective element.

The positioner 1640 is mechanically connected to a carrier for providing a secure structure for supporting and moving of the associated reflective element. Examples of suitable carriers are described in U.S. Pat. Nos. 6,195,194 and 6,239,899, the disclosure of each of which is incorporated herein by reference in its entirety.

In at least one embodiment, a double-sided adhesive foam 1650 is employed to attach the reflective element to the carrier. In certain instances, apertures 1651 may be provided in the double sided adhesive foam for accommodating positioning of various components.

In at least one embodiment, an electrical circuit board 1655 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716; 6,523,976; 6,521,916; 6,441,943; 6,335,548; 6,132,072; 5,803,579; 6,229,435; 6,504,142; 6,402,328; 6,379,013; and 6,359,274 disclose various electrical components and electrical circuit boards that may be employed in one or more embodiments. The disclosure of each of the above-mentioned patent documents is incorporated herein by reference in its entirety. In at least one embodiment, a rearview mirror assembly is provided with a heater 1660 for improving the operation of the device and for melting frozen precipitation that may be present. Examples of various heaters are disclosed in U.S. Pat. Nos. 5,151,824, 6,244,716, 6,426,485, 6,441,943 and 6,356,376. The disclosure of each of these patent documents is incorporated herein by reference in its entirety.

In at least one embodiment, the reflective element is has variable reflectance feature. The variable reflectance reflective element may comprise a first substrate 1665 and a second substrate 1670 secured in a spaced apart relationship by a seal 1675 to define a chamber therebetween. The reflective element may be configured to define a convex element, an aspheric element, a planar element, a non-planar element, a wide field of view element, or a combination of these various configurations in different areas to define a complex mirror element shape. The first surface of the first substrate may comprise a hydrophilic or hydrophobic coating to improve the operation. The reflective element may comprise transflective properties such that a light source, or information display, may be positioned behind the element and project light rays therethrough. The reflective element may comprise an antiscratch layer, or layers, on the exposed surfaces of the first and, or, second substrates. The reflective element may comprise area(s) that are devoid of reflective material, such as etched in bars or words, to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527, 6,111,684 and 5,998,617. The disclosure of each of the above-mentioned patent documents is incorporated herein by reference in its entirety.

The above description is considered that of the preferred embodiments only. Modifications of the invention will occur to those skilled in the art and to those who make or use the invention. Therefore, it is understood that the embodiments shown in the drawings and described above are merely for illustrative purposes and are intended to be included within, but not intended to limit the scope of the invention, which is defined by the following claims as interpreted according to the principles of patent law, including the doctrine of equivalents.

What is claimed is:

1. An electrochromic (EC) element comprising:
    a first base including a first substrate having a first surface and a second surface opposite the first surface, the second surface carrying a transparent electrode layer that comprises a first optical thin-film structure including a first metal layer sandwiched between first and second dielectric layers, the first and second dielectric layers comprising materials having corresponding refractive indices greater than 1.7;
    a second base having third and fourth surfaces, the first and second bases disposed in a parallel and spaced-apart relationship so as to define a gap therebetween, the second and third surfaces opposing each other; and
    an electrochromic medium located in the gap;
    wherein transmittance of the first base measured in light generated by a standard D65 illuminant exceeds 50 percent.

2. An EC element according to claim 1, wherein the transmittance of the first base exceeds 60 percent.

3. An EC element according to claim 1, wherein the first and second dielectric layers comprise materials having corresponding extinction coefficients smaller than 0.2.

4. An EC element according to claim 1, wherein the at least one metal layer includes silver configured to have thickness less than 300 Angstroms whereby the transmittance of the first base exceeds 70 percent.

5. An EC element according to claim 3, wherein at least one of the first and second dielectric layers comprises materials having corresponding refractive indices greater than 2.0 whereby the transmittance of the first base exceeds 80 percent.

6. An EC element according to claim 5, wherein the first and second dielectric layers comprise materials having corresponding extinction coefficients smaller than 0.04.

7. An EC element according to claim 1, wherein the transmittance of the first base exceeds 80 percent and sheet resistance of the optical thin-film stack is between 5 and 9 Ohms per square.

8. An EC element according to claim 7, wherein the sheet resistance of the optical thin-film stack is between 6 and 7 Ohms per square.

9. An EC element according to claim 1, wherein the at least one metal layer includes silver configured to have thickness less than 200 Angstrom whereby the transmittance of the first base exceeds 90 percent.

10. An EC element according to claim 1, wherein at least one of the first and second dielectric layers comprises materials having corresponding refractive indices greater than 2.5.

11. An EC element according to claim 1 characterized by a color rendering index of greater than or equal to 90.

12. An EC-element according to claim 1, further comprising a second optical thin-film structure including a second metal layer sandwiched between third and fourth dielectric layers, wherein the transmittance of the first base exceeds 80 percent.

13. An EC-element according to claim 12, wherein sheet resistance of the transparent electrode is below 2 Ohms per square.

14. An EC-element according to claim 12, further comprising an second electrode layer on the third surface, the transparent and second electrode layers being structured equivalently, the EC-element characterized by transmittance of more than 70 percent measured in light generated by a standard D65 illuminant.

15. An EC element according to claim 1 configured within a vehicular rearview assembly comprising at least one of an illumination assembly, a display, a voice activated system, a compass system, a telephone system, a highway toll booth interface, a telemetry system, a headlight controller, a rain sensor, a tire pressure monitoring system, a navigation system, a lane departure warning system, and an adaptive cruise control system.

16. An EC-element according to claim 1, configured as part of a window having a solar gain hear coefficient less than 0.5.

17. An EC element according to claim 1, wherein a relationship between a value T of transmittance of said transparent electrode layer, measured in percent in light generated by a standard D65 illuminant, and a value of sheet resistance $R_{sh}$ of said first optical thin-film structure is described by an expression $(28/R_{SH}+T+2)>100$.

18. An EC-element according to claim 17, wherein the value of $R_{SH}$ is less than 6 Ohms/square and a value of $(28/R_{SH}+T+2)$, normalized by a value of thickness of said transparent electrode, is greater than 0.3.

19. An EC element according to claim 1, wherein the first optical thin-film structure is configured to ensure that a color characteristic of light reflected by the EC element in a dark state is less than 20 C* units.

20. An EC element according to claim 1, wherein the first optical thin-film structure is configured to ensure that a color characteristic of light reflected by the EC element in a dark state is less than 10 C* units.

21. An EC element according to claim 1, wherein a difference between first and second color characteristic values of the EC element, measured in reflection of light generated by the standard D65 illuminant and incident onto the first base thereof, does not exceed 20 C* units, wherein the first color characteristic value corresponds to light incident onto the EC element along a normal to a surface of the EC element and the second color characteristic value corresponds to light incident onto the EC element at about 45 degrees with respect to such normal.

22. An EC element according to claim 1, configured as part of a window having a solar heat gain coefficient of less than 0.3.

23. An EC element according to claim 1, configured as part of a window having a solar heat gain coefficient of less than 0.15.

24. An EC element according to claim 1, wherein a surface peak-to-valley roughness of a layer underlying the first metal layer is less than 15 angstroms.

25. An EC element according to claim 1, wherein the first metal layer of the first optical thin-film structure includes silver, and wherein said optical thin-film structure is deposited such as to ensure that a material of the first metal layer is characterized by at least one of (i) a corresponding bulk electrical resistivity value of less than 8 microOhm-centimeter and (ii) a real part of the refractive index of less than 0.12 in at least one portion of a spectral region between 380 and 780 nm.

26. An EC element according to claim 1, wherein a value of non-specular reflectance, measured in light generated by a standard D65 illuminant incident on and reflected by said first optical thin-film structure on the first substrate does not exceed 0.175.

27. An electrochromic (EC) element comprising:
a first base including a first substrate having a first surface and a second surface opposite the first surface, the second surface carrying a first transparent electrode layer that comprises a periodic optical thin-film structure having at least two periods, each of the periods including a metal layer sandwiched between first and second dielectric layers;
a second base having third and fourth surfaces, the first and second bases disposed in a parallel and spaced-apart relationship so as to define a gap therebetween, the second and third surfaces opposing each other; and
an electrochromic medium located in the gap;
wherein transmittance of the EC-element measured in light generated by a standard D65 illuminant exceeds 60 percent.

28. An EC-element according to claim 27, wherein the second base has a second transparent electrode layer on the third surface, the second transparent electrode layer having a structure equivalent to that of the first transparent electrode layer.

29. An EC-element according to claim 27, wherein sheet resistance of the first transparent electrode is below 2 Ohms per square.

30. An EC element according to claim 27, wherein the metal layer includes silver, and first and second dielectric layers include at least one of indium zinc oxide and aluminum zinc oxide.

31. An EC-element according to claim 27, wherein thickness of the metal layer does not exceed 225 Angstroms.

32. An EC element according to claim 27 configured within a vehicular rearview assembly comprising at least one of an illumination assembly, a display, a voice activated system, a compass system, a telephone system, a highway toll booth interface, a telemetry system, a headlight controller, a rain sensor, a tire pressure monitoring system, a navigation system, a lane departure warning system, and an adaptive cruise control system.

33. An EC-element according to claim 27, configured as part of a window having a solar heat gain coefficient of less than 0.5.

34. An EC element according to claim 27, wherein the optical thin-film structure further contains a barrier material adjoining a boundary formed by the first metallic layer and an immediately adjacent layer, said barrier material including at least one of Ni alloy, a noble metal, a sulfur containing material, selenium, and zinc oxide.

35. An EC element according to claim 27, wherein a relationship between a value T of transmittance of said first transparent electrode layer, measured in percent in light generated by a standard D65 illuminant, and a value of sheet resistance $R_{sh}$ of said periodic optical thin-film structure is described by an expression $28/R_{SH}+T+2>100$.

36. An EC-element according to claim 35, wherein the value of $R_{SH}$ is less than 6 Ohms/square and a value of $28/R_{SH}+T+2>100$, normalized by a value of thickness of said first transparent electrode, is greater than 0.3.

37. An EC element according to claim 27, wherein the periodic optical thin-film structure is configured to ensure that a color characteristic of light reflected by the EC element in a dark state is less than 20 C* units.

38. An EC element according to claim 27, wherein the periodic optical thin-film structure is configured to ensure that a color characteristic of light reflected by the EC element in a dark state is less than 10 C* units.

39. An EC element according to claim 27, wherein a difference between first and second color characteristic values of the EC element, as measured in reflection of light generated by the standard D65 illuminant and incident onto the first base thereof, does not exceed 20 C* units, wherein the first color characteristic value corresponds to light incident onto the EC element along a normal to a surface of the EC element and the second color characteristic value corresponds to light incident onto the EC element at about 45 degrees with respect to such normal.

40. An EC element according to claim 27, configured as part of a window having a solar heat gain coefficient of less than 0.3.

41. An EC element according to claim 27, configured as part of a window having a solar heat gain coefficient of less than 0.15.

42. An electrochromic (EC) element comprising:
a first base including a first substrate having a first surface and a second surface opposite the first surface, the second surface carrying a first electrode layer;
a second base having third and fourth surfaces, the first and second bases disposed in a parallel and spaced-apart relationship so as to define a gap therebetween, the second and third surfaces opposing each other; and
an electrochromic medium located in the gap;
wherein the first electrode layer comprises a first optical thin-film stack including a first metal layer sandwiched between first and second dielectric layers, the first electrode layer configured such that transmittance of the EC element measured in ultraviolet (UV) light does not exceed 50 percent.

43. An EC element according to claim 42, wherein at least one of the first and second dielectric layers comprises at least a select one of indium zinc oxide, indium tin oxide, aluminum zinc oxide, titanium oxide, zinc oxide, electrically conductive TiO2, CeOx, tin dioxide, silicon nitride, silicon dioxide, ZnS, chromium oxide, niobium oxide, ZrOx, $WO_3$, nickel oxide, $IrO_2$, whereby the transmittance of the EC element measured in ultraviolet (UV) light does not exceed 25 percent.

44. An EC element according to claim 42, wherein sheet resistance of the transparent electrode layer is between 5 and 9 Ohms per square.

45. An EC element according to claim 42 characterized by a color rendering index of greater than or equal to 90.

46. An EC element according to claim 42, wherein the first electrode layer comprises a second optical thin-films stack that includes a second metal layer sandwiched between third and fourth dielectric layers and that is adjoining the first optical thin-film stack, and wherein sheet resistance of the first electrode layer does not exceed 2 Ohms per square.

47. An EC element according to claim 42, further comprising a second electrode layer disposed on the third surface, the first and second electrode layers having equivalent structures.

48. An EC element according to claim 42, wherein the first electrode layer is configured to ensure that transmittance of the EC element, measured in ultraviolet (UV) light between about 300 nm and about 400 nm and expressed as a non-weighted average, does not exceed 25 percent.

49. An EC element according to claim 42, wherein the first electrode layer is configured to ensure that transmittance of the EC element, measured in ultraviolet (UV) light between about 300 nm and about 400 nm and expressed as a non-weighted average, does not exceed 15 percent.

50. An electrochromic (EC) element comprising:
   a first substrate having a first surface and a second surface opposite the first surface;
   a second substrate having third and fourth surfaces, the first and second substrates disposed in a parallel and spaced apart relationship so as to define a gap therebetween, the second and third surfaces opposing each other;
   an electrochromic medium located in the gap, the electrochromic medium having a light transmittance that is variable upon the application of an electric field thereto; and
   a transparent electrode layer covering at least a portion of at least a select one of the second surface and the third surface, wherein the transparent electrode layer comprises a stack including a first insulator layer, a metal layer, and a second insulator layer,
   wherein any of the first and second insulator layers has an absolute stress of less than 3 GPa.

51. An EC element according to claim 50, wherein the absolute stress of any of the first and second insulator layers is less than 1.5 GPa.

52. An EC element according to claim 50, wherein the absolute stress of any of the first and second insulator layers is less than 0.5 GPa.

* * * * *

UNITED STATES PATENT AND TRADEMARK OFFICE
CERTIFICATE OF CORRECTION

PATENT NO. : 8,368,992 B2
APPLICATION NO. : 12/941724
DATED : February 5, 2013
INVENTOR(S) : Neuman It is certified that error appears in the above-identified patent and that said Letters Patent is hereby corrected as shown below:

In the Specification

Col. 7, line 20, "line FIG. 2" should be –line III-III, FIG. 2–

Col. 8, line 36, "L* a* b*" should be –$L^*$ $a^*$ $b^*$–

Col. 8, line 46, "L*" should be –$L^*$–

Col. 12, line 7, "8202" should be –R202–

Col. 25, table 6b1, lines 30-34, table 6b1 should read –

Table 6b1: Characteristics of several IMI structures

| Total thickness of Ag-layers, Å | $R_{sheet}$, Ohm/sq | Thickness of some dielectric layers for single Ag-layer IMI coating | | % Transmittance for single Ag-layer IMI coating | |
|---|---|---|---|---|---|
| | | IZO | $TiO_2$ | IZO | $TiO_2$ |
| 100 | 6 | 289.6 | 296.2 | 94.8 | 98.1 |
| 150 | 4 | 320 | 341.2 | 85 | 95.6 |
| 200 | 3 | 342 | 373.6 | 71 | 86.8 |
| 300 | 2 | 385.6 | 418.6 | 42.8 | 59.3 |
| 450 | 1.33 | 484.6 | 499.8 | 16.3 | 24.9 |

| Total thickness of Ag-layers, Å | $R_{sheet}$, Ohm/sq | Thickness of some dielectric layers for double-split-Ag IMI coating | | % Transmittance for double-split-Ag IMI coating | |
|---|---|---|---|---|---|
| | | IZO | $TiO_2$ | IZO | $TiO_2$ |
| 200 | 3 | 386.2 | 393.2 | 93.1 | 96.6 |
| 300 | 2 | 473.8 | 487.8 | 86.9 | 93.9 |
| 450 | 1.33 | 589.6 | 615.6 | 69.8 | 82.8 |

| Total thickness of Ag-layers, Å | $R_{sheet}$, Ohm/sq | Thickness of some dielectric layers for triple-split-Ag IMI coating | | % Transmittance for triple- split-Ag IMI coating | |
|---|---|---|---|---|---|
| | | IZO | $TiO_2$ | IZO | $TiO_2$ |
| 300 | 2 | 479.2 | 490 | 89.6 | 95 |
| 450 | 1.33 | 611.8 | 632.4 | 80.9 | 91.2 |
| 600 | 1 | 738 | 766.8 | 69 | 83.4 |

Signed and Sealed this

Seventeenth Day of February, 2015

Michelle K. Lee
*Deputy Director of the United States Patent and Trademark Office*

CERTIFICATE OF CORRECTION (continued)
U.S. Pat. No. 8,368,992 B2

Col. 27, table 6b5, lines 38-43, table 6b5 should read –

| Embodiment 1280 | | Embodiment 1280 modified with ITO over/under layers: | | |
|---|---|---|---|---|
| | | | ITO as overlayer | ITO as underlayer |
| Layer Material | Thickness | Layer Material | Thickness | Thickness |
| | | ITO | 149.0 | 0.0 |
| TiO2 | 28.8 | TiO2 | 28.8 | 28.8 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 54.1 | TiO2 | 54.1 | 54.1 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 54.1 | TiO2 | 54.1 | 54.1 |
| AZO | 5.0 | AZO | 5.0 | 5.0 |
| Ag | 10.0 | Ag | 10.0 | 10.0 |
| AZO | 5.0 | AZO | 5.0 | 5.0 |
| TiO2 | 28.8 | TiO2 | 28.8 | 28.8 |
| | | ITO | 0.0 | 149.0 |
| Optical Parameters in Transmission | | Optical Parameters in Transmission | | |
| Y | 94.8 | Y | 92.9 | 93.0 |
| L* | 98.0 | L* | 97.2 | 97.2 |
| a* | -2.0 | a* | -3.9 | -3.5 |
| b* | 1.3 | b* | 5.8 | 5.2 |
| CRI | 98.6 | CRI | 97.7 | 97.9 |

Table 6b5.

Col. 38, line 3, "Inc)" should be –Inc.)–

Col. 45, line 28, "1.6 min" should be –1.6 mm–

Col. 48, table 10, lines 51-60 and Col. 49, table 10-continued, lines 1-33, table 10 should read –

| Stack #7 | Å | $R_s$ (Ω/sq) | %T |
|---|---|---|---|
| IZO | 400 | | |
| AZO | 50 | 6.9 | 85.3 |
| Ag | 110 | | |
| AZO | 500 | | |
| Glass | | | |

| Stack #8 | Å | $R_s$ (Ω/sq) | %T |
|---|---|---|---|
| IZO | 400 | | |
| AZO | 50 | 5.9 | 86.0 |
| Ag | 110 | | |
| IZO | 450 | | |
| Glass | | | |

| Stack #9 | Å | $R_s$ (Ω/sq) | %T |
|---|---|---|---|
| IZO | 400 | | |
| AZO | 50 | | |
| Ag | 110 | 5.0 | 86.5 |
| AZO | 50 | | |
| IZO | 400 | | |
| Glass | | | |

| *ITO (Half λ) | 1447 | 12.4 | 88.9 |
|---|---|---|---|

| Stack #11 | Å | $R_s$ (Ω/sq) | %T |
|---|---|---|---|
| AZO | 500 | | |
| Ag | 80 | 9.0 | 86.0 |
| AZO | 480 | | |
| Glass | | | |

| Stack #12 | Å | $R_s$ (Ω/sq) | %T |
|---|---|---|---|
| IZO | 500 | | |
| AZO | 50 | | |
| Ag | 80 | 6.5 | 84.5 |
| AZO | 50 | | |
| IZO | 350 | | |
| Glass | | | |

| Stack #13 | Å | $R_s$ (Ω/sq) | %T |
|---|---|---|---|
| IZO | 450 | | |
| AZO | 50 | | |
| Ag | 80 | 6.5 | 87.3 |
| AZO | 50 | | |
| IZO | 430 | | |
| Glass | | | |

| **ITO (Full λ) | 2895 | 6.2 | 85.2 |
|---|---|---|---|